(12) United States Patent
Forstall et al.

(10) Patent No.: US 9,141,718 B2
(45) Date of Patent: Sep. 22, 2015

(54) CLIPVIEW APPLICATIONS

(75) Inventors: Scott Forstall, Mountain View, CA (US); Imran A. Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1891 days.

(21) Appl. No.: 11/145,023

(22) Filed: Jun. 3, 2005

(65) Prior Publication Data
US 2006/0274086 A1     Dec. 7, 2006

(51) Int. Cl.
G06F 17/30     (2006.01)
G06F 9/54      (2006.01)
G06T 11/00     (2006.01)

(52) U.S. Cl.
CPC ............ G06F 17/3089 (2013.01); G06F 9/543 (2013.01); G06T 11/00 (2013.01)

(58) Field of Classification Search
CPC ...... G06F 17/3089; G06F 9/543; G06T 11/00
USPC ................................................. 715/700, 203
See application file for complete search history.

(56) References Cited

U.S. PATENT DOCUMENTS

| | | | |
|---|---|---|---|
| 5,513,309 | A | 4/1996 | Meier et al. |
| 5,625,763 | A | 4/1997 | Cirne |
| 5,914,714 | A | 6/1999 | Brown |
| 5,929,852 | A | 7/1999 | Fisher et al. |
| 6,219,679 | B1 | 4/2001 | Brisebois et al. |
| 6,297,819 | B1 | 10/2001 | Furst |
| 6,344,855 | B1 | 2/2002 | Fisher et al. |
| 6,426,761 | B1 | 7/2002 | Kanevsky et al. |
| 6,724,403 | B1 * | 4/2004 | Santoro et al. ................ 715/765 |
| 6,915,490 | B1 | 7/2005 | Ewing |
| 6,947,967 | B2 | 9/2005 | Ferris et al. |
| 6,976,210 | B1 | 12/2005 | Silva et al. |
| 7,103,838 | B1 | 9/2006 | Krishnamurthy et al. |

(Continued)

FOREIGN PATENT DOCUMENTS

| | | |
|---|---|---|
| EP | 1717673 | 11/2006 |
| WO | WO02/086739 | 10/2002 |
| WO | WO2008/085799 | 7/2008 |

OTHER PUBLICATIONS

Final office action in U.S. Appl. No. 11/469,838, mailed Jun. 24, 2010, 19 pages.

(Continued)

*Primary Examiner* — Sara England
(74) *Attorney, Agent, or Firm* — Blakely, Sokoloff, Taylor & Zafman LLP

(57) ABSTRACT

An implementation allows a user to select an area of interest in a content source and to clip content from the area of interest. A variety of content types may be clipped and presented to a user, and the clipped content may be refreshed from the selected area of interest. Various configuration parameters, as well as the clipped content, may be stored for future retrieval by a clipping application that presents the clipped content. Methods, computer program products, systems, and data structures are provided. One method includes identifying one or more content sources, identifying a portion of a content source to be included in each of a first and second view, storing information associated with the identified content source for each view including a name and identifying information for designating a respective portion of a content source, and displaying both the first and second view in an aggregate view.

103 Claims, 35 Drawing Sheets

(56) References Cited

U.S. PATENT DOCUMENTS

| | | | |
|---|---|---|---|
| 7,215,345 B1* | 5/2007 | Hanko | 345/620 |
| 7,222,306 B2 | 5/2007 | Kaasila et al. | |
| 7,478,336 B2 | 1/2009 | Chen et al. | |
| 7,490,295 B2 | 2/2009 | Chaudhri | |
| 7,519,573 B2* | 4/2009 | Helfman et al. | 1/1 |
| 2002/0055955 A1 | 5/2002 | Lloyd-Jones et al. | |
| 2002/0083097 A1 | 6/2002 | Warrington | |
| 2002/0112237 A1* | 8/2002 | Kelts | 725/39 |
| 2003/0164861 A1 | 9/2003 | Barbanson et al. | |
| 2003/0221167 A1* | 11/2003 | Goldstein et al. | 715/513 |
| 2004/0066407 A1 | 4/2004 | Regan et al. | |
| 2004/0119747 A1 | 6/2004 | Walker et al. | |
| 2004/0133845 A1 | 7/2004 | Forstall et al. | |
| 2005/0149458 A1 | 7/2005 | Eglen et al. | |
| 2005/0246651 A1 | 11/2005 | Krzanowski | |
| 2006/0015404 A1* | 1/2006 | Tran | 705/14 |
| 2006/0015818 A1 | 1/2006 | Chaudhri | |
| 2006/0085731 A1* | 4/2006 | Cui et al. | 715/501.1 |
| 2006/0277481 A1 | 12/2006 | Forstall et al. | |
| 2007/0041666 A1 | 2/2007 | Nagamine et al. | |
| 2007/0043839 A1 | 2/2007 | Amadio et al. | |
| 2007/0044039 A1 | 2/2007 | Amadio et al. | |
| 2007/0130518 A1 | 6/2007 | Shavit et al. | |
| 2007/0266011 A1 | 11/2007 | Rohrs et al. | |
| 2007/0266342 A1 | 11/2007 | Chang et al. | |

OTHER PUBLICATIONS

Final Office Action in U.S. Appl. No. 11/620,492, mailed Jul. 20, 2010, 10 pages.
Action and Response History in U.S. Appl. No. 11/145,560.
Non-Final Office Action in U.S. Appl. No. 11/145,560, mailed Aug. 6, 2010, 21 pages.
Fish & Richardson, Response to Non-Final Office Action in U.S. Appl. No. 11/145,560, filed Nov. 5, 2010, 20 pages.
Final Office Action in U.S. Appl. No. 11/145,560, mailed Jan. 21, 2011, 21 pages.
Response to Final Office Action in U.S. Appl. No. 11/469,838, filed Nov. 22, 2010, 15 pages.
Fish & Richardson, Response to Final Office Action in U.S. Appl. No. 11/620,492, filed Nov. 15, 2010, 11 pages.
Fish & Richardson, Response to Final Office Action in U.S. Appl. No. 11/145,560, filed Jun. 21, 2011, 18 pages.
Fish & Richardson, Response to Final Office Action in U.S. Appl. No. 11/145,561, filed Mar. 15, 2011, 26 pages.
Non-Final Office Action in U.S. Appl. No. 11/145,561, mailed Jul. 21, 2011, 30 pages.
Fish & Richardson, Response to Non-Final Office Action in U.S. Appl. No. 11/145,561, filed Nov. 17, 2011, 25 pages.
Screen Shots of TechSmith's SnagIt product, [URL: http://www.techsmith.com/screen-capture.asp], "SnagIt (V. 7.0.2—Nov. 21, 2003)", 5 pages.
Int'l Search Report in Application No. PCT/US2007/089217, dated May 27, 2008.
Int'l Preliminary Report on Patentability (incl. Written Opinion) in Application No. PCT/US2007/089217, dated Jul. 7, 2009.
Action and Response History in U.S. Appl. No. 11/469,838.
Action and Response History in Application No. 11/620,492.
Tidwell, J., "Designing Interface", O'Reilly, Nov. 2005, Chapter 8.

* cited by examiner

CLIPVIEW APPLICATIONS

TECHNICAL FIELD

This disclosure relates to the presentation of content.

BACKGROUND

Existing computer systems allow a user to clip an item of interest, such as a block of text, from a first document into a clipboard. The user may then paste the contents of the clipboard into a second document. If the user becomes aware that the item of interest has been modified in the first document, the user may again clip the now-modified item of interest from the first document, and re-paste the now-modified clipboard portion into the second document.

Common browsers allow a user to select a web page, and to further select an area of interest in the web page for display by scrolling until the area of interest displays in the browser's display window. If the user desires to have the browser display the most current content in the selected area of interest in the web page, the user may manually request a refresh of the web page. After closing the browser, if the user again desires to view the area of interest, the user may launch the browser and repeat the process of selecting the area of interest.

SUMMARY

One or more disclosed implementations allow a user to select an area of interest in a content source, such as a document or a web page. An area of interest can represent a contiguous area of a content source, such as a frame or the like, or can be an accumulation of two or more non-contiguous or unrelated pieces of content from a single or multiple sources. The content from the area of interest is presented to the user in a viewing application, and can be refreshed automatically. Further, the content may be stored in non-transitory memory or generated programmably so that upon closing and relaunching the viewing application, the user is presented with the content. Additionally, information required for accessing the area of interest and presenting content from the area of interest may be stored in non-transitory memory so that upon closing and relaunching the viewing application, the user may automatically be presented with the current content from the area of interest.

In one general aspect, a method is provided for displaying content in a user interface. The method includes identifying one or more content sources. The method includes identifying a portion of a content source to be included in each of a first and second view. The method includes storing information associated with the identified content source for each view including a name and identifying information for designating a respective portion of a content source. The method includes displaying both the first and second view in an aggregate view.

Advantageous implementations may include one or more of the following features. The first view can be displayed in the second view. The first view and the second view can be interleaved in the aggregate view and displayed at different times. The first view can control at least one aspect of the display of the second view. The first and second views can be displayed simultaneously and in different portions of the aggregate view. The first and second views can be displayed side by side in the aggregate view. The first view can be called and displayed in the second view.

In another general aspect, a method is provided for displaying content in a user interface. The method includes identifying an application. The application includes one or more user interfaces that are interactive with a user of the application. The method includes identifying a portion of one or more of the user interfaces to be included in a view. The method includes storing information associated with the identified user interface portion including a name and identifying information. The method includes displaying the identified portion in a view separate from the application.

Advantageous implementations can include one or more of the following features. The identified portion can include an interactive portion that initiates a command in the application. The application can be the Mac OS X operating system and the identified portion includes a finder frame. The application can be a spreadsheet application and the identified portion includes one or more cells of a spreadsheet. The portions of the one or more cells can be non-contiguous in the spreadsheet. One or more of the one or more cells can be identified in different spreadsheets. Displaying the identified portion can include not initiating the application and directly accessing the identified portion from a datastore associated with the application. The application can be a media player and the identified portion is a portion of media configured to be played on the media player. The media can be television clips. The method further can include receiving an interaction with the displayed view and processing the interaction. Processing can include launching the application and loading the identified portion into a user interface associated with the application. The application can be a game, and the interaction is a move required to further the game. The game can be multiplayer game, and the view provides an alert associated with determining another player in the game has provided an input. The application can be an authoring application and the identified portion is a portion of a document. The application can be a mail application and the identified portion is an inbox. The application can be is a mail application and the identified portion is an address book. The application can be a player application and the identified portion is a sound clip. The application can be a webcam and the identified portion is a portion of content associated with the webcam.

In another general aspect, a method is provided for sharing content between applications. The method includes identifying content and an associated application. The method includes providing a viewer application that facilitates viewing a portion of the content without initiating the associated application. The method includes displaying a portion of the content in a view presented by the viewer including automatically updating the view in accordance with a refresh strategy.

Advantageous implementations can include one or more of the following features. The associated application can be a mail application, and the content is stored in a mail server associated with the mail application. The associated application can be a document processing application and the content is stored in a datastore associated with the associated application. The shared content can be selected from the group consisting of folder, a file, and a document. The refresh strategy can be selected from the group consisting of automatically, continuously, intermittently, manually, selectively, or all provided. The identifying content can include receiving input indicating portions of content that are available for ready inclusion in the view.

In another general aspect, a method is provided for sharing content between applications. The method includes identifying a content source including a portion of the content source to be included in a view. The content source is associated with an application. The method includes providing a viewer application that facilitates viewing the portion of the content. The method includes displaying the portion of the content in a view presented by the viewer application, including automatically updating the view in accordance with a refresh strategy.

Advantageous implementations can include one or more of the following features. Identifying a portion of content can include receiving input indicating portions of content that are available for ready inclusion in the view. The content can be located by a searching application and the searching application returns a portion of the content as a search result. The portion of content can be identified from prior portions of content presented to a user. The process of displaying the portion can include responding to a user interaction to the view. The response can be selected from the group consisting of returning a page request, updating the display, navigating in the view, and displaying received content. The method further can include interacting with a user when provided an input there from. The method further can include selectively allowing for user interaction with the view. Selectively allowing for user interaction can include selecting from no interaction, partial interaction, and full interaction. Full interaction can include launching the application associated with the content being displayed to facilitate the full interaction. Displaying a portion of the content in accordance with the refresh strategy can include tracking changes in the portion of content in the content source and providing an update to the portion of the content displayed in accordance with the refresh strategy. The application can be a browser. The application can be messaging application, and the view provides an alert whenever a new message is received in a message store associated with the messaging application. Displaying a portion of the content can include applying a function to the portion of the content prior to display. The function can be a graphical operation. The function can be a filter. Displaying the portion can include displaying the portion in a widget. The steps of identify, providing, and displaying can be instantiated by a widget. Displaying the view can include displaying the view in an overlay of a display environment. The display environment can be selected from the group consisting a desktop environment and a dashboard environment. The display environment can be a display of an electronic device. The method can further includes maintaining a script describing a process for refreshing the portion of the content. The step of displaying can be performed selectively for different users depending on permissions associated with a given user. The content source can be associated with a subscription service and refreshing the view is performed in accordance with a subscription agreement.

In another general aspect, a method is provided for displaying web content in a user interface. The method includes maintaining first and second information. Each of the first and second information is associated with a content source including a name and identifying information for designating a selected portion of the content source. The method includes displaying a view including respective selected portions associated with the first and second information.

Advantageous implementations can include one or more of the following features. The method further includes identifying a first content source associated with the first information. The method can further include selecting a portion of the content source to be included in the view. The method can further include identifying a second content source associated with the second information. The method can further include selecting a portion of the content source to be included in the view. Identifying the content source can include determining a script for accessing the content source, maintaining information includes maintaining the script, and displaying includes using the script to access current content associated with the selected portion. Selecting can include determining view characteristics including a dimension of a display area to display the selected portion. Selecting can include determining view characteristics including a location of the view in a display environment. The method can further include rendering the content source and deriving reference data describing the selected portion using the rendered data. The method can further include detecting a trigger event for activating an overlay in the user interface and where displaying the view includes displaying the view in the overlay. The overlay can be a dashboard that includes one or more graphical user interface elements. The method can further include detecting a trigger event for dismissing the overlay and reactivating the user interface. The method can further include detecting a user interaction with the view and providing a response. The response can be selected from the group consisting of returning a page request, updating the display, navigating in the view, and displaying received content. The method can further include interacting with a user when provided an input there from. The method can further include selectively allowing for user interaction with the view.

In another general aspect, a data structure is provided for content to be displayed in a user interface. The data structure includes metadata identifying a first and second content source. The data structure includes metadata describing an area of interest in each content source. The data structure includes metadata describing a relationship for displaying both areas of interest in a unified view. The data structure includes preference data describing at least refresh preferences to be used when displaying the areas of interest in a user interface.

Advantageous implementations can include one or more of the following features. The data structure can further include navigation metadata including a script for accessing each area of interest. The metadata describing an area of interest can include a selection definition including information describing a selected portion including reference information and view dimension information. The reference information can include information defining geographic coordinates for locating the selected portion. The reference information can include information defining a locator in the content source selected from the group consisting of a frame, a view, or a widget. The data structure can further includes a script for locating the area of interest. The script can include one or more processes for authenticating a user for accessing the content source. The metadata describing the area of interest can include information for identifying selected portions of a plurality of different content sources. The metadata describing the area of interest can include information for identifying selected non-contiguous portions of a content source. The refresh preferences can be selected from the group consisting of automatically, continuously, intermittently, manually, selectively or as provided.

In another general aspect, a method is provided for identifying content to be displayed in a user interface. The method includes identifying two or more digital content sources. The method includes selecting a portion of each digital content source to be included in a view defined by a selection definition. The method includes maintaining information associated with each digital content source including navigation information to the digital content source. The selection definition and metadata describe a relationship for displaying each portion in a unified view.

Advantageous implementations can include one or more of the following features. The digital content source can be selected from the group consisting of a web page, a file, a document, or a spreadsheet. Selecting a portion can be performed by a user. Selecting further can include identifying the navigation information including a script for accessing the selected portion. Selecting can further include determining the selection definition, the selection definition including information describing the selected portion including reference information and view dimension information. The reference information can include information defining geographic coordinates for locating the selected portion. The reference information can include information defining a locator in the digital content source selected from the group consisting of a frame, a view, or a widget. Identifying the digital content source can include determining a script for accessing the digital content source, and maintaining information includes maintaining the script. Selecting can include determining view characteristics including a dimension of a display area to display the selected portion and maintaining includes maintaining the view characteristics. Selecting can include determining view characteristics including a location of the view in a display environment and maintaining includes maintaining the view characteristics. Selecting can include determining reference data for identifying a particular portion of the digital content source to be displayed and the maintaining step includes storing the reference data. The method can further include rendering the digital content source and deriving reference data describing the selected portion using the rendered data. The method can further include maintaining user interaction preferences to be active when displaying the view, the interaction preferences providing a selective level of interaction with the view.

In another general aspect, a data structure is provided for a graphical display element. The data structure includes a plurality of content definitions, each including a description of a digital content source and a pre-selected portion of the digital content source. The data structure includes metadata describing a relationship for displaying each pre-selected portion in a unified view. The data structure includes preference data including refresh preferences to be used when displaying the pre-selected portion of the digital content source in a user interface.

In another general aspect, a graphical display element is provided. The graphical display element includes a plurality of content definitions, each including a description of a digital content source and an area of interest of the digital content source. The graphical display element includes metadata describing a relationship for displaying each area of interest in a unified view. The graphical display element includes preference data including refresh preferences to be used when displaying the area of interest of the digital content source in a user interface. The graphical display element includes a viewer for displaying the areas of interest in the unified view and updating content associated with the area of interest in accordance with the preference data.

Advantageous implementations can include one or more of the following features. The digital content source can be selected from the group consisting of a web page, a file, a document, or a spreadsheet. The content definition can further includes navigation information including a script for accessing the area of interest. The content definition can further include a selection definition including information describing the area of interest including reference information and view dimension information. The reference information can include information defining geographic coordinates for locating the selected portion. The reference information can include information defining a locator in the digital content source selected from the group consisting of a frame, a view, or a widget. The content definition can include view characteristics including a dimension of a display area to display the area of interest. The content definition can include view characteristics including a location of the view in a display environment. The content definition can further include data associated with the digital content source that can be used to locate the area of interest in subsequent views. The data can be rendered data. The content definition can further include user interaction preferences to be active when displaying the view, the interaction preferences providing a selective level of interaction with the view.

In another general aspect, a computer program product is provided that includes instructions for causing a computing device to identify one or more content sources. The product includes instructions to identify a portion of a content source to be included in each of a first and second view. The product includes instructions to store information associated with the identified content source for each view including a name and identify information for designating a respective portion of a content source. The product includes instructions to display both the first and second view in an aggregate view.

In another general aspect, a computer program product is provided that includes instructions for causing a computing device to identify an application, the application including one or more user interfaces that are interactive with a user of the application. The product includes instructions to identify a portion of one or more of the user interfaces to be included in a view. The product includes instructions to store information associated with the identified user interface portion including a name and identifying information. The product includes instructions to display the identified portion in a view separate from the application.

In another general aspect, a computer program product is provided that includes instructions for causing a computing device to identify content and an associated application. The product includes instructions to provide a viewer application that facilitates viewing a portion of the content without initiating the associated application. The product includes instructions to display a portion of the content in a view presented by the viewer including automatically updating the view in accordance with a refresh strategy.

In another general aspect, a computer program product is provided that includes instructions for causing a computing device to identify a content source including a portion of the content source to be included in a view. The content source is associated with an application. The product includes instructions to provide a viewer application that facilitates viewing the portion of the content. The product includes instructions to display the portion of the content in a view presented by the viewer application including automatically updating the view in accordance with a refresh strategy.

In another general aspect, a computer program product is provided that includes instructions for causing a computing device to maintain first and second information. Each of the first and second information is associated with a content source including a name and identifying information for designating a selected portion of the content source. The product includes instructions to display a view including respective selected portions associated with the first and second information.

In another general aspect, a computer program product is provided that includes instructions for causing a computing device to identify two or more digital content sources. The product includes instructions to select a portion of each digital content source to be included in a view defined by a selection definition. The product includes instructions to maintain information associated with each digital content source including navigation information to the digital content source, the selection definition and metadata describing a relationship for displaying each portion in a unified view.

The above general aspects may be implemented, for example, using a method and an apparatus. An apparatus may include one or more computer readable media having instructions stored thereon and configured to result in one or more of the general aspects being performed. An apparatus may include one or more pieces of structure for performing operations in one or more of the general aspects. A method may include the operations that are performed, or the operations that structure is configured to perform, in one or more of the general aspects.

Various disclosed implementations provide for views of various pieces of content to be presented using a viewing application. The views may be refreshed automatically or upon demand, and may be tailored to a user-selected area of interest from the content source. The views may further be tailored to display in a window having a user-configurable size and a user-configurable location. The information identifying the view, such as the location of the area of interest and the size and position of the viewing window, may be stored so that the user may redisplay the view, after closing and relaunching the viewing application, without needing to reconfigure the view. The views also may be interactive, allowing the user to edit text, enter data on a form, click on a hyperlink, or perform other interactions with the view.

The details of one or more implementations are set forth in the accompanying drawings and the description below. Other features will be apparent from the description and drawings, and from the claims.

DETAILED DESCRIPTION

U.S. patent application Ser. No. 10/877,968, filed Jun. 25, 2004, and titled "Unified Interest Layer for User Interface," and U.S. Provisional Patent Application No. 60/642,025, filed Jan. 7, 2005, and titled "Unified Interest Layer Widgets," and U.S. patent application entitled "Widget Authoring and Editing Environment" filed concurrently, and assigned Ser. No. 11/145,577 are hereby incorporated by reference in their entirety for all purposes.

We begin with a brief introductory summary of a general description of a system, associated applications, methods, processes and computer program products for presenting clipped content in association with an initial set of figures. Thereafter, a discussion of the later figures is presented that includes more specific examples of presenting clipped content.

Figure 1:
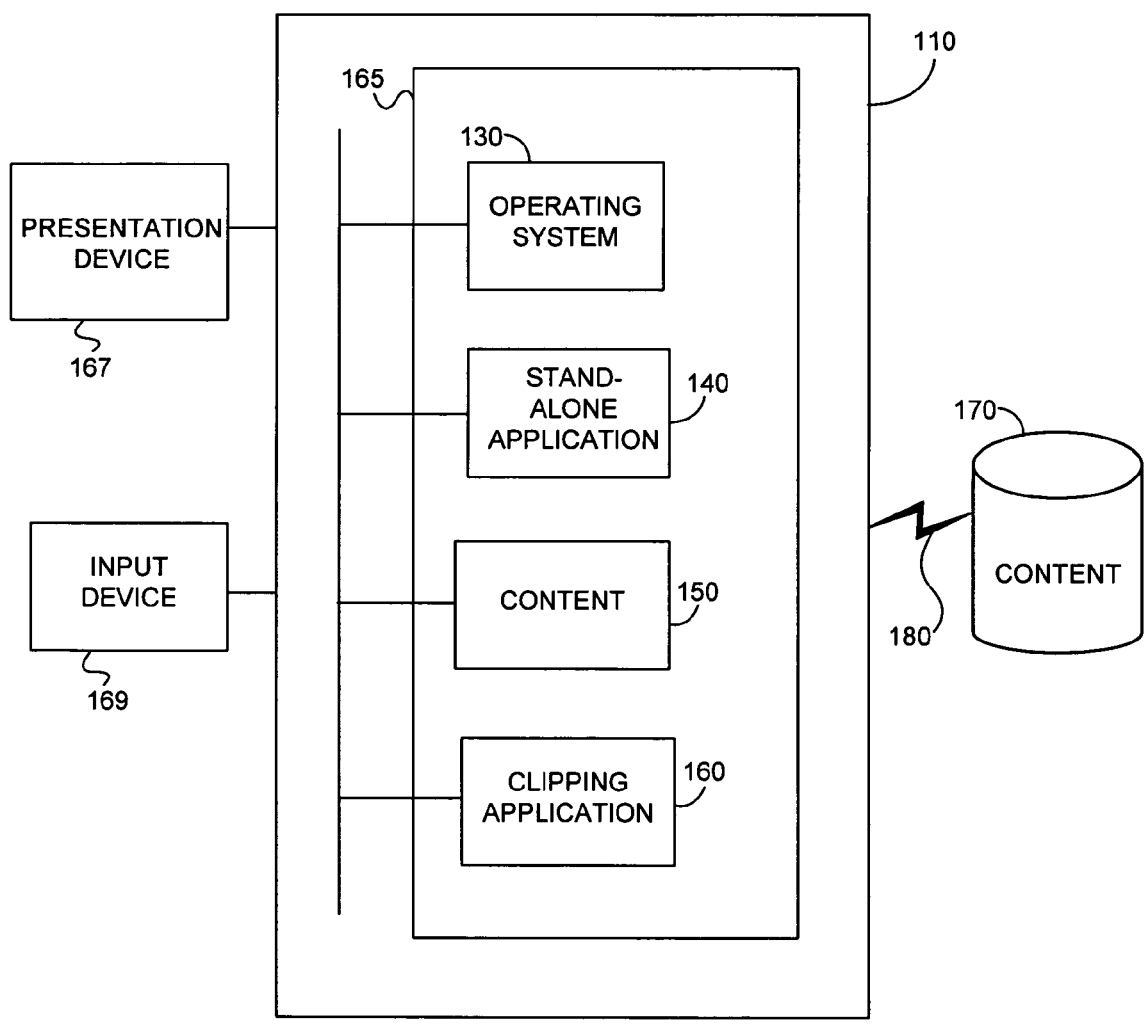
FIG. 1 is a block diagram showing a system for clipping content.

Turning now to the general description, and with reference to FIG. 1, a system 100 is shown for clipping content and presenting the clippings (or sometimes referred below as a clipview, webview, or other "X" views) to a user. System 100 includes a processing device 110 having an operating system 130, a stand-alone application 140, a content source 150, and a clipping application 160. Each of elements 130-160 is communicatively coupled, either directly or indirectly, to each other. Elements 130-160 are stored on a memory structure 165, such as, for example, a hard drive. System 100 also includes a presentation device 167 and an input device 169, both of which are communicatively coupled to processing device 110. System 100 further includes a content source 170 external to processing device 110, and communicatively coupled to processing device 110 over a connection 180.

Processing device 110 may include, for example, a computer, a gaming device, a messaging device, a cell phone, a personal/portable digital assistant ("PDA"), or an embedded device. Operating system 130 may include, for example, MAC OS X from Apple Computer, Inc. of Cupertino, Calif. Stand-alone application 140 may include, for example, a browser, a word processing application, a database application, an image processing application, a video processing application or other application. Content source 150 and content source 170 may each include, for example, a document having any of a variety of formats, files, pages, media, or other content, and content sources 150 and 170 may be compatible with stand-alone application 140. Presentation device 167 may include, for example, a display, a computer monitor, a television screen, a speaker or other output device. Input device 169 may include, for example, a keyboard, a mouse, a microphone, a touch-screen, a remote control device, a speech activation device, or a speech recognition device or other input devices. Presentation device 167 or input device 169 may require drivers, and the drivers may be, for example, integral to operating system 130 or stand-alone drivers. Connection 180 may include, for example, a simple wired connection to a device such as an external hard disk, or a network, such as, for example, the Internet. Clipping application 160 is described in more detail below, and may be a stand-alone application as shown in system 100 or may be, for example, integrated in whole or part into operating system 130 or stand-alone application 140.

Figure 2:
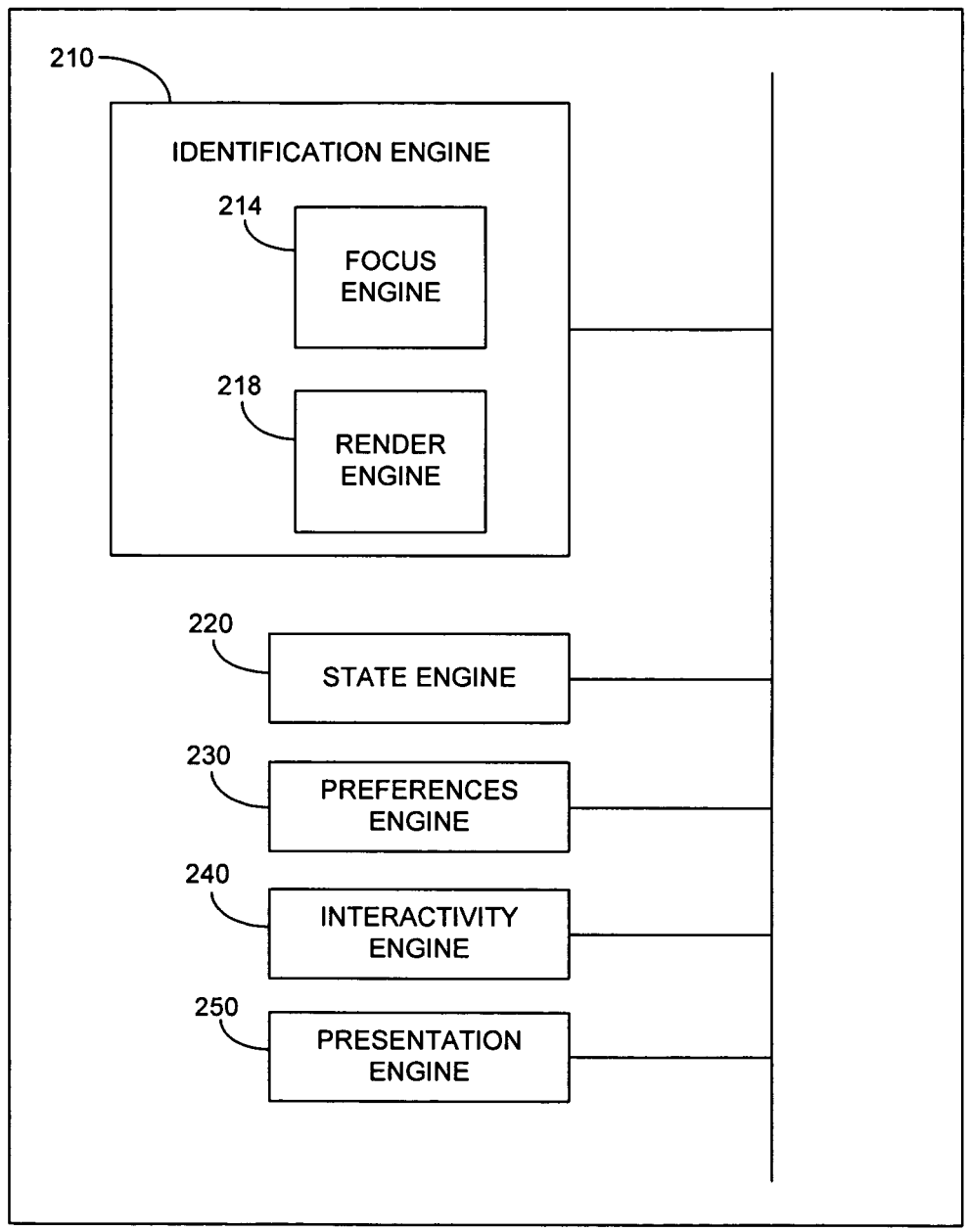
FIG. 2 is a block diagram showing a clipping application.

Referring to FIG. 2, components of clipping application 160 are shown. Clipping application 160 provides functionality for clipping content and presenting the clippings to a user. Clipping application 160 includes an identification engine 210 that includes a focus engine 214 for identifying the content to be clipped and a render engine 218 for rendering content. Clipping application 160 further includes a state engine 220 for enabling a refresh of clipped content, a preferences engine 230 for setting preferences, an interactivity engine 240 for processing interactions between a user and the clipped content, and a presentation engine 250 for presenting clipped content to a user. Engines 210-250 are communicatively coupled to one or more of each other. Though the engines identified above are described as being separate or distinct, one or more of the engines may be combined in a single process or routine. The functional description provided herein including separation of responsibility for distinct functions is exemplary. Other groupings or other divisions of functional responsibilities can be made as necessary or in accordance with design preferences.

Figure 3:
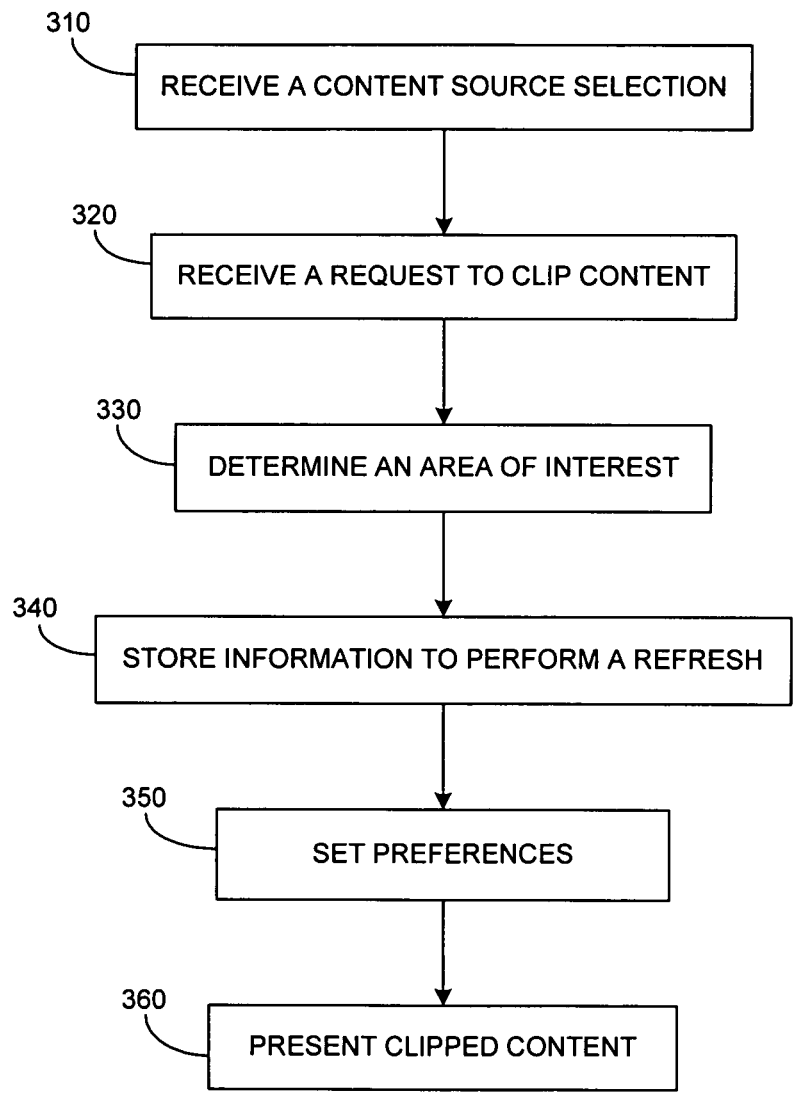
FIG. 3 is a flow chart showing a process for creating a clipping of content.

Focus engine 214 may be used to initially identify, possibly with the assistance of the user, content to be clipped. Such an identification may include accepting input from a user and providing assistance or suggestions to a user. Focus engine 214 also may be used to access a previously selected area of interest during a refresh of clipped content. Identifying content or accessing a previously identified area of interest may include numerous operations that may be performed, in whole or in part, by focus engine 214, or may be performed by another module such as one of engines 210, 218, or 220-250. FIG. 3 discusses many of the operations that may be performed, for example, in creating a clipping of content, and focus engine 214 may perform various of those and other operations. For example, focus engine 214 may (1) identify a content source, (2) enable a view to be presented, such as a window, that displays the content source, (3) enable the view to be shaped (or reshaped), sized (or resized) and positioned (or repositioned), and (4) enable the content source(s) to be repositioned within the view to select an area of interest.

Enabling a view to be presented may include, for example, (1) identifying a default (or user specified, for example) size, shape and screen position for a new view, (2) accessing parameters defining a frame for the new view including shape, form, size, etc., (3) accessing parameters identifying the types of controls for the new view, as well as display information for those controls that are to be displayed, with display information including, for example, location, color, and font, and (4) rendering the new view.

Further, as discussed in more detail below, focus engine 214 may be initialized in various ways, including, for example, by a user selecting clipping engine 160 to clip content, by receiving a user's acceptance of a prompt to create a clipping, or automatically. An automatic initialization may occur, for example, if a user displays in an application content that includes a pre-defined view, in which case the application may automatically initialize focus engine 214 to create the pre-defined view.

In clipping content from a content source, focus engine 214 also may obtain information about the configuration of the application from which the content was clipped. Such configuration information may be required to identify the area of interest within the content source. For example, when a web page is accessed from a browser, the configuration of the browser (e.g. size of the browser window) may affect how content from the web page is actually displayed (e.g., page flow, line wrap, etc.), and therefore which content the user desires to have clipped.

Render engine 218 may be used to render content that is to be presented to a user in a clipping or during a clip setup process. Render engine 218 may, alternatively, be placed in whole or in part outside of identification engine 210. Such alternate locations include, for example, another engine, such as, for example, presentation engine 250 which is discussed below, and a separate stand-alone application that renders content.

Implementations may render one or more entire content sources or only a portion of one or more of the content sources, such as, for example, the area of interest. As discussed above, an area of interest can represent a contiguous area of a content source, such as a frame or the like, or can be an accumulation of two or more non-contiguous or unrelated pieces of content from a single or multiple sources. In particular implementations, an entire web page (e.g., one form of a content source) is rendered, and only the area of interest is actually presented. Rendering the whole web page allows identification engine 210 to locate structural markers such as a frame that includes part of the area of interest or an (x,y) location coordinate with reference to a known origin (e.g., creating reference data). Such structural markers, in a web page or other content, may be useful, for example, in identifying the area of interest, particularly during a refresh/update after the content source has been updated and the area of interest may have moved. Thus, a selected area of interest may be tracked. The entire rendered page, or other content source, may be stored (e.g., in a transitory or non-transitory memory) and referenced to provide a frame of reference in determining the selected area of interest during a refresh, for example. In one implementation, the entire rendered page is stored non-transitorily (e.g. on a hard disk) to provide a frame of reference for the initial presentation and for all refresh operations, and content that is accessed and presented in a refresh is not stored non-transitorily. In various implementations, render engine 218 renders content that has been identified using focus engine 214. Identification engine 210 typically is capable of processing a variety of different content formats, navigating within those formats, and rendering those formats. Examples include hypertext markup language ("HTML"); formats of common word processing, spreadsheet, database, presentation, and other business applications; and common image and video formats.

State engine 220 may be used to store information (e.g., metadata) needed to refresh clipped content and implement a refresh strategy. Such information is referred to as state information and may include, for example, a selection definition including an identifier of the content source as well as additional navigation information that may be needed to access the content source, and one or more identifiers associated with the selected area of interest within the content source(s). The additional navigation information may include, for example, login information and passwords (e.g., to allow for authentication of a user or subscription verification), permissions (e.g., permissions required of users to access or view content that is to be included in a given clipping), and may include a script for sequencing such information. State engine 220 also may be used to set refresh timers based on refresh rate preferences, to query a user for refresh preferences, to process refresh updates pushed or required by the source sites or otherwise control refresh operations as discussed below (e.g., for live or automatic updates).

Preferences engine 230 may be used to query a user for preferences during the process of creating a clipping. Preferences engine 230 also may be used to set preferences to default values, to modify preferences that have already been set, and to present the preference selections to a user. Preferences may relate to, for example, a refresh rate, an option of muting sound from the clipping, a volume setting for a clipping, a setting indicating whether a clipping will be interactive, a naming preference to allow for the renaming of a current clipping, a redefinition setting that allows the user to adjust (e.g., change) the area of interest (e.g., reinitialize the focus engine to select a new area of interest to be presented in a clip view), and function (e.g. filter) settings. Preferences also may provide other options, such as, for example, listing a history of previous content sources that have been clipped, a history of changes to a current clipping (e.g., the changes that have been made over time to a specific clipping thus allowing a user to select one for the current clipping) and view preferences. View preferences define characteristics (e.g., the size, shape, controls, control placement, etc. of the viewer used to display the content) for the display of the portions of content (e.g., by the presentation engine). Some or all of the preferences can include default settings or be configurable by a user.

Interactivity engine 240 may process interactions between a user and clipped content by, for example, storing information describing the various types of interactive content being presented in a clipping. Interactivity engine 240 may use such stored information to determine what action is desired in response to a user's interaction with clipped content, and to perform the desired action. For example, interactivity engine 240 may (1) receive an indication that a user has clicked on a hyperlink displayed in clipped content, (2) determine that a new web page should be accessed, and (3) initiate and facilitate a request and display of a new requested page. As another example, interactivity engine 240 may (1) receive an indication that a user has entered data in a clipped form, (2) determine that the data should be displayed in the clipped form and submitted to a central database, (3) determine further that the next page of the form should be presented to the user in the clipping, and (4) initiate and facilitate the desired display, submission, and presentation. As another example, interactivity engine 240 may (1) receive an indication that a user has indicated a desire to interact with a presented document, and (2) launch an associated application or portion of an application to allow for a full or partial interaction with the document. Other interactions are possible.

Presentation engine 250 may present clipped content to a user by, for example, creating and displaying a user interface on a computer monitor, using render engine 218 to render the clipped content, and presenting the rendered content in a user interface. Presentation engine 250 may include an interface to a variety of different presentation devices for presenting corresponding clipped content. For example, (1) clipped web pages, documents, and images may be presented using a display (e.g., a computer monitor or other display device), (2) clipped sound recordings may be presented using a speaker, and a computer monitor may also provide a user interface to the sound recording, and (3) clipped video or web pages having both visual information and sound may be presented using both a display and a speaker. Presentation engine 250 may include other components, such as, for example, an animation engine for use in creating and displaying a user interface with various visual effects such as three-dimensional rotation.

In various implementations, the user interface that presentation engine 250 creates and displays is referred to as a clipview. The clipview includes a first portion including the clipped content and a second portion for presenting the clipped content. In an implementation discussed below, the first portion is referred to as a view portion 1030 in which clipped content is displayed, and the second portion is referred to as a frame 1040 which might also include controls. Implementations need not include a perceivable frame or controls, but may, for example, present a borderless display of clipped content, and any controls may be, for example, keyboard-based controls or mouse-based controls without a displayable tool or activation element, overlay controls, on screen controls or the like. The presentation typically includes a display of the clipped content although other implementations may present audio content without displaying any content. The clipview also may include one or more additional portions for presenting information such as, for example, preferences settings and an identifier of the content source. The display of the clip view may be in the user interface of a device, part of a layer presented in the user interface (e.g., as part of an overlay or an on-screen display).

Clipping application 160 can be a lightweight process that uses, for example, objects defined as part of a development environment such as the Cocoa Application Framework (as referred to as the Application Kit or AppKit, described for example at Mac OS X Tiger Release Notes Cocoa Application Framework, available at http://developer.apple.com/documentation/ReleaseNotes/Cocoa/AppKit.html). Clippings produced by clipping application 160 can be implemented in some instantiations as simplified browser screens that omit conventional interface features such as menu bars, window frame, and the like.

Referring to FIG. 3, a process 300 may be used to create a clipping. Process 300 may be performed, at least in part, by, for example, clipping application 160 running on system 110.

Process 300 includes receiving a content source(s) selection (310) and receiving a request to clip content (320). Operations 310 and 320 may be performed in the order listed, in parallel (e.g., by the same or a different process, substantially or otherwise non-serially), or in reverse order. The order in which the operations are performed may depend, at least in part, on what entity performs the method. For example, system 100 may receive a user's selection of a content source (310), and system 100 may then receive the user's request to launch clipping application 160 to make a clipping of the content source (320). As another example, after a user selects a content source and then launches clipping application 160, clipping application 160 may simultaneously receive the user's selection of the content source (310) and the user's request for a clipping of that content source (320). As yet another example, a user may launch clipping application 160 and then select a content source(s) from within clipping application 160, in which case clipping application 160 first receives the user's request for a clipping (for example, a clipview) (320), and clipping application 160 then receives the user's selection of the content source(s) to be clipped (310). In other implementations, operations 310 and 320 may be performed by different entities rather than by the same entity.

Process 300 includes determining an area of interest in the selected content source(s) (330). In typical implementations, operation 330 requires that the content source(s) be rendered and presented to the user, so that the user can navigate to or otherwise select the area of interest. The rendering also may be important in helping the user determine an exact extent of the area of interest. For example, in implementations that provide a clipview, the user may desire to see how much content is rendered within the presentation portion of the clipview, and the user's determination of the area of interest may be based on the size and shape of the presentation portion (in some implementations, the user also may resize the presentation portion if desired). Determining the area of interest may also include determining how non-contiguous portions of content are presented in the clipping. For example, determining the area of interest may include a stitching process for joining in the presentation view the non-contiguous portions of the area of interest. Stitching can include dividing the display area into one or more regions that serve as place holders for portions of identified content (e.g., four frames can be associated with a four-up display, each for holding a portion of the identified content). Stitching can also include other interlacing processes that combine identified content in time (e.g., interleaving or sequential presentation) or space (e.g., combing the identified content in a given display space) as desired. Alternatively and or additionally, the processes described above may be implemented in the presentation of the area of interest (e.g., the stitching or combination of the disparate content portions may be combined at presentation time).

In one implementation, the operation of determining an area of interest (330) includes creating and displaying a view window, displaying some portion of the content source within the view window, enabling a user to resize, reshape and reposition the view window, and enabling the user to reposition the content source within the view window. The area of interest is that portion of the content source that is positioned to be displayed in the resized (as necessary) view window. Accordingly, as discussed below with respect to operation 340, information identifying that portion and how to access that portion is stored to enable a refresh to be performed.

As indicated above, the process of determining the area of interest may allow a user to resize the view window. Accordingly, the view window may be larger than, the same size as, or smaller than the size of the display of the content source from which the content was clipped (for example, a browser's display window, or a display of a document). Additionally, other implementations may provide a large view window, for the process of creating a clipping, that displays more content than will be displayed in the final clipping. In these implementations, the user may be enabled to select a portion of the displayed content as the area of interest without reducing the size of the view window (for example, by drawing a box around the area of interest, or selecting portions of the content to form the area of interest).

As will be further described below, various implementations assist a user in determining the area of interest, or determine the area of interest without direct input from a user. For example, system 110 may recognize that a user has accessed a particular piece of content at least a threshold number of times in the past three days, and may ask the user whether the user would like a clipview of the accessed content. As another example, a content source may pre-identify a particular area as being a probable area of interest and clipping application 160 may automatically create a clipview of the pre-identified area of interest. As yet another example, focus engine 214 may include a snap-location feature, possibly provided on a toolbar in clipping application 160. The snap-location feature identifies a portion of content that can be clipped and that includes a user's selected area of interest. For example, if a user clicks on an article in a web page, the snap-location feature may clip the entire frame that contains the article. As another example, a search engine can be used to locate clippable items. In one implementation, the search query can include a format definition that allows a user to designate a search that will return clippings. Alternatively, the search engine can include clipping generation functionality (or invoke the same) to return search results to queries that, though otherwise unformatted, are returned to the user in the search results as formatted clippings.

As with operations 310 and 320, operation 330 may be performed out of the order shown. For example, operation 330 may be performed before operation 320.

Process 300 stores information to perform a refresh of the determined area of interest (340), sets preferences (350), and presents the clipped content (360). In some implementations, one or more functions can be applied to the content identified as the area of interest prior to presentation (step 360). For example, one or more filters may be used to apply one or more graphical effects including zoom, scale or other graphical operation to the selected portion(s) of the content source prior to display. Selection of functions can be made in accordance with user preferences, implemented for example, by preferences engine 230. Operations 340-360 may be performed, for example, as described above in the discussion of FIG. 2. As with operations 310-330, operations 340-360 may be performed in various orders.

In one implementation, process 300 is performed entirely by clipping application 160. For example, after a user selects a content source and launches clipping application 160, then identification engine 210, and in particular focus engine 214, receives the content source selection (310) and the request to clip content (320). Focus engine 214 then determines an area of interest (330) with the user's input. State engine 220 stores information to perform a refresh of the determined area of interest (340), and preferences engine 230 sets preferences (350). Presentation engine 250 presents the clipped content (360), possibly in a clipview.

As discussed in more detail below with respect to variations of state engine 220, a script may be created for performing a refresh. A script may include, for example, an identifier of the content source (e.g. URL) and an identifier of the area of interest (e.g. an (x,y) offset from a frame boundary). More complex scripts also may include identifiers for a login page, and identifiers for navigating to an area of interest after a successful login.

Figure 4:
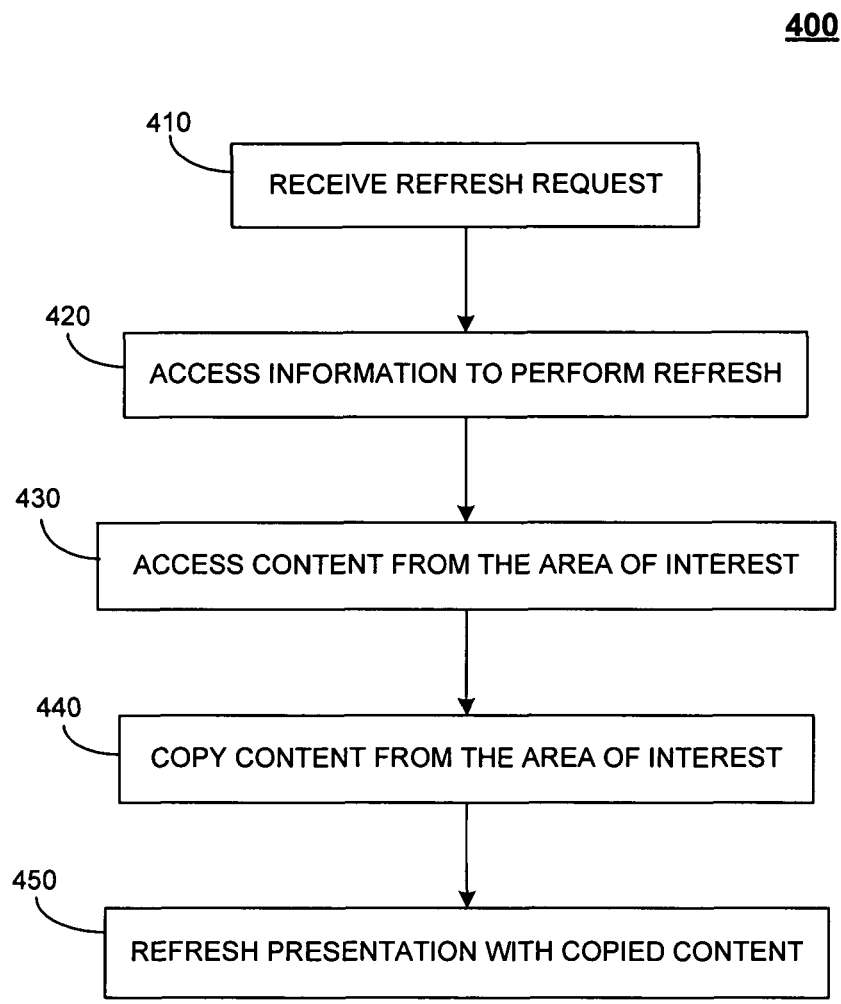
FIG. 4 is a flow chart showing a process for refreshing clipped content.

Referring to FIG. 4, a process 400 may be used to refresh the presentation of a clipping, such as, for example, a clipview. Process 400 may be performed, at least in part, by, for example, clipping application 160 running on system 110.

Process 400 includes receiving a refresh request (410). A refresh request may be received/generated/required, for example, directly from a user, as a result of a timer set to initiate refresh requests at a particular frequency, or in response to an indication from a content source or application that an update is available, required or otherwise necessitated (e.g., live or automatic updates). A refresh request also may be received in response to receiving an update (rather than merely a notification of an available update) pushed from a content source, although receiving the update may obviate the need to perform several remaining operations in process 400 (e.g., the location and accessing steps set forth below).

Process 400 includes accessing information used to perform a refresh (420). The information will typically be that information stored in operation 340 of process 300. Process 400 then accesses content from the area of interest of the content source, typically, using the accessed information (430), and optionally copies (e.g., to a transitory memory such as a random access memory ("RAM"), or to a non-transitory memory such as a disk) the content from the area of interest (440). Process 400 then refreshes the presentation of a clipping by presenting the copied content (450).

Typically, the refresh will update the previously clipped and presented content from the area of interest with the newly accessed content from the area of interest. It may occur, however, that the previous presentation has been interrupted or corrupted prior to a refresh. In such cases, the refresh may merely present the new clipped content in the display (e.g., in a blank view window).

In one implementation, process 400 is performed entirely by clipping application 160. For example, preferences engine 230 receives a user's preference that a clipview be refreshed, e.g., every five minutes, and clipping application 160 sets a, e.g., five-minute, timer. When the timer goes off, state engine 220 receives a refresh request (410), accesses the information that state engine 220 stored to enable a refresh to be performed (420), and passes appropriate information to identification engine 210. Identification engine 210 then initiates an access of the area of interest of the content source. For example, in implementations in which the content source is a web page hosted by an external system, identification engine 210 may use a built-in browser, or a separate stand-alone browser in system 110, to request the content from the area of interest. The request may be received and responded to by a server on the external system. After the external system's server sends the content, identification engine 210 (e.g., or an associated browser) accesses the content (430), optionally copies the content (e.g., to a RAM) (440), renders the content, and focuses on the particular area of interest, and presentation engine 250 presents the focused content as a refresh (450). The refresh operation can be, as described above in response to a timer or time out. Other forms of refresh are also possible, including those associated with automatic refresh of the clipping, refreshes associated with live events, continuous updates, source updates, manual refresh requests, or other conventional forms of refresh.

Figure 5:
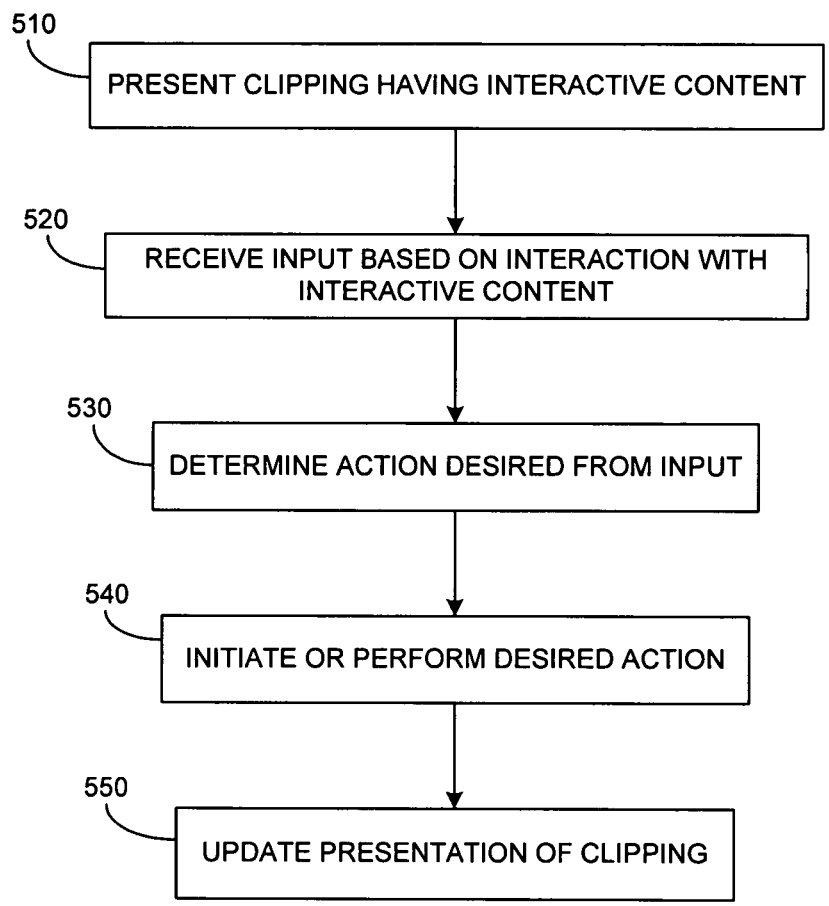
FIG. 5 is a flow chart showing a process for responding to user interactions with clipped content.

Referring to FIG. 5, a process 500 may be used to respond to a user's interaction with content in a clipping that is presented to the user in, for example, a clipview. Process 500 may be performed, at least in part, by, for example, clipping application 160 running on system 110.

Process 500 includes presenting a clipping that includes interactive content (510). The interactive content may include, for example, a webpage (e.g., a hyperlink on a webpage), a data entry field on a form, an electronic mail ("email") address in a directory listing that upon selection automatically creates a "new" blank email message addressed to the selected email address, a text portion of a document that allows edits or comments to be inserted, a link in a web page or document for downloading a file or other information or any other graphical user interface element or control that can be interacted with by a user.

Process 500 includes receiving input based on a user's interaction with the interactive content (520). For example, a user may click a hyperlink, enter data in a form, click an email address, click on a view of an email inbox, edit text in a document, insert a comment in a document, request a download or otherwise interact with the clipping. Based on the user's input, clipping application 160, for example, may receive input in the form of a message indicating (1) a selection (e.g., the interactive content that the user selected such as a hyperlink, an email address, or a requested download), (2) the field that the user entered data in and the value of that data, or (3) the location and value of the edits/comments made to a document.

Process 500 includes determining an action desired from the received input (530). For example, clipping application 160 may determine that the desired action includes (1) requesting a particular web page or item for download, (2) enabling a user to send an email message to a particular entity, or (3) providing entered data (for example, a field in a form, or edits or comments in a document) to the content source as an update. The desired action may be determined by, for example, embedding information in each interactive portion of a clipped piece of content, the information indicating, for example, the type of interaction that is supported, the type of data that may be entered, the desired action, and the desired update to the presentation of the clipping. Alternatively, all or part of this information may be stored in a data structure and may be accessed when the interactive input is received for a given piece of interactive content.

Process 500 includes initiating or performing the desired action (540). Clipping application 160 may perform the desired action(s) (540) by itself, or may initiate the desired action(s) (540) and perform the desired actions with the assistance of one or more other components. For example, clipping application 160 may use a stand-alone browser to request a hyperlinked web page from an external system.

Process 500 includes updating the presentation of the clipping accordingly (550). Updating the presentation (550) may include, for example, (1) presenting the requested web page in the same presentation window in which the clipping was being presented, (2) presenting a pre-addressed but otherwise blank email form in the same presentation window in which the clipping was being presented, (3) echoing back the entered data to the presentation window or (4) launching an underlying application to allow full or partial interaction. In implementations in which the requested material (web page, email form, downloaded item, etc.) is to be presented outside of the clipping presentation, operation 550 may include highlighting the item that the user selected in the clipping presentation, or providing a message indicating the system's response (for example, "download complete"), or otherwise visually indicating that the request was received or completed. Operations 540 and 550 may be conflated in particular implementations in which the desired action is merely an updated presentation.

In one implementation, process 500 is performed entirely by clipping application 160. Presentation engine 250 may present a clipping of a web page that includes a button to download a music file (510), and may receive a user's selection of the button (520). Presentation engine 250 may provide the user's input to interactivity engine 240, and interactivity engine 240 may determine that a particular music file has been requested for download (530). Interactivity engine 240 may then initiate the request for the particular music file by forwarding the request to identification engine 210 or a stand-alone browser (540) which communicates with an external system to effect the download. Upon receipt of the requested music file, clipping engine 160 may use presentation engine 250 to update the presentation of the clipped content with a message that the download is complete or initiate a player/viewer for playing/viewing of the downloaded content (550).

A system, processes, applications, engines, methods and the like have been described above for clipping content associated with an area of interest from one or more content sources and presenting the clippings in an output device (e.g., a display). Clippings as described above can be derived from one or more content sources, including those provided from the web (i.e., producing a webview), a datastore (e.g., producing a docview) or other information sources.

Clippings as well can be used in conjunction with one or more applications. The clipping system can be a stand alone application, work with or be embedded in one or more individual applications, or be part of or accessed by an operating system. The clipping system can be a tool called by an application, a user, automatically or otherwise to create, modify and present clippings.

The clipping system described herein can be used to present clipped content in a plurality of display environments. Examples of display environments include a desktop environment, a dashboard environment, an on screen display environment or other display environment.

Described below are example instantiations of content, applications, and environments in which clippings can be created, presented or otherwise processed. Particular examples include a web instantiation in which web content is displayed in a dashboard environment (described in association with FIGS. 6-34). Other examples include "widget" (defined below) instantiation in a desktop display environment. Other instantiations are possible.

Web Instantiation

A dashboard, or sometimes referred to as a "unified interest layer", includes a number of user interface elements. The dashboard can be associated with a layer to be rendered and presented on a display. The layer can be overlaid (e.g., creating an overlay that is opaque or transparent) on another layer of the presentation provided by the presentation device (e.g. an overlay over the conventional desktop of the user interface). User interface elements can be rendered in the separate layer, and then the separate layer can be drawn on top of one or more other layers in the presentation device, so as to partially or completely obscure the other layers (e.g., the desktop). Alternatively, the dashboard can be part of or combined in a single presentation layer associated with a given presentation device.

One example of a user interface element is a widget. A widget generally includes software accessories for performing useful, commonly used functions. In general, widgets are user interfaces providing access to any of a large variety of items, such as, for example, applications, resources, commands, tools, folders, documents, and utilities. Examples of widgets include, without limitation, a calendar, a calculator, and address book, a package tracker, a weather module, a clipview (i.e., presentation of clipped content in a view) or the like. In some implementations, a widget may interact with remote sources of information (such as a webview discussed below), such sources (e.g., servers, where a widget acts as a client in a client-server computing environment) to provide information for manipulation or display. Users can interact with or configure widgets as desired. Widgets are discussed in greater detail in concurrently filed U.S. patent application entitled "Widget Authoring and Editing Environment." Widgets, accordingly, are a container that can be used to present clippings, and as such, clipping application 160 can be configured to provide as an output a widget that includes clipped content and all its attending structures. In one implementation, clipping application 160 can include authoring tools for creating widgets, such widgets able to present clipped content.

In one particular implementation described in association with FIGS. 6-34, a clipping application allows a user to display a clipping of web content. The clip is displayed in a window of a widget created by the clipping application, and both the widget and the clipping application are separate from the user's browser. The clipping application allows the user to size the window, referred to as a webview, and to select an area of interest from the (one or more) web page(s). The content from the area of interest, including hyperlinks, radio buttons, and other interactive portions, is displayed in the webview and is refreshed automatically, or otherwise by the clipping application or other refresh source to provide the user with the latest (or appropriate) content from the area of interest.

In this instantiation, the clipping application 160 stores identifying information for the webview as a non-transitory file that the user can select and open. By storing the identifying information as a file, the clipping application enables the user to close the webview and later to reopen the webview without having to repeat the procedure for selecting content and for sizing and positioning the webview. The identifying information includes, for example, a uniform resource locator ("URL") of the one or more web pages, as well as additional information that might be required to locate and access the content in the selected area of interest. The identifying information also may include the latest (or some other version, such as the original clipping) content retrieved from the area of interest. Thus, when the user reopens a webview, the clipping application may use the identifying information to display the latest contents as well as to refresh those contents.

Referring to FIGS. 6-35, we now describe specific implementations, and we include a description of a significant number of details to provide clarity in the description. The first specific implementation involves a clipping application 160 in which a presentation engine 250 provides a widget on a dashboard, as described in part in U.S. patent application Ser. No. 10/877,968 and U.S. Provisional Patent Application No. 60/642,025, both of which were incorporated by reference above. The widget is configured to include a webview, a particular instantiation of a clipview (the webview representing a particular instantiation of a widget as well), for displaying content from a selected area of interest from one or more web pages. The webview may be refreshed at a user-specified interval, automatically, or otherwise and the webview may be closed and reopened preferably without losing configuration information or the clipped content. However, as one of ordinary skill in the art appreciates, and as discussed both before and after the description of this specific implementation, many details and features may be varied, such as, for example, supporting other types of content, providing other mechanisms for presenting clipped content, or providing different configuration parameters. Thereafter, a second specific implementation is presented with reference to a viewer displayed on a desktop of a computing device.

Figure 6:
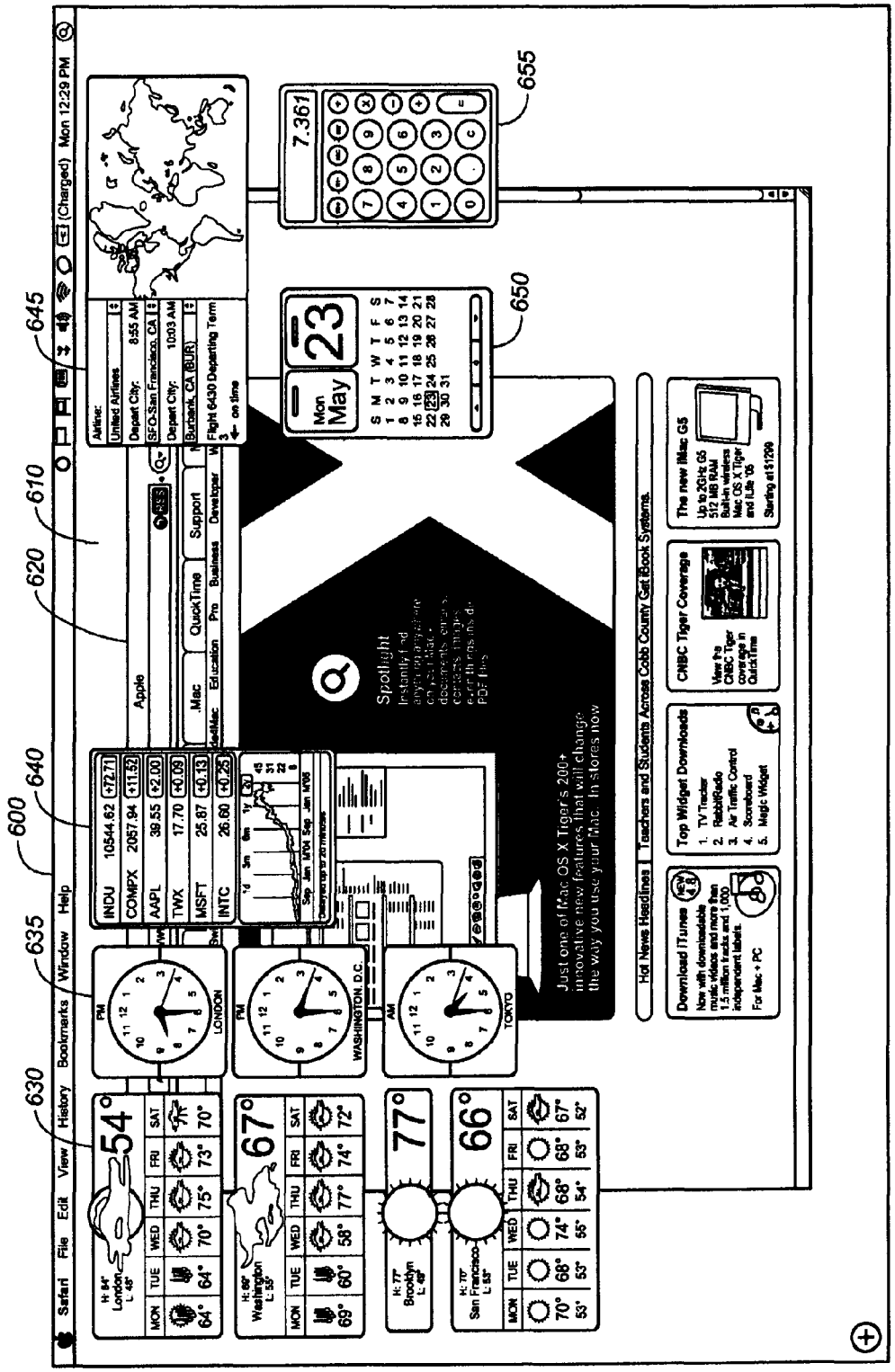
FIG. 6 is a screen shot showing a dashboard.

Referring to FIG. 6, a screen shot 600 shows a dashboard 610 including a plurality of webview widgets opened on a computer screen with a Safari® application 620 visible in the background. Safari® is a browser produced by Apple Computer, Inc. As explained in U.S. patent application Ser. No. 10/877,968 and U.S. Provisional Patent Application No. 60/642,025, both of which were incorporated by reference above, an implementation of a dashboard may include a layer that is presented on a computer screen and that overlays other items (for example, a desktop, windows, icons or other graphical elements) being displayed. The overlay may be translucent to enable the overlaid items to be discernible or opaque, and the overlay includes widgets (which may or may not be translucent). As discussed above, widgets are user interfaces providing access to any of a large variety of items, such as, for example, applications, resources, commands, tools, folders, documents, and utilities. When dashboard 610 is activated, the display of other applications may be in one implementation darkened partially to indicate that dashboard 610 is active. Dashboard 610 includes a series of widgets, e.g., weather widgets 630, clock widgets 635, a stock quote widget 640, a flight information widget 645, a calendar widget 650, and a calculator widget 655. Some or all of Widgets 630-655 may provide clippings according to one or more of the implementations described in this disclosure. In particular, widgets 630, 640, and 645 as shown, obtain content from the World Wide Web, in which case, the content display portions of widgets 630, 640, and 645 display web clips and may be referred to as webviews. Widgets that display web content (such as widgets 630, 640 and 645) are referred to as webview widgets. Though this instantiation includes webview widgets as part of a dashboard, other instantiations are possible, including those where webview widgets are presented in other display environments, such as a desktop.

Figure 7:
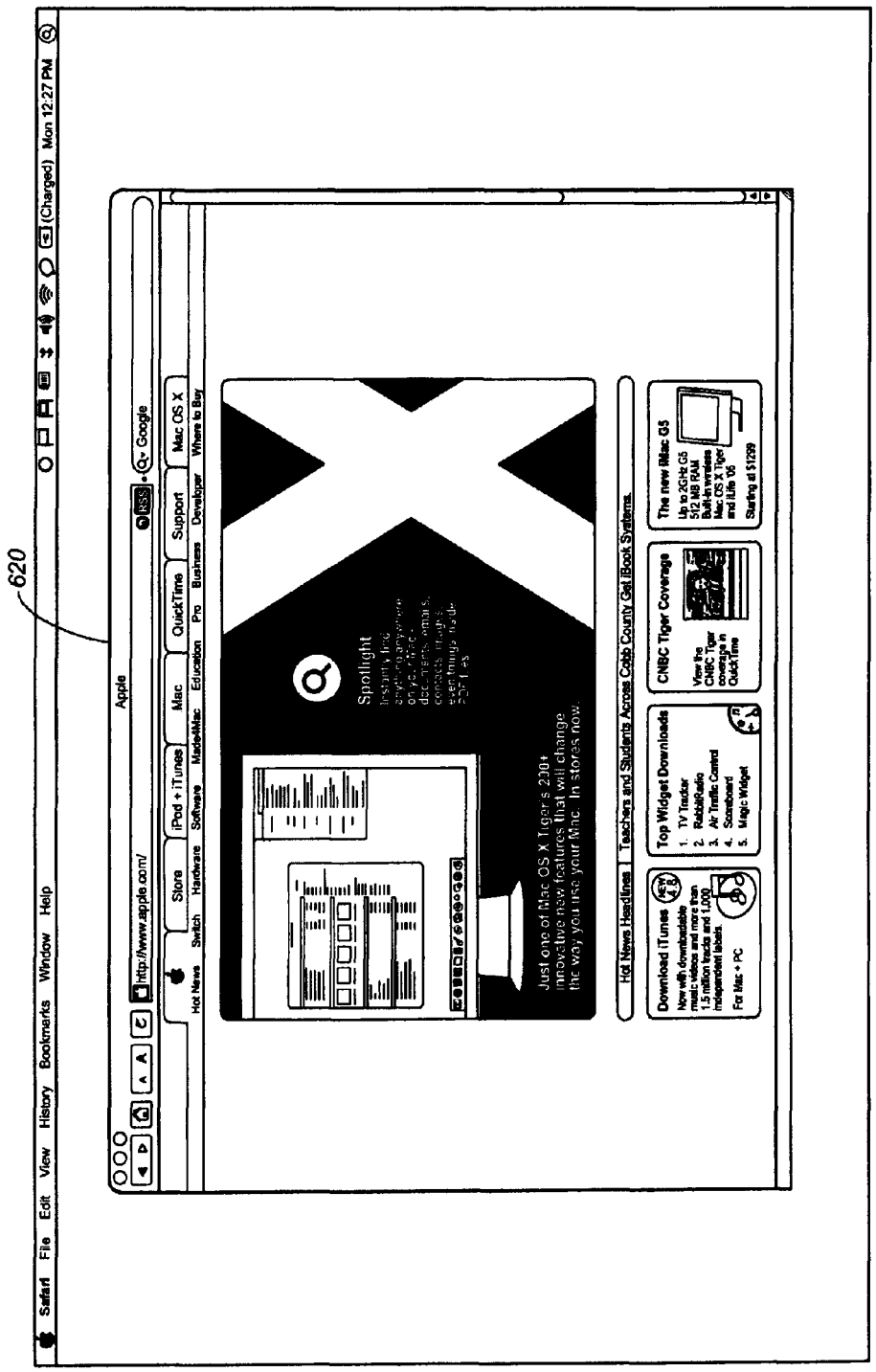
FIG. 7 is a screen shot showing a browser with selected content.

Referring to FIG. 7, a screen shot 700 shows Safari® application window 620 in the foreground. With Safari® application window 620 now in the foreground, it can be seen that the apple.com web site is loaded in window 620. This is one of a number of possible starting points for creating a webview as discussed above. Once a particular webpage has been identified, the clipping application can be initiated. Initiation can occur automatically, or by user prompt. Other means of initiating the clipping application outside of the dashboard are possible, including by an authoring application, by user interaction, by a call or the like as described above.

Figure 8:
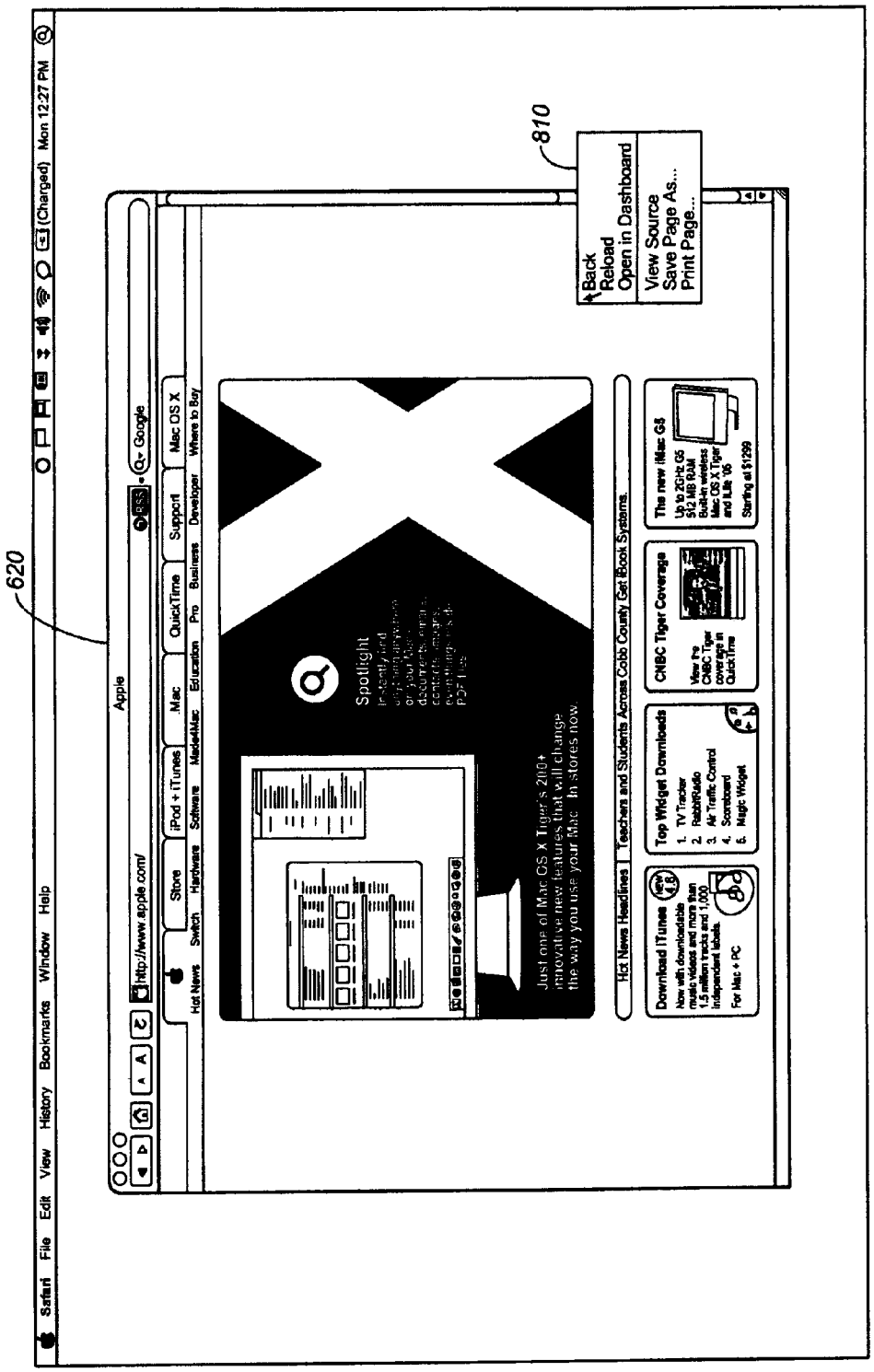
FIG. 8 is a screen shot showing a contextual menu in the browser of FIG. 7.
Figure 9:
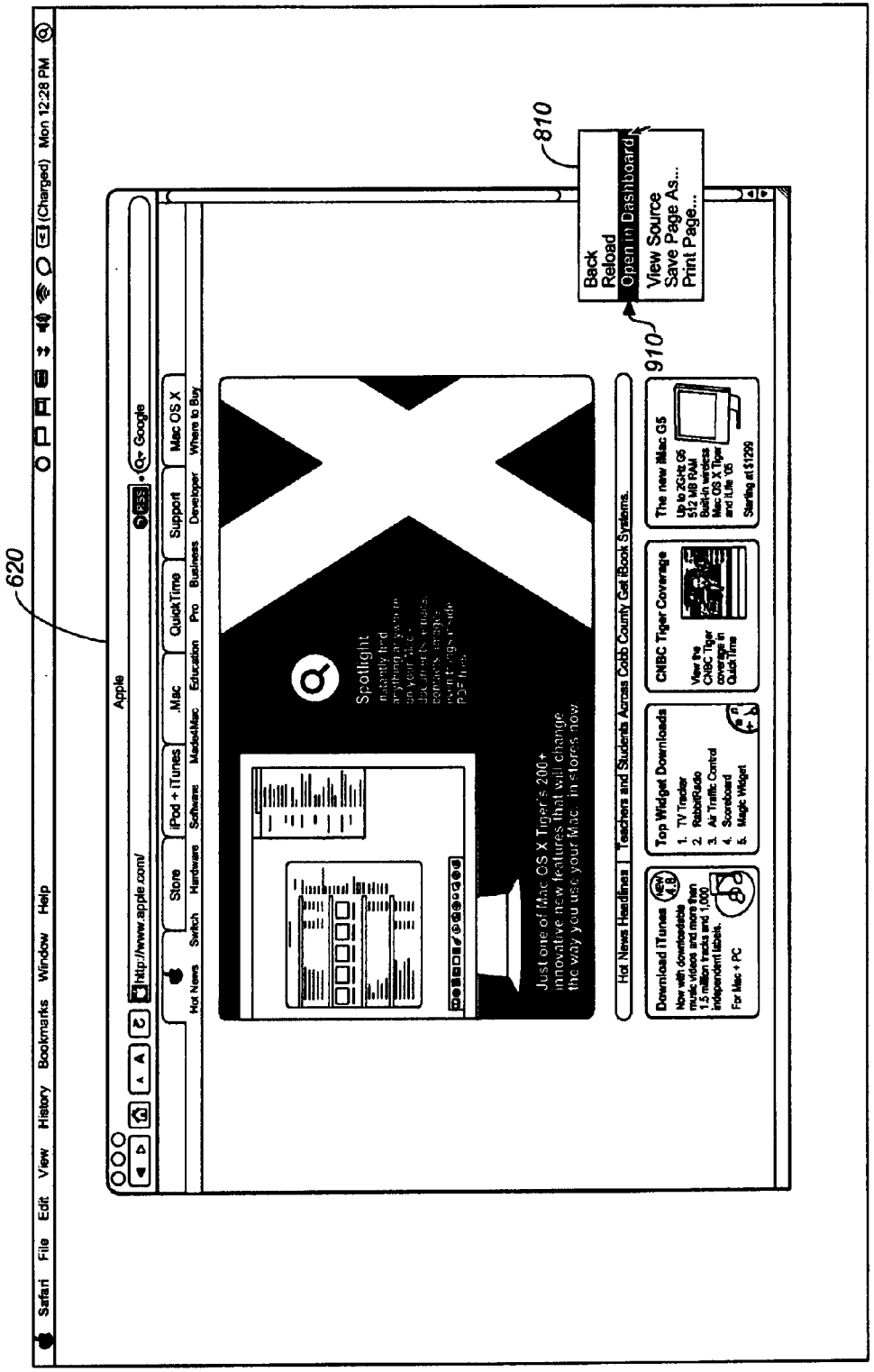
FIG. 9 is a screen shot showing the contextual menu of FIG. 8 with a menu item selected.

Referring to FIG. 8, a screen shot 800 shows a contextual menu 810 displayed from within the Safari® application. Referring to FIG. 9, a screen shot 900 shows contextual menu 810 with a menu item 910 labeled "Open in Dashboard" being selected. By selecting the menu item "Open in Dashboard", the clipping engine can be initiated.

Figure 10:
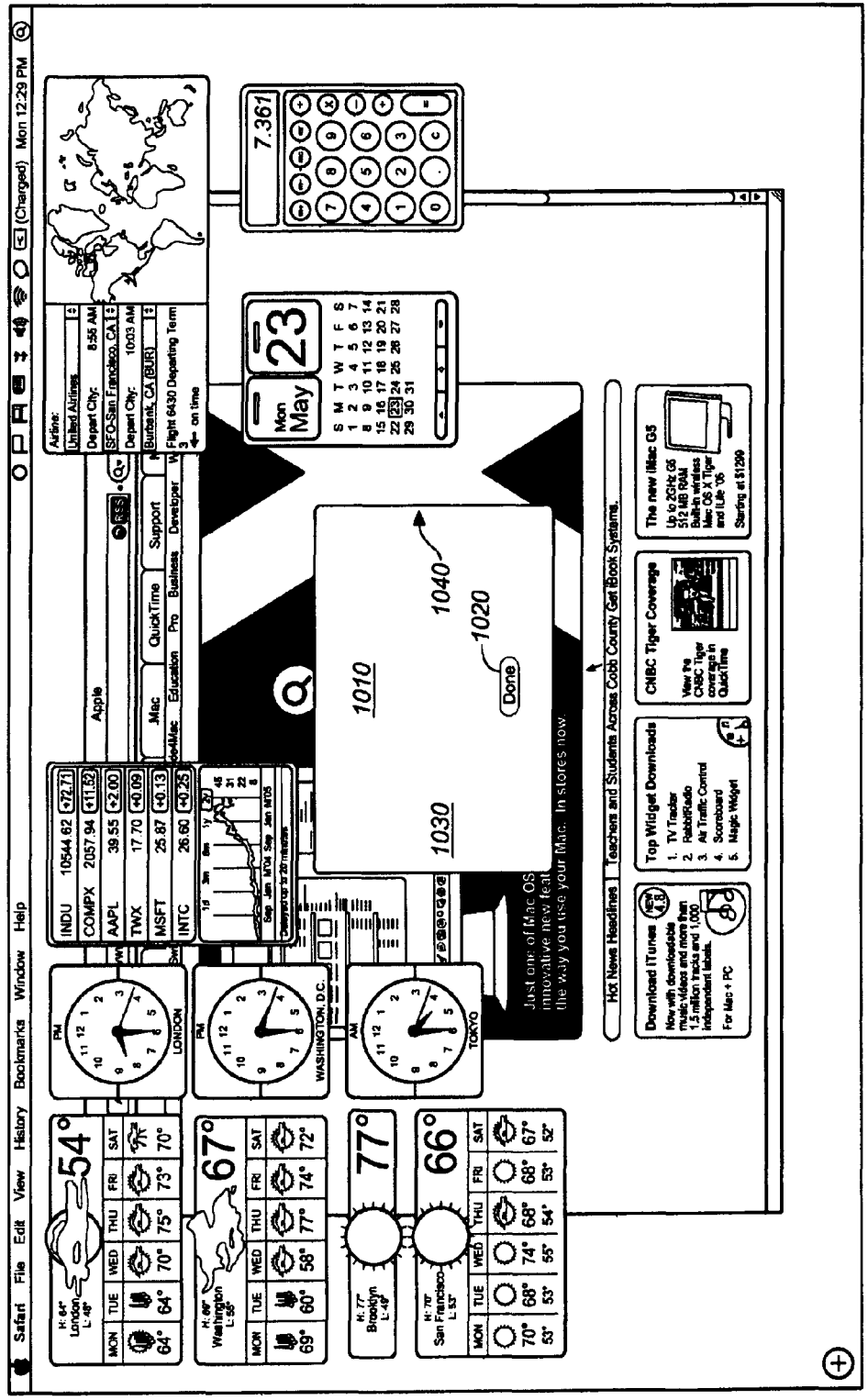
FIG. 10 is a screen shot showing a result of selecting the selected menu item from FIG. 9.

Referring to FIG. 10, a screen shot 1000 shows a result of selecting menu item 910. The result is that a new web clip widget 1010 (i.e., a webview widget) is created. Widget 1010 includes a "Done" button 1020 that may be selected by a user when the process of configuring widget 1010 is complete. To create widget 1010, identification engine 210, and focus engine 214 in particular, may identify that a new window needs to be displayed. Focus engine 214 may identify the default size, shape and screen position for a new window, and the frame and controls (for example, the "Done" button 1020 and a control 2910 discussed below) of the new window. Presentation engine 250 may then present the new window as widget 1010, including a view portion 1030 (the clipped portion), a frame 1040, and controls.

Figure 11:
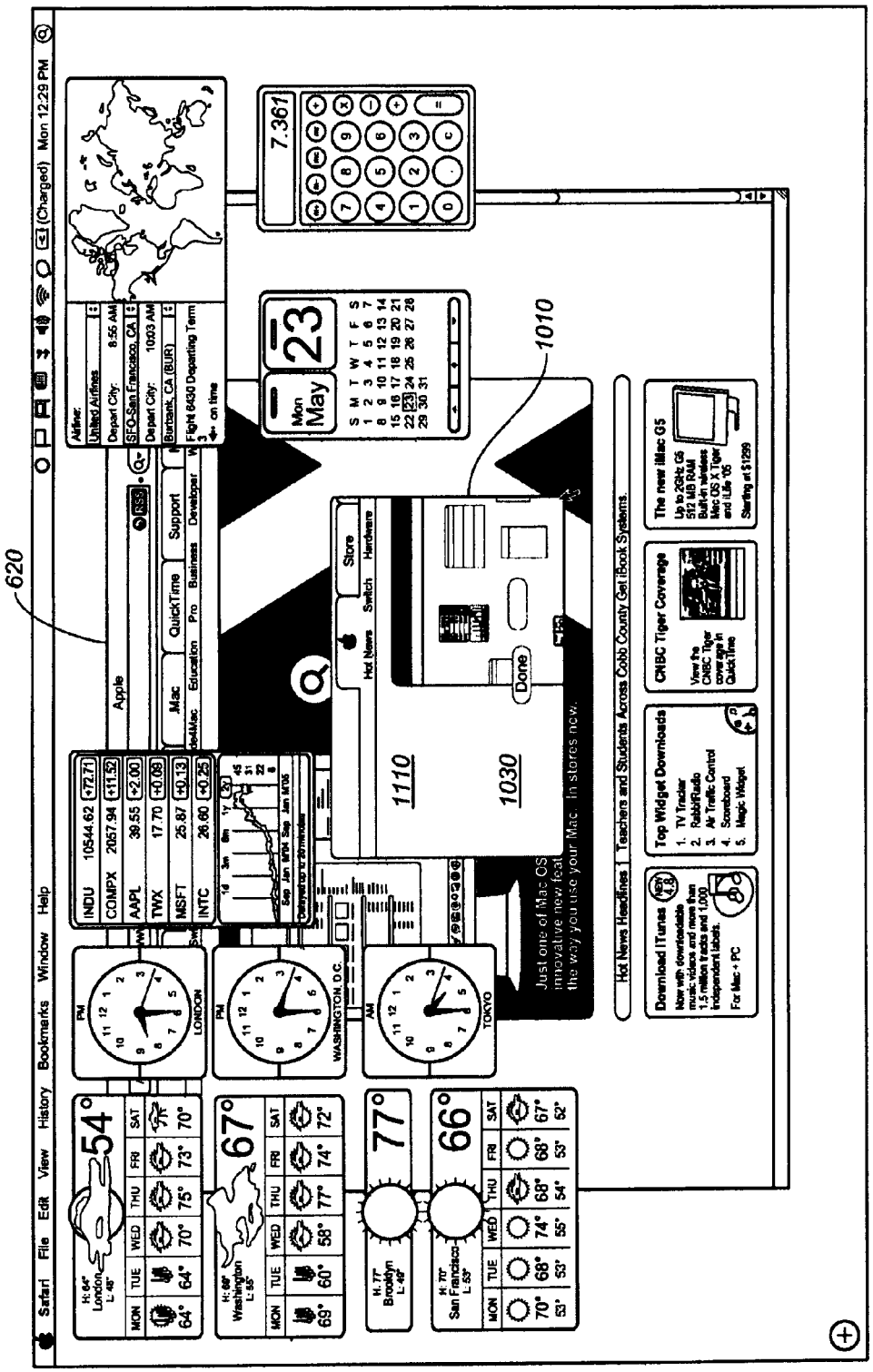
FIG. 11 is a screen shot showing a widget loaded with the selected content.
Figure 12:
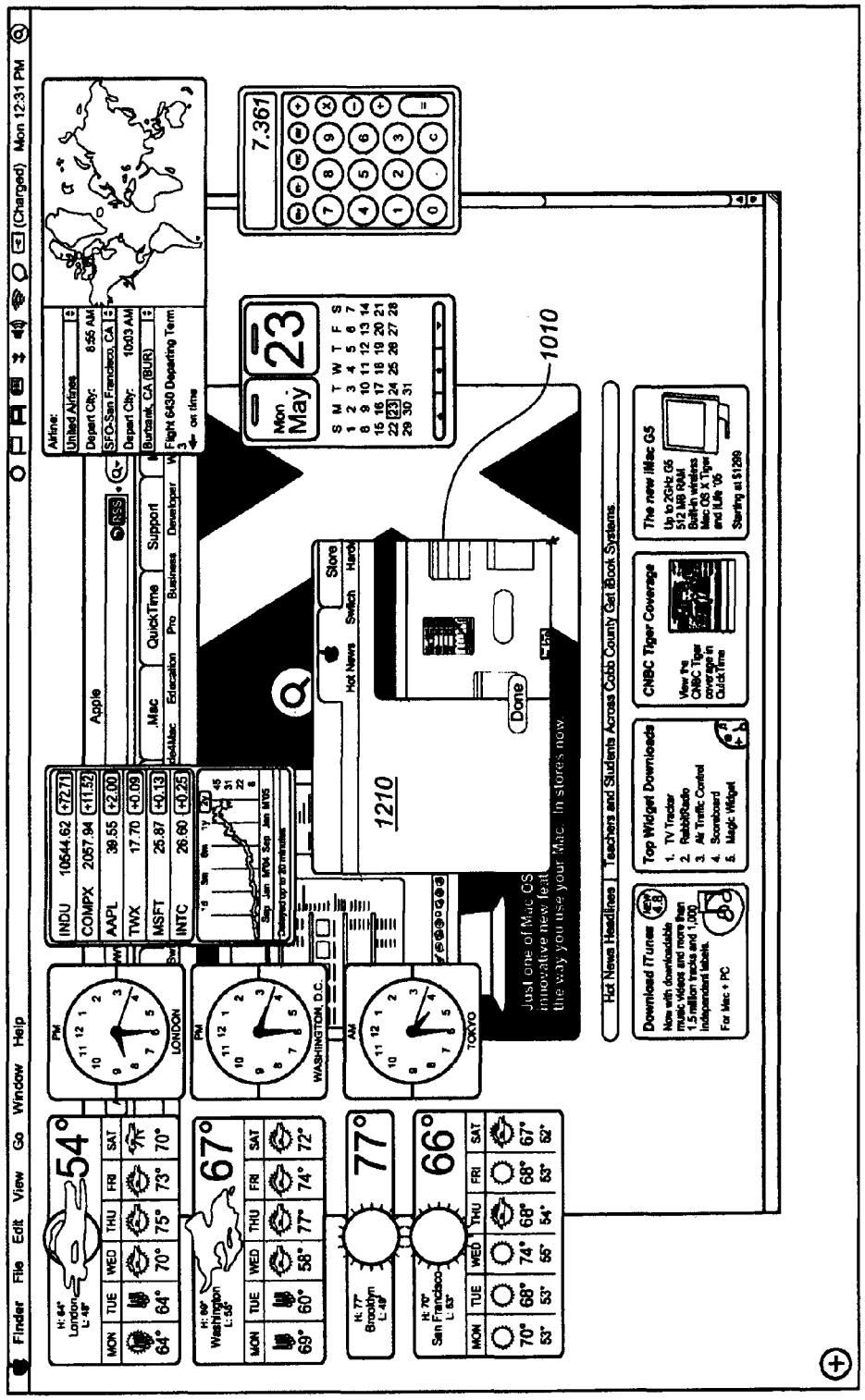
FIGS. 12-15 are a series of screen shots showing the widget of FIG. 11 being resized.
Figure 13:
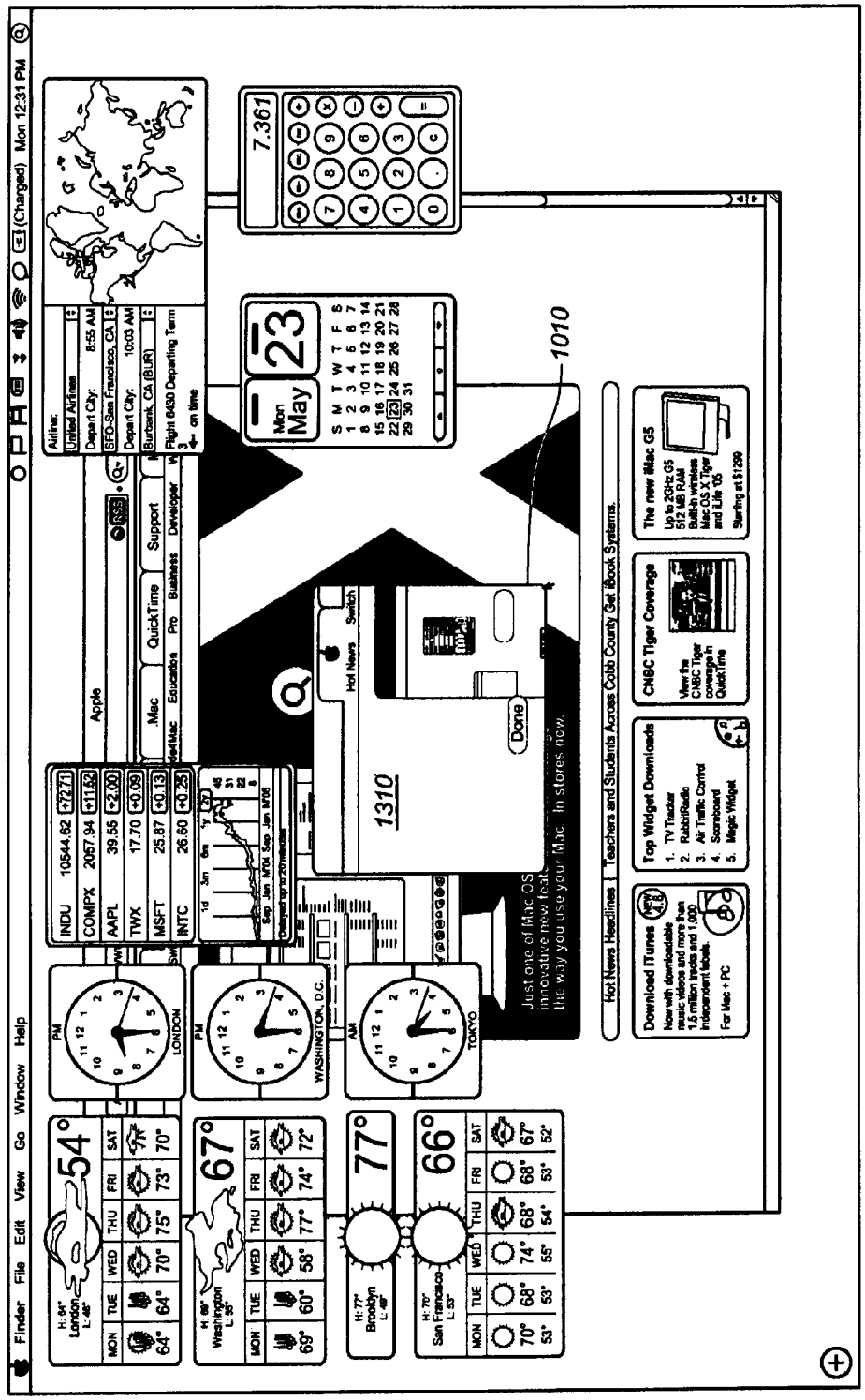
Figure 14:
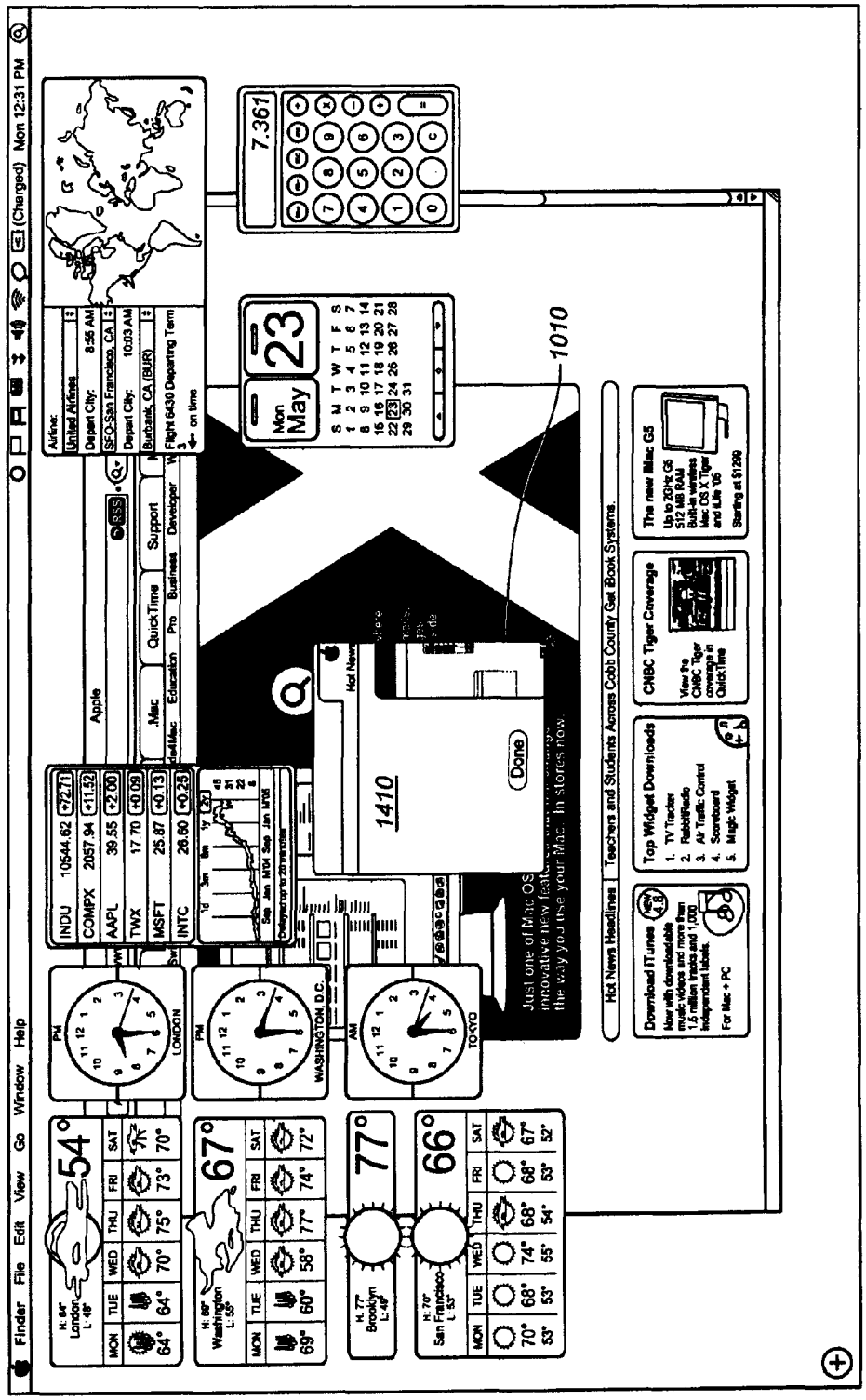
Figure 15:
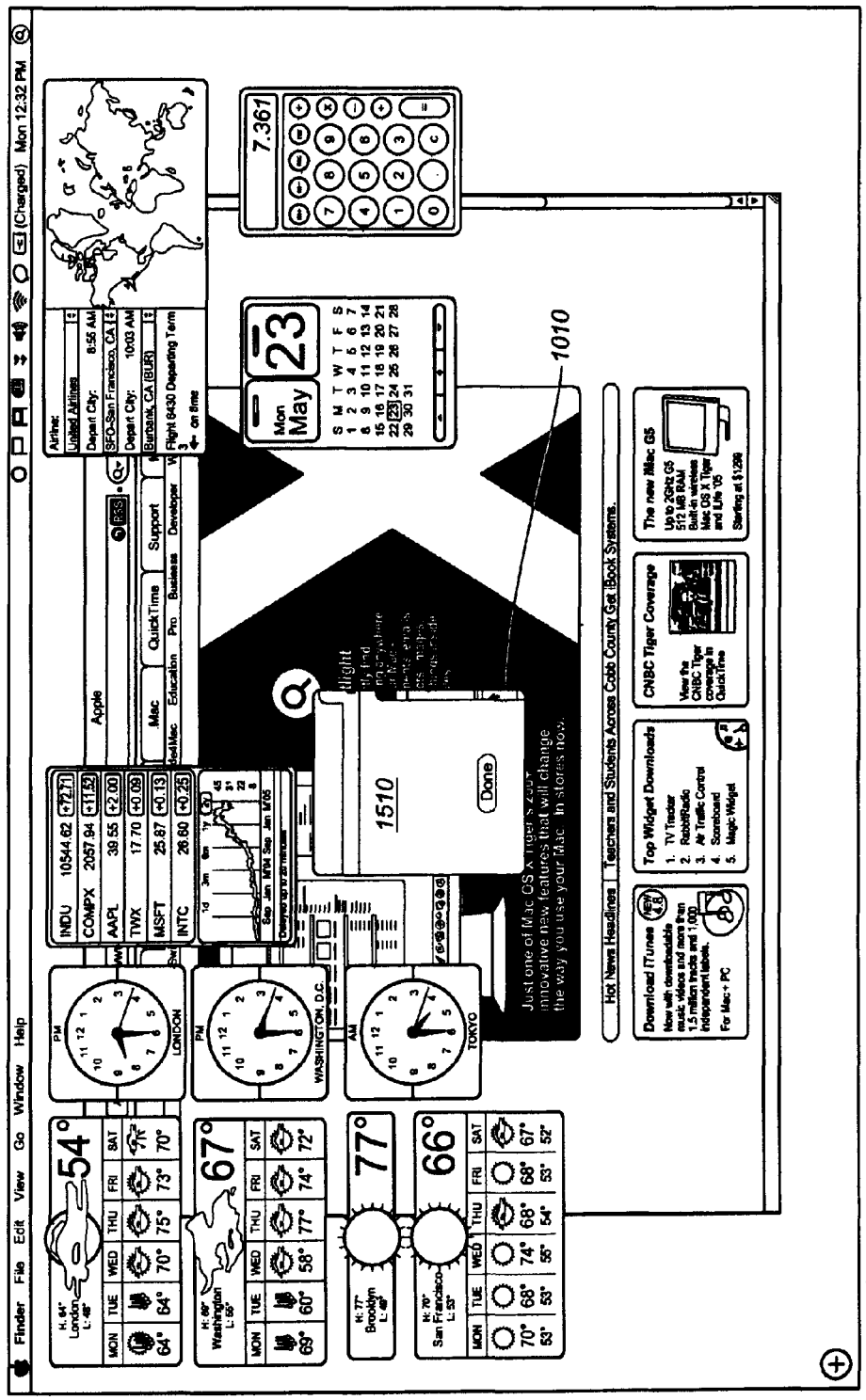
Figure 16:
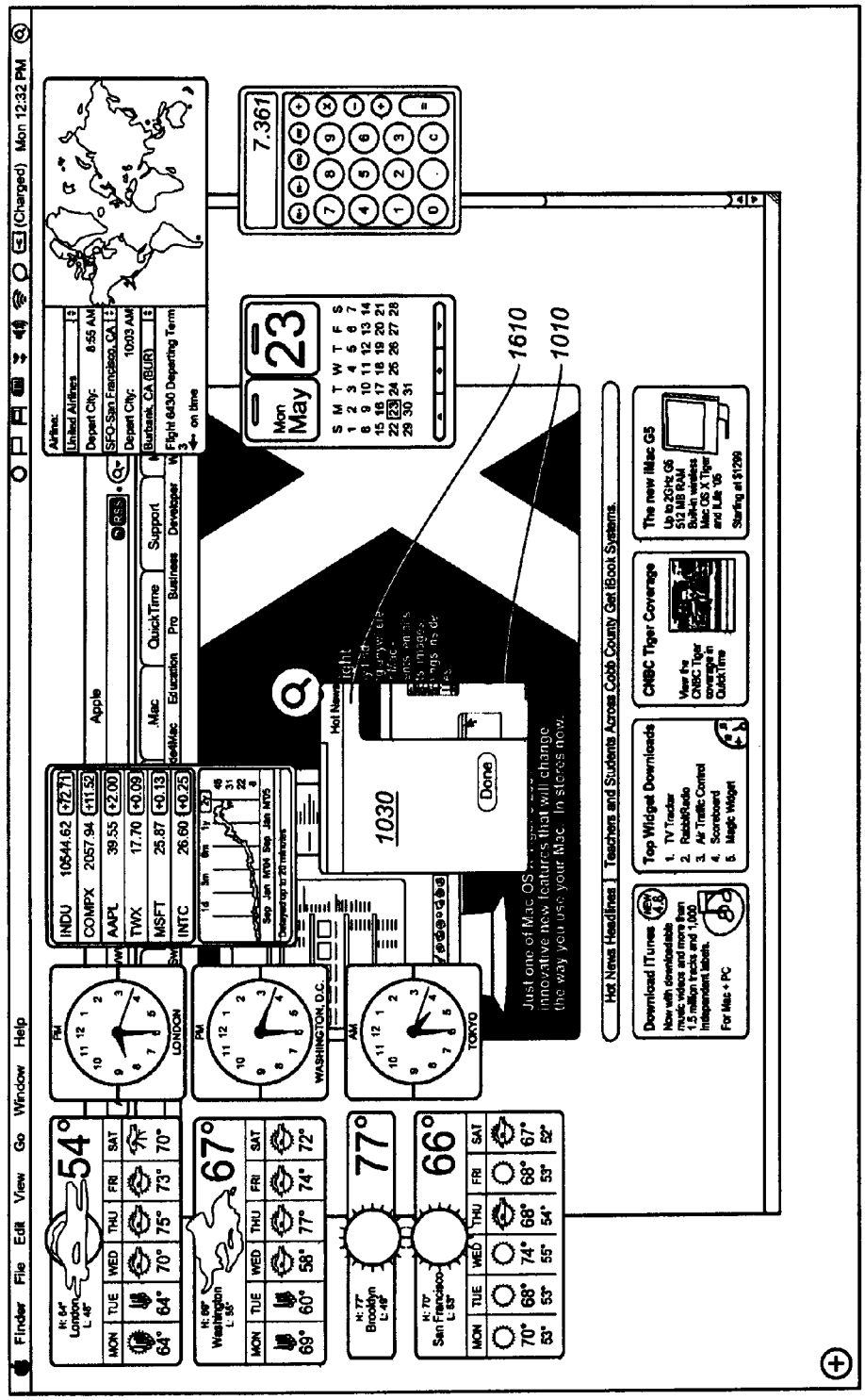
FIGS. 16-23 are a series of screen shots showing the selected content being repositioned within the widget of FIG. 15.
Figure 17:
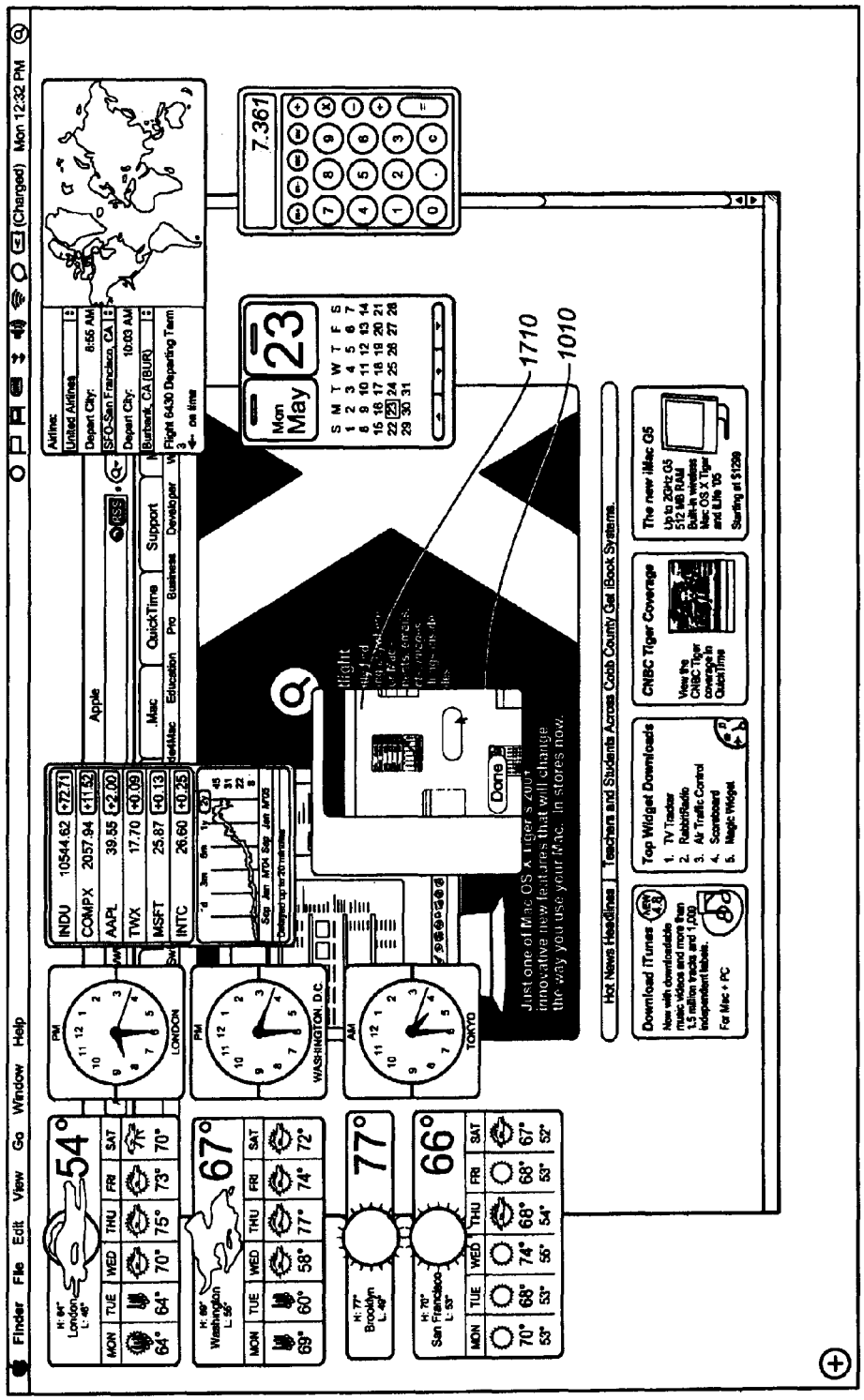
Figure 18:
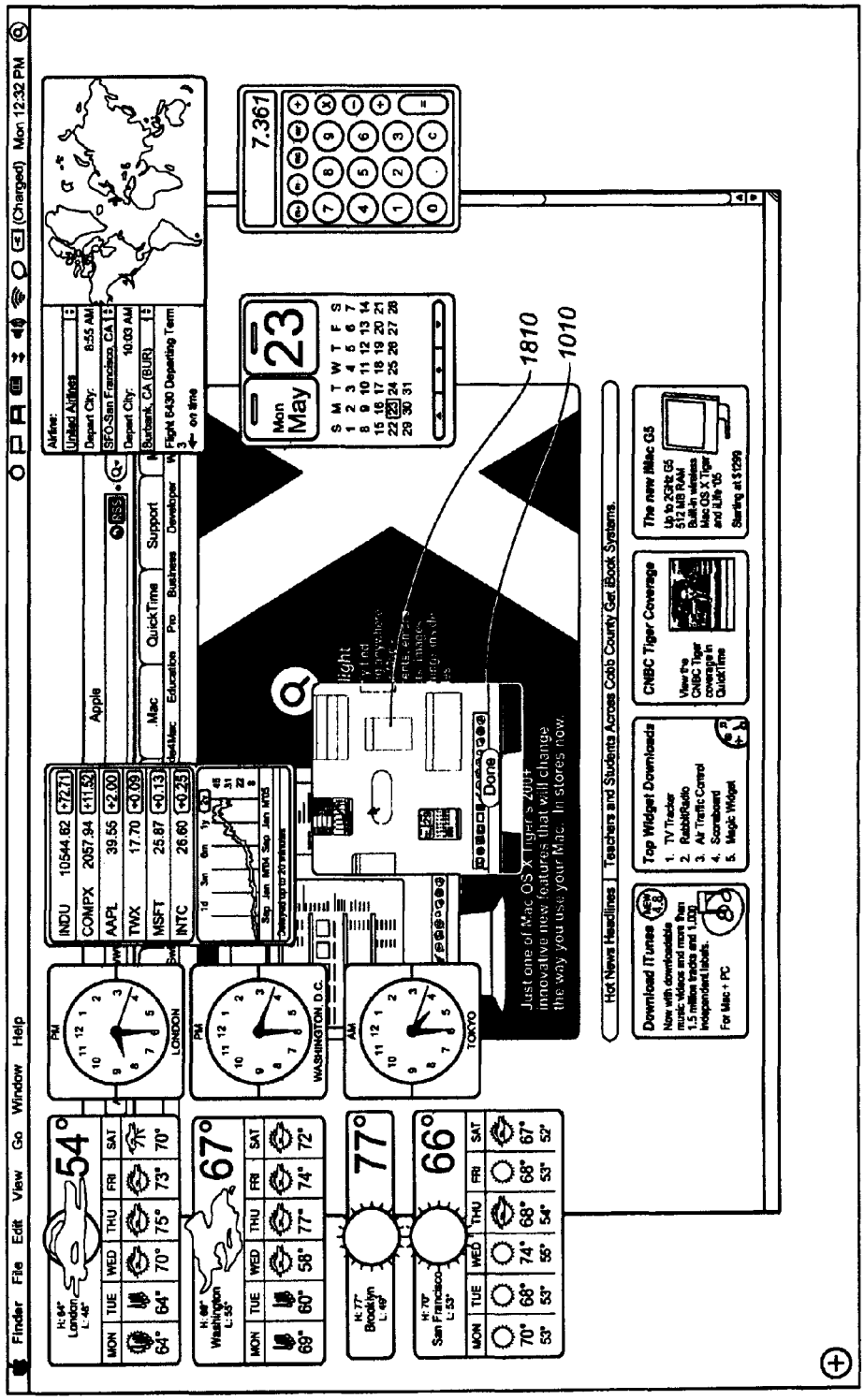
Figure 19:
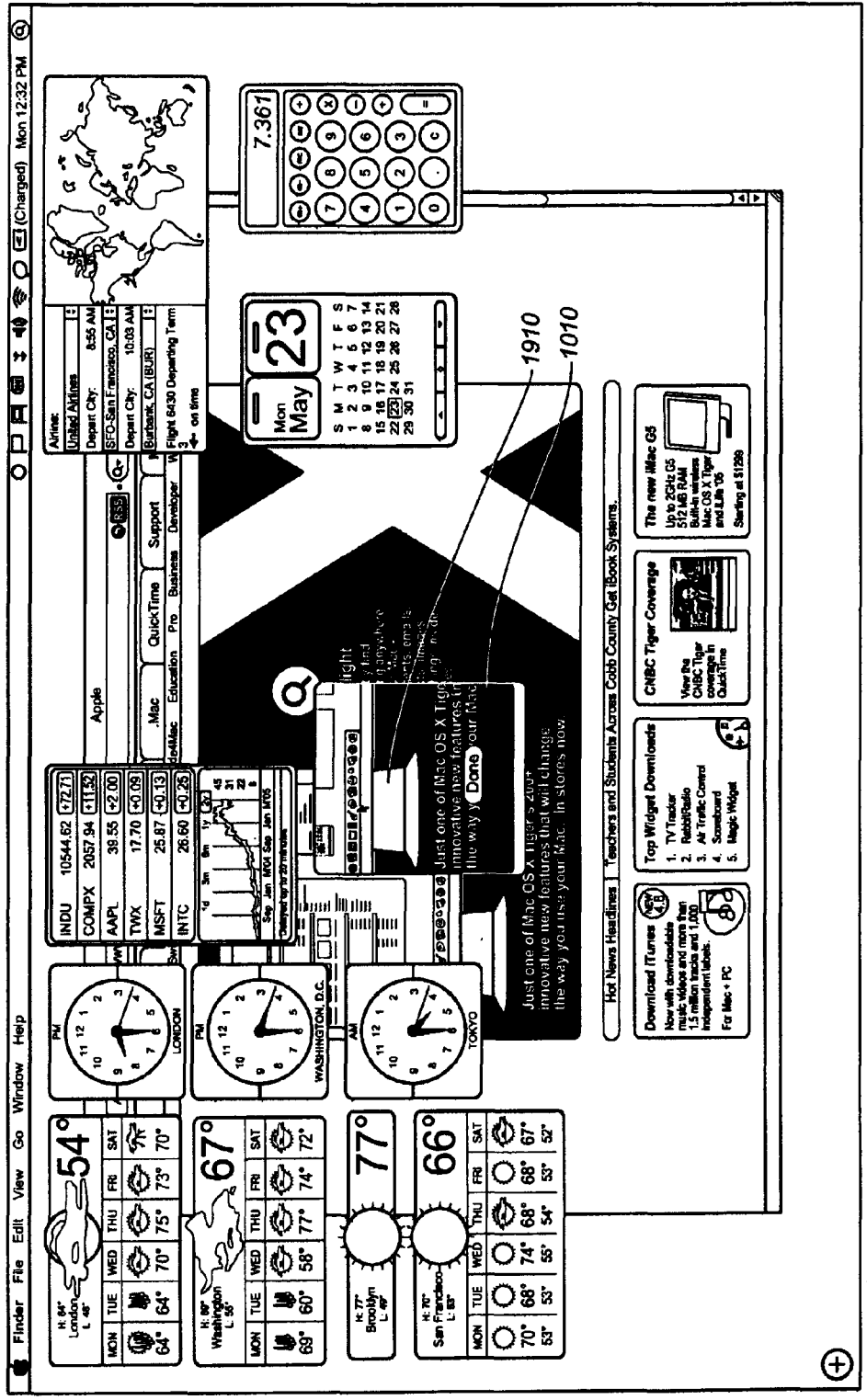
Figure 20:
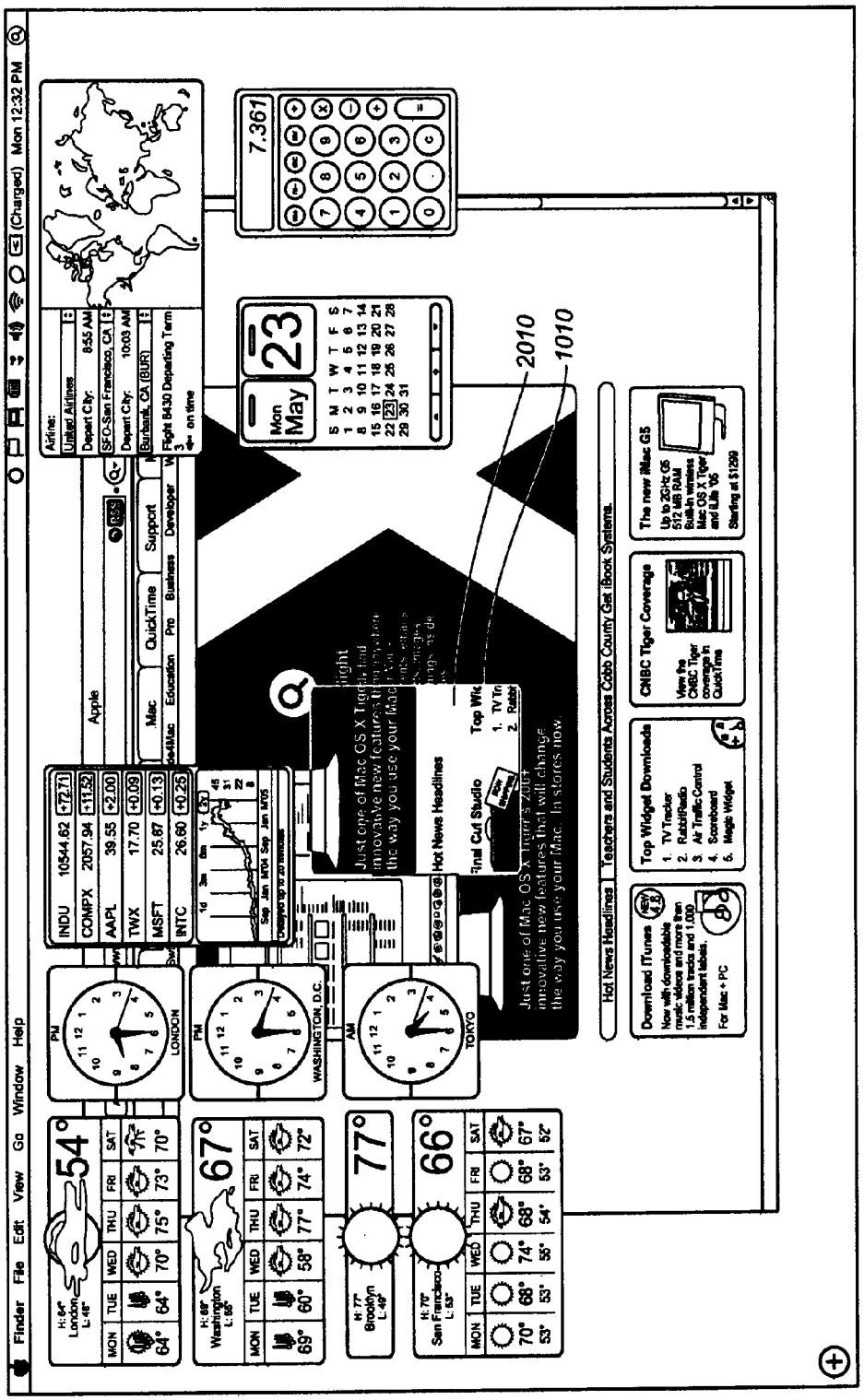
Figure 21:
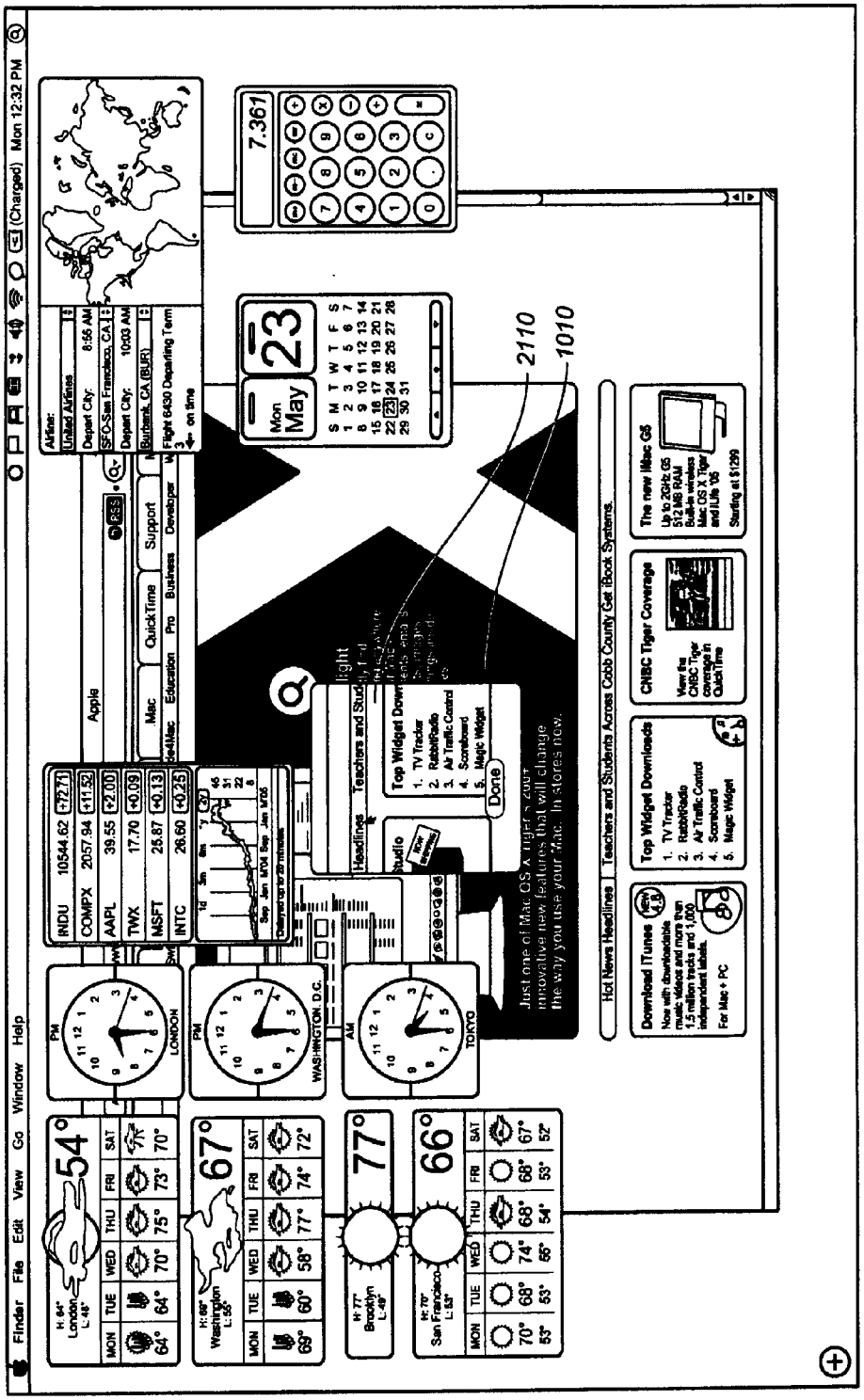
Figure 22:
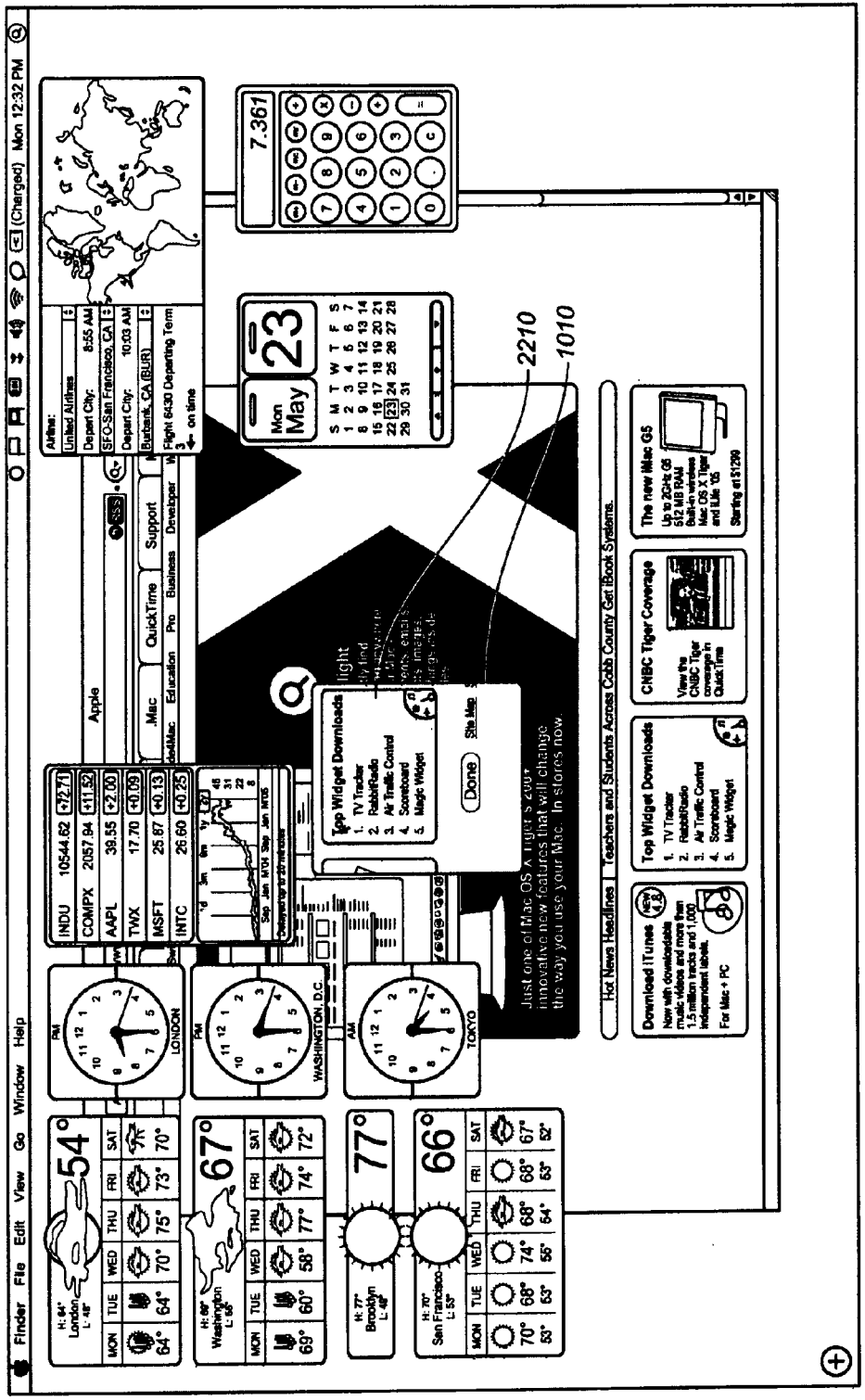
Figure 23:
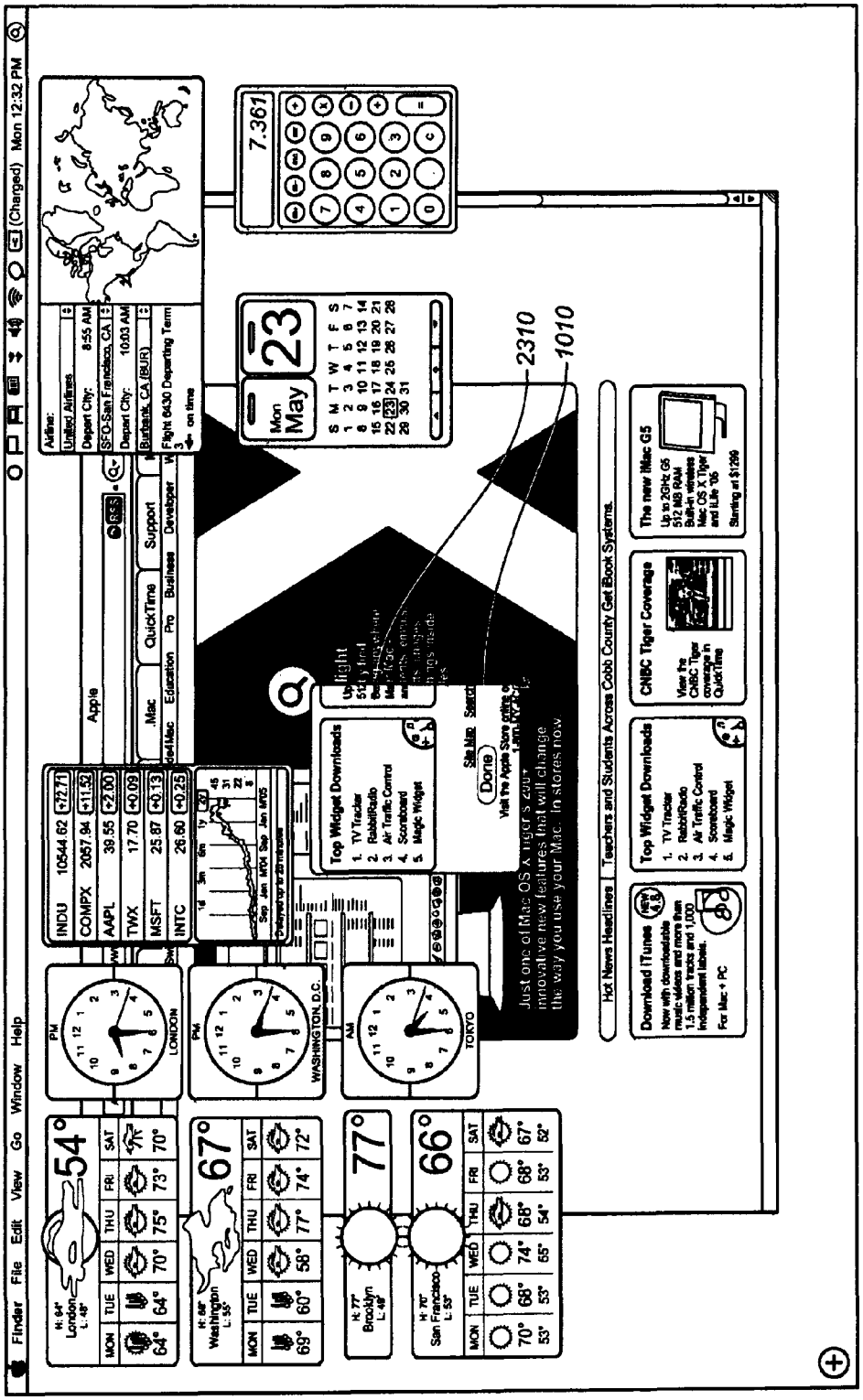

Referring to FIG. 11, a screen shot 1100 shows widget 1010 loaded with the apple.com web site to providing a webview 1110 (the term webview when accompanied by a reference number is used particularly to identify a presentation made to the user. In general, and as described as above, a webview is an instantiation of a clipping (a clipview) and contains all aspects, functional, programmatic and otherwise for creating a clipping of web content). The apple.com web site, or a portion thereof, is thus displayed in the background in Safari® application window 620 and in widget 1010. To load the apple.com web site into widget 1010, focus engine 214 may access the content directly from the Safari® application or access the content identifier and download the apple.com web page. Rendered data may be available from the Safari® application, or render engine 218 may render the apple.com web page. Presentation engine 250 may then display the rendered apple.com web page using a default positioning in which the top left corner of the apple.com web page is also positioned in the top left corner of view portion 1030 of widget 1010.

Referring to FIGS. 12-15, screen shots 1200-1500 show widget 1010 being resized to produce a series of webviews 1210, 1310, 1410, and 1510. Webviews 1210, 1310, 1410, and 1510 are displayed in a view window The bottom right corner of widget 1010 is being moved up and to the left to produce webviews 1210-1510 of progressively smaller sizes. Widget 1010 may be resized by a user using, for example, a mouse to drag a corner to a new location. Other methods or tools may be used to position, focus, and ultimately identify an area of interest in one or more web pages. For example, clipping tools, selection tools, and navigation tools can be used to locate, present and select desired portions of content to be included in an area of interest, which is ultimately displayed in the webview. In one instantiation, a clip board of clipped content is maintained to allow a user to select and gather non-contiguous or un-related content (e.g., non-contiguous portions of one web page, or portions from multiple web pages). The clip board can be associated with identification engine 210 or focus engine 214 of FIG. 2.

Referring to FIGS. 16-23, screen shots 1600-2300 show the apple.com web site being repositioned within widget 1010 so that the portion of the apple.com web site that is displayed in widget 1010 is modified. The content may be repositioned by the user using, for example, a mouse to drag the displayed content across view portion 1030 of widget 1010, or scroll bars (not shown). The content of the apple.com web site appears to gradually move up and to the left in widget 1010, producing a series of webviews 1610-2310 until the area of interest in the apple.com web site is positioned in the top left corner of widget 1010. Other methods or tools may be used to reposition, focus, and ultimately identify an area of interest in one or more web pages.

Figure 24:
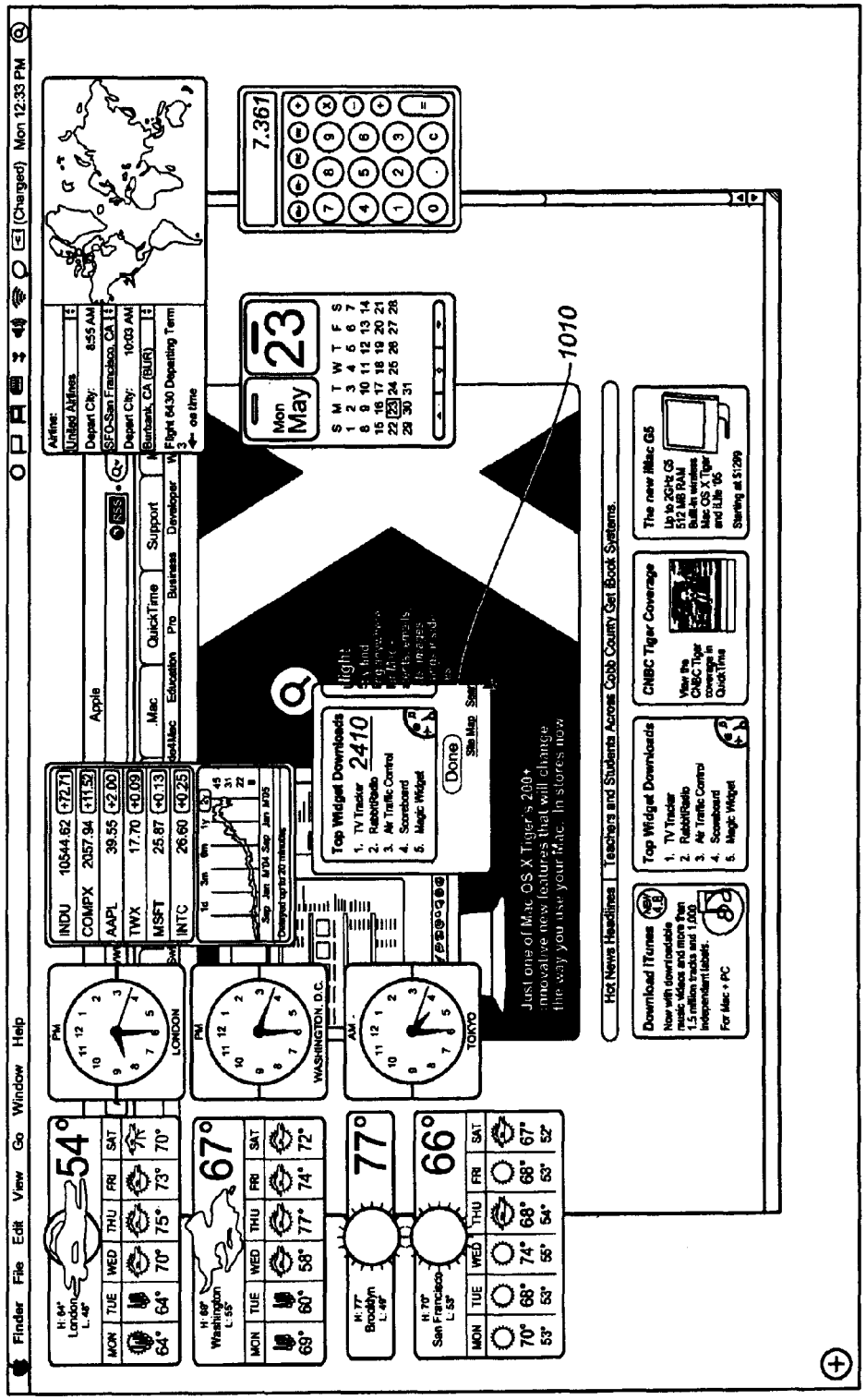
FIGS. 24-26 are a series of screen shots showing the widget of FIG. 23 being resized.
Figure 25:
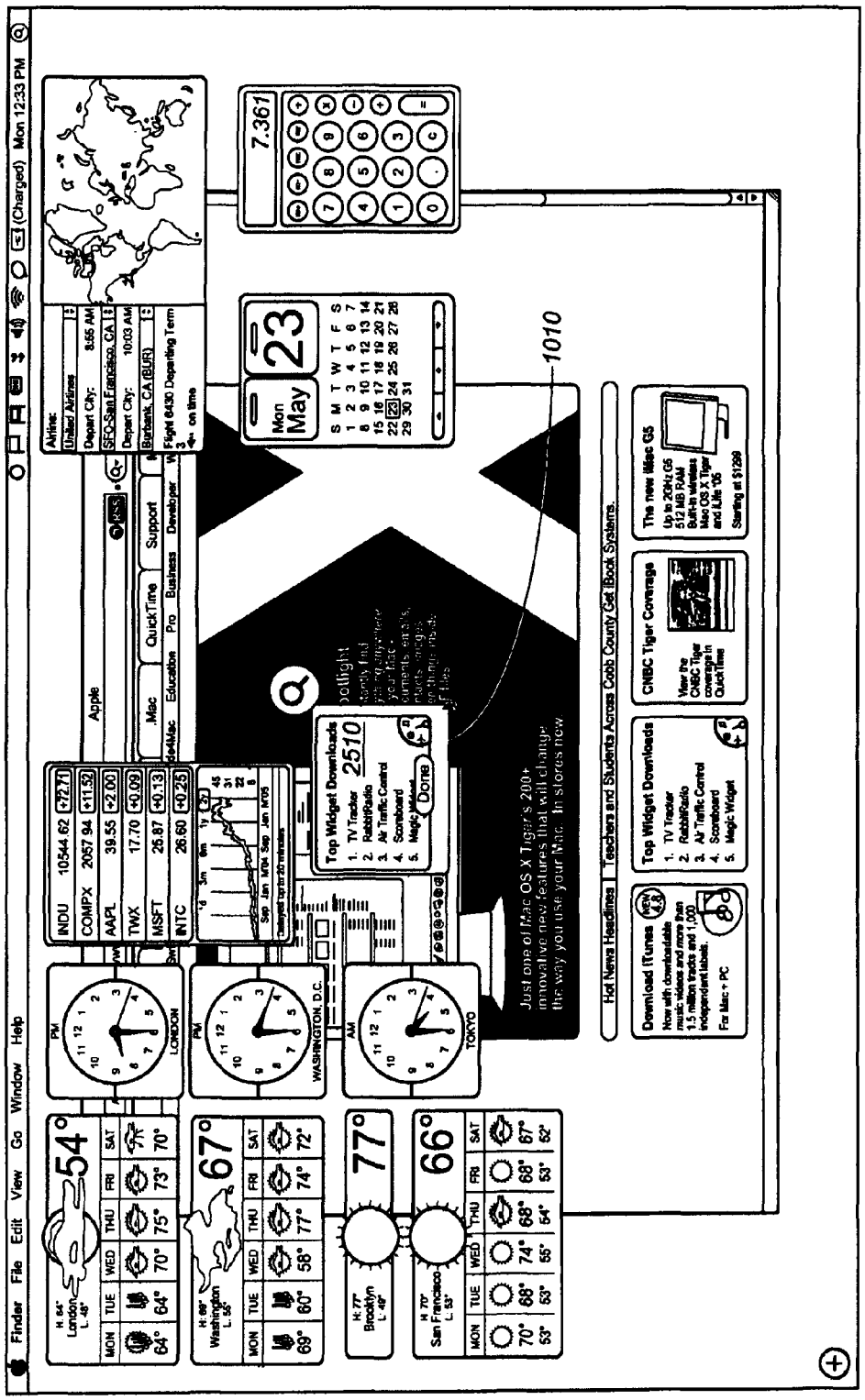
Figure 26:
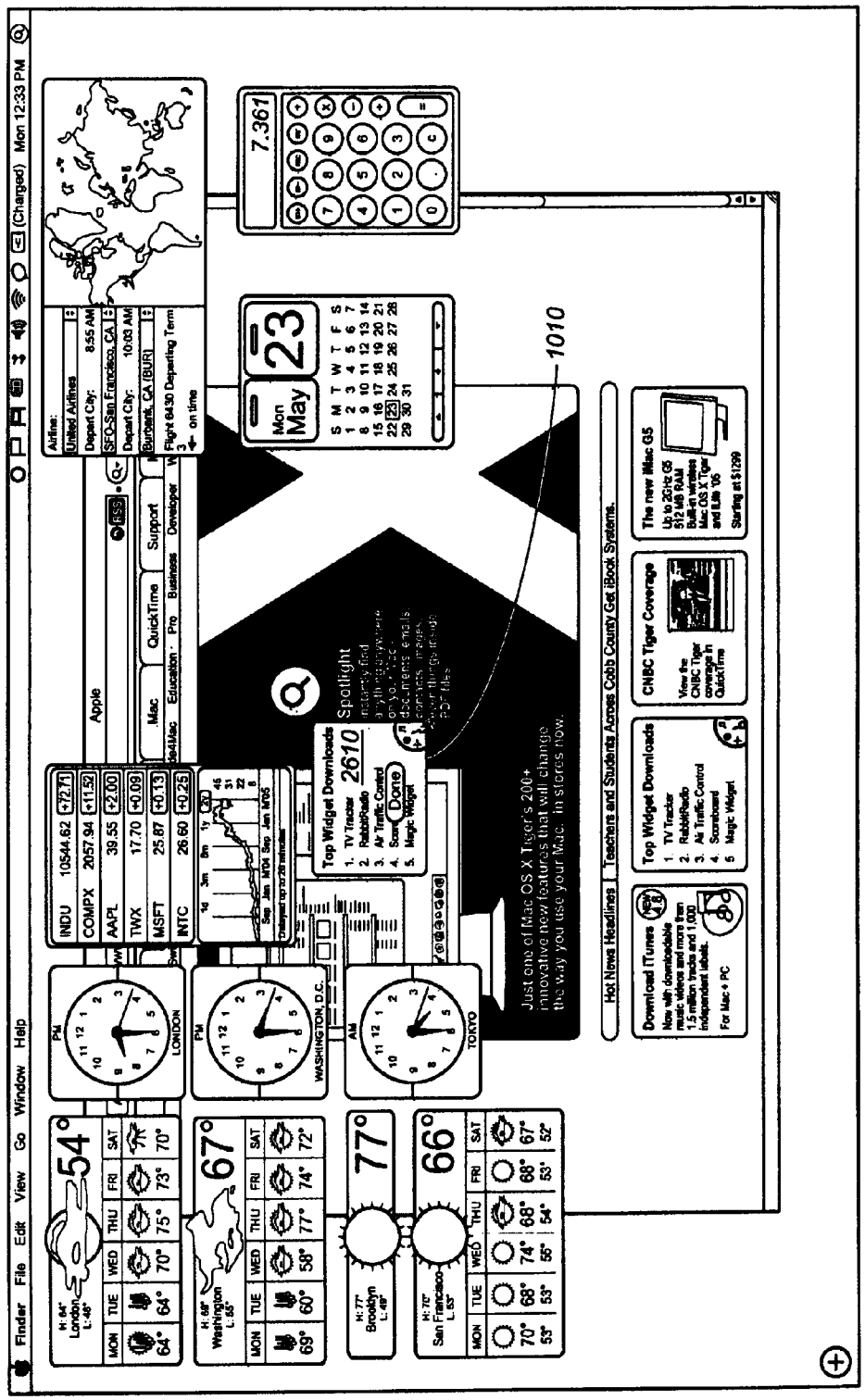

Referring to FIGS. 24-26, screen shots 2400-2600 show widget 1010 being further resized to produce a series of webviews 2410, 2510, and 2610. The bottom right corner of widget 1010 is being moved up and to the left to produce webviews 2410-2610 of progressively smaller sizes. Widget 1010 is being decreased in size to further select the area of interest that will be displayed in widget 1010. The process of resizing widget 1010 after the area of interest is within the display portion of widget 1010 may be referred to as cropping widget 1010 around the area of interest. As with resizing widget 1010 in FIGS. 12-15, widget 1010 may be cropped by using various controls, such as, for example, a mouse to click and drag a corner or a side of frame 1040.

Figure 27:
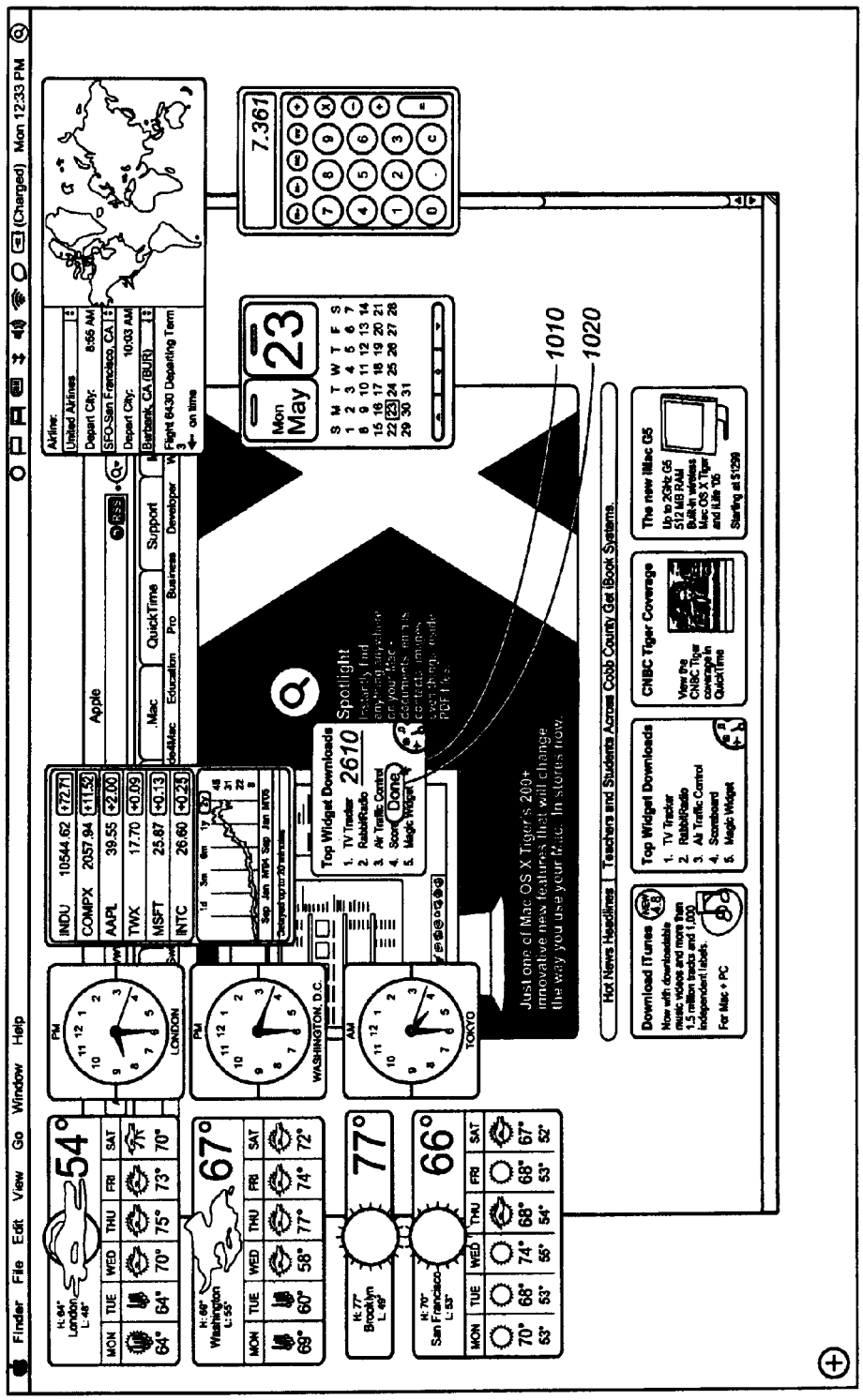
FIG. 27 is a screen shot showing a final step in creating a widget.

Referring to FIG. 27, a screen shot 2700 shows a cursor over Done button 1020 in webview 2610 to select Done button 1020. After Done button 1020 is selected, configuration of widget 1010 is complete. Presentation engine 250 may receive a user's selection of Done button 1020 and pass the input to focus engine 214. Focus engine 214 may then close the configuration process and store all of the information characterizing widget 1010. The information may be stored and saved, for example, as a widget file or other data structure for later access if widget 1010 is ever closed and needs to be reopened. Focus engine 214 also may name the widget file, and may, for example, select a name by default or prompt the user, using presentation engine 250, for a name.

Figure 28:
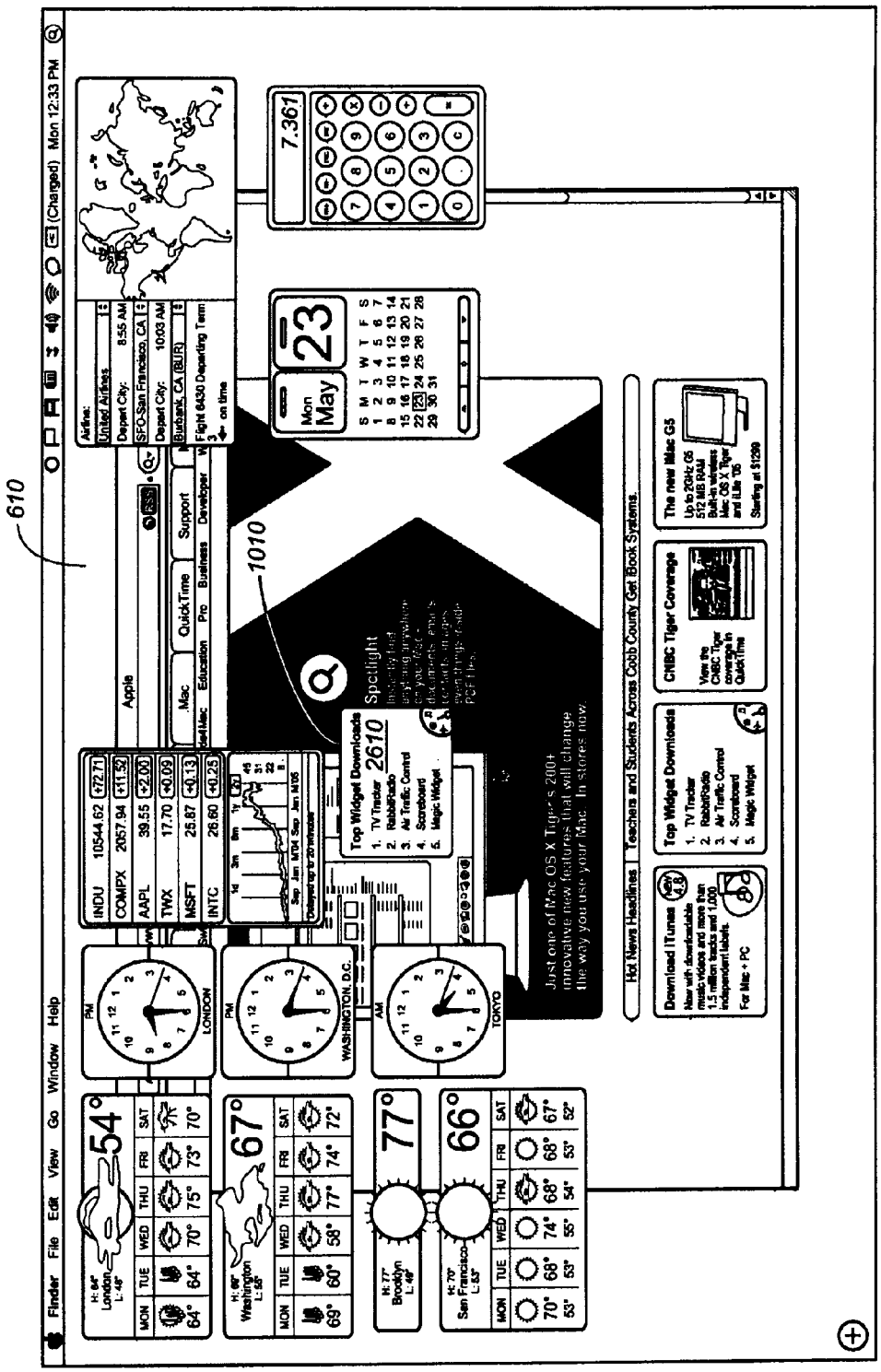
FIG. 28 is a screen shot showing a completed widget after the final step of FIG. 27.

Referring to FIG. 28, a screen shot 2800 shows the result after selection of Done button 1020 in screen shot 2700. After selecting Done button 1020, the configuration of widget 1010 is complete and widget 1010 appears as shown in webview 2610 of screen shot 2800. A user may move widget 1010 to another location on dashboard 610 by, for example, using a drag and drop method with a mouse, or selecting and using arrow keys on a keyboard or using other positioning tools.

Figure 29:
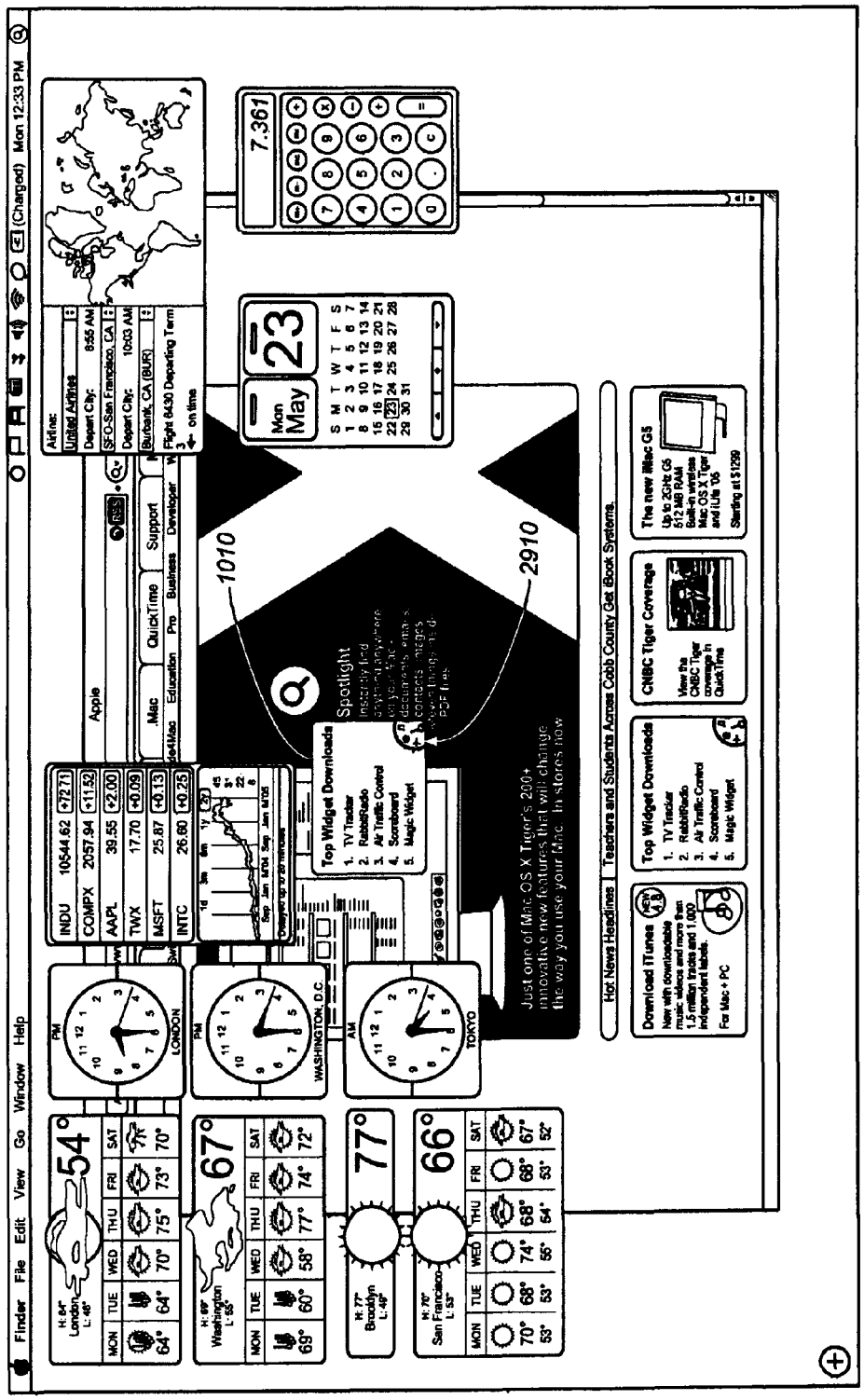
FIG. 29 is a screen shot showing selection of a control for accessing a preferences interface.

Associated with a webview widget are various preferences. Preferences include, for example, and as discussed above, a refresh rate, a content source location, an interactivity activation preference, a refocus preference and other preferences. A webview widget includes a mechanism for setting and, typically, for viewing preferences. The mechanism may be a default mechanism for setting, or a mechanism for allowing a user to view and set/modify preferences. Referring to FIG. 29, a screen shot 2900 shows a cursor over a control 2910 that, upon selection by the cursor, allows display of one or more preferences. The preference(s) may be displayed, for example, by flipping widget 1010 over using an animation technique to reveal various preferences and to reveal an interface to modify the preference(s).

Figure 30:
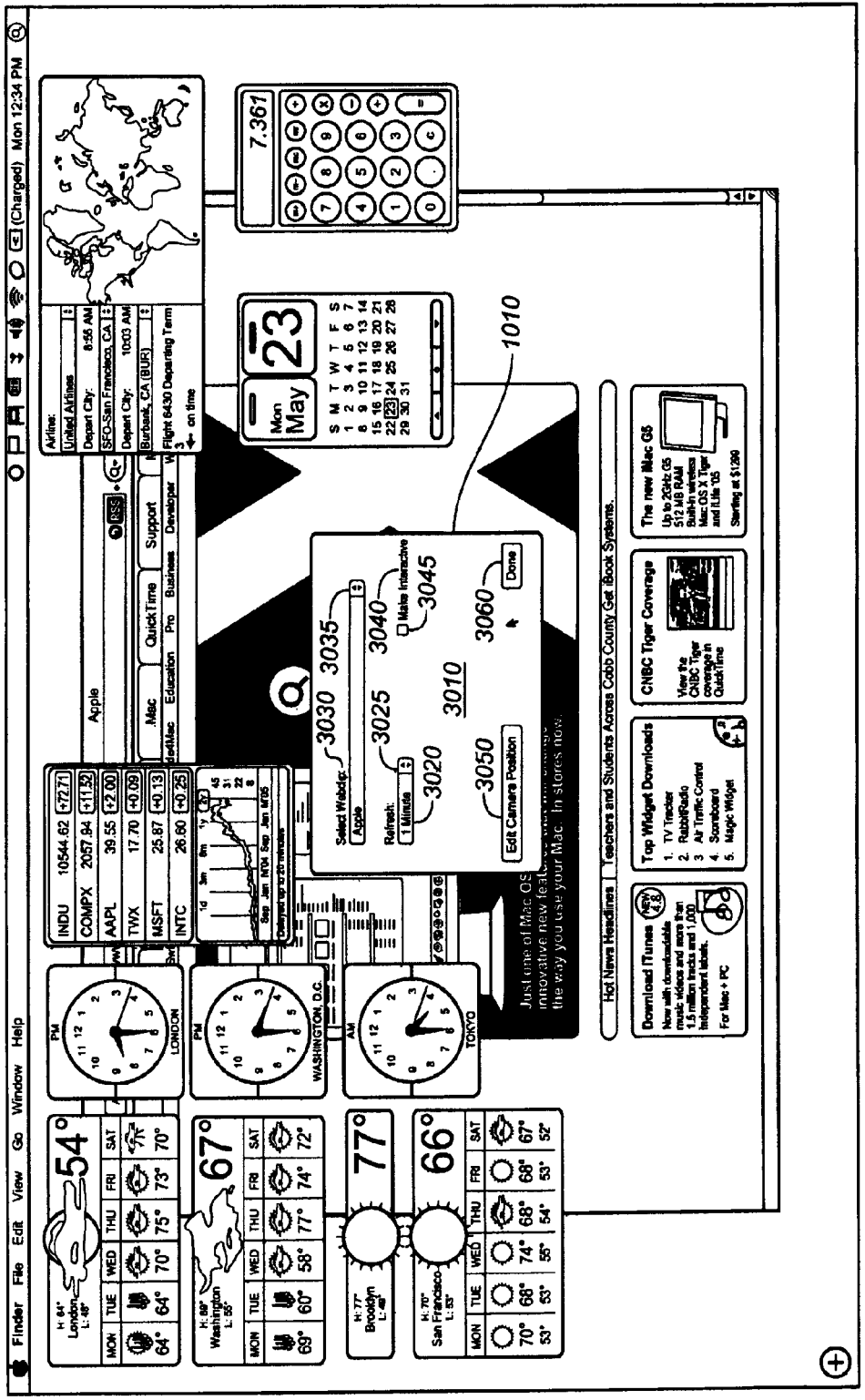
FIG. 30 is a screen shot showing a preferences interface on the widget of FIG. 29.

Referring to FIG. 30, a screen shot 3000 shows widget 1010 flipped over, after selection of control 2910 from screen shot 2900, to reveal a preferences side 3010. In the implementation shown in FIG. 30, preferences side 3010 includes a refresh preference 3020, a web clip selection preference 3030, an interactivity preference 3040, a camera position selection preference (the refocus preference described above that allows for the redefinition of the view presented in the clipping) 3050, and a Done button 3060. Preference selections may be viewed, for example, by clicking on a web clip control 3035 or a refresh control 3025 to pull down a menu of possible selections, by clicking on a check box 3045 that is part of interactivity preferences 3040 to toggle the selection, or by clicking on the preference button itself in the case of camera position selection preference 3050 to activate a selection window.

Figure 31:
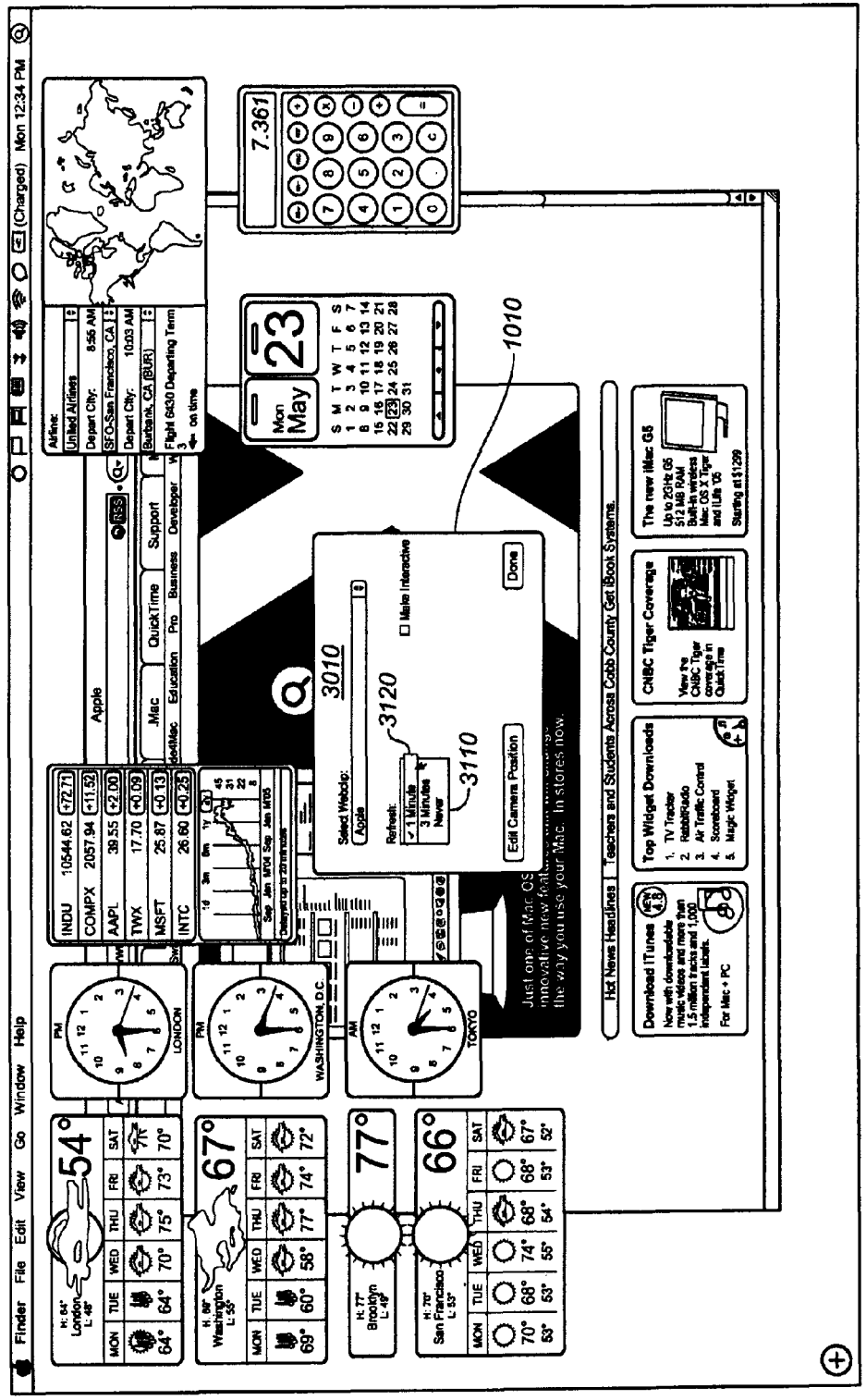
FIGS. 31-33 are a series of screen shots showing preference lists accessed from the preferences interface of FIG. 30.
Figure 32:
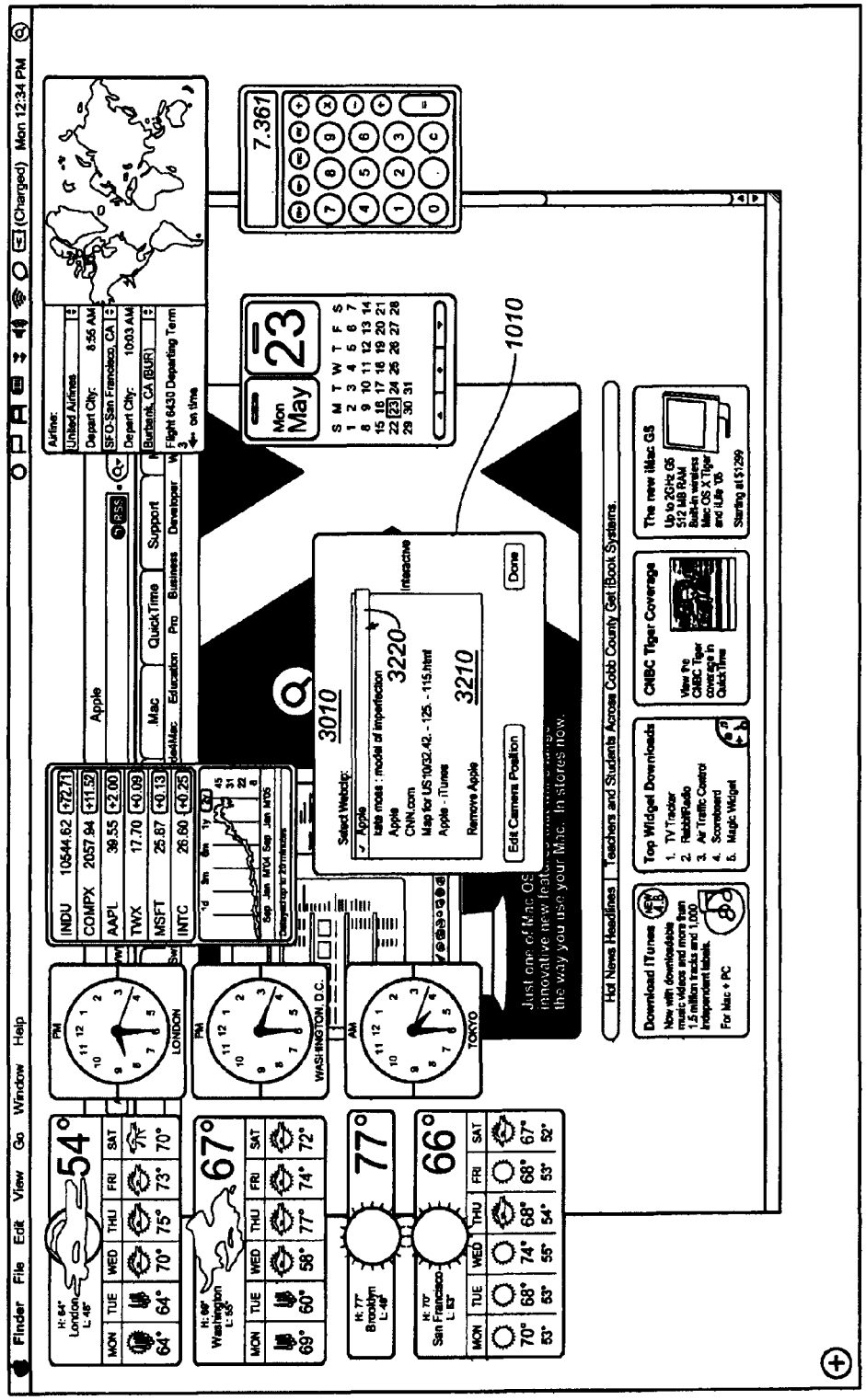
Figure 33:
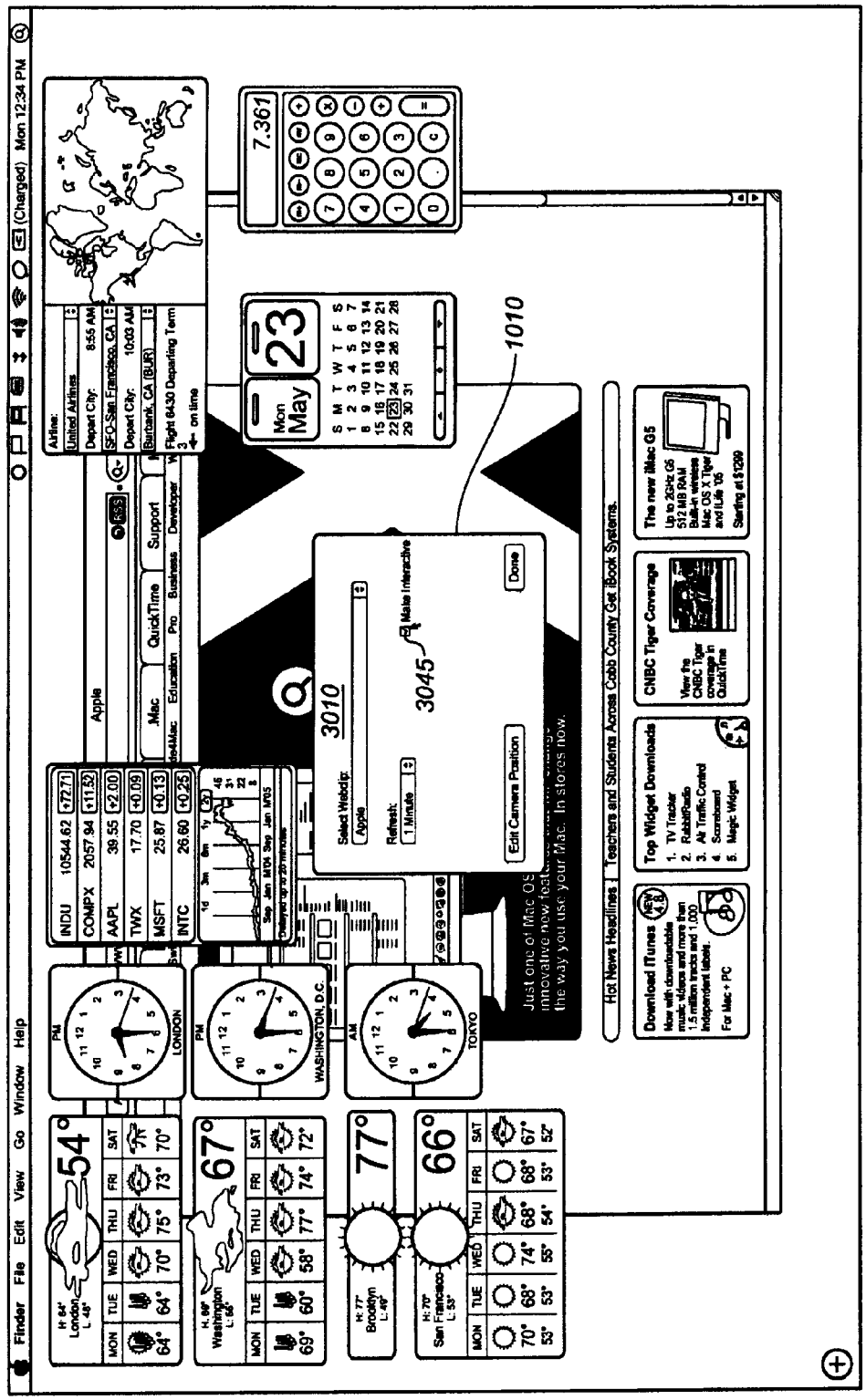

Referring to FIGS. 31-33, screen shots 3100-3300 show preference lists for preferences 3020, 3030, and 3040. Screen shot 3100 includes a preference pull-down menu 3110 showing a currently selected refresh preference 3020 of "1 minute" 3120. Other preferences, though not shown, are possible, including automatic, continuous, live and other refresh options. Pull-down menu 3110 was activated, as explained above, by clicking on refresh control 3025. Screen shot 3200 includes a preference pull-down menu 3210 showing a currently selected web clip preference 3030 of "Apple" 3220. Pull-down menu 3210 was activated, as explained above, by clicking on web clip control 3035. Screen shot 3300 shows check box 3045 selected to toggle interactivity preference 3040 and make widget 1010 interactive.

Selection of camera position selection preference 3050 reinitiates the focus operation, with the current view presented. In one implementation, an animation is used to flip widget 1010 over and present the view portion 1030 displaying the clipped content. With view portion 1030, and the clipped content, displayed, a user may redefine the focus associated with the current view including resizing widget 1010 and repositioning of content within widget 1010. After a user is finished resizing and repositioning, the user may select a Done button as shown in FIG. 27. Upon selection of the Done button, preferences side 3010 may again be displayed, such as, for example, by flipping widget 1010 over. The user may then continue modifying or viewing preferences.

Figure 34:
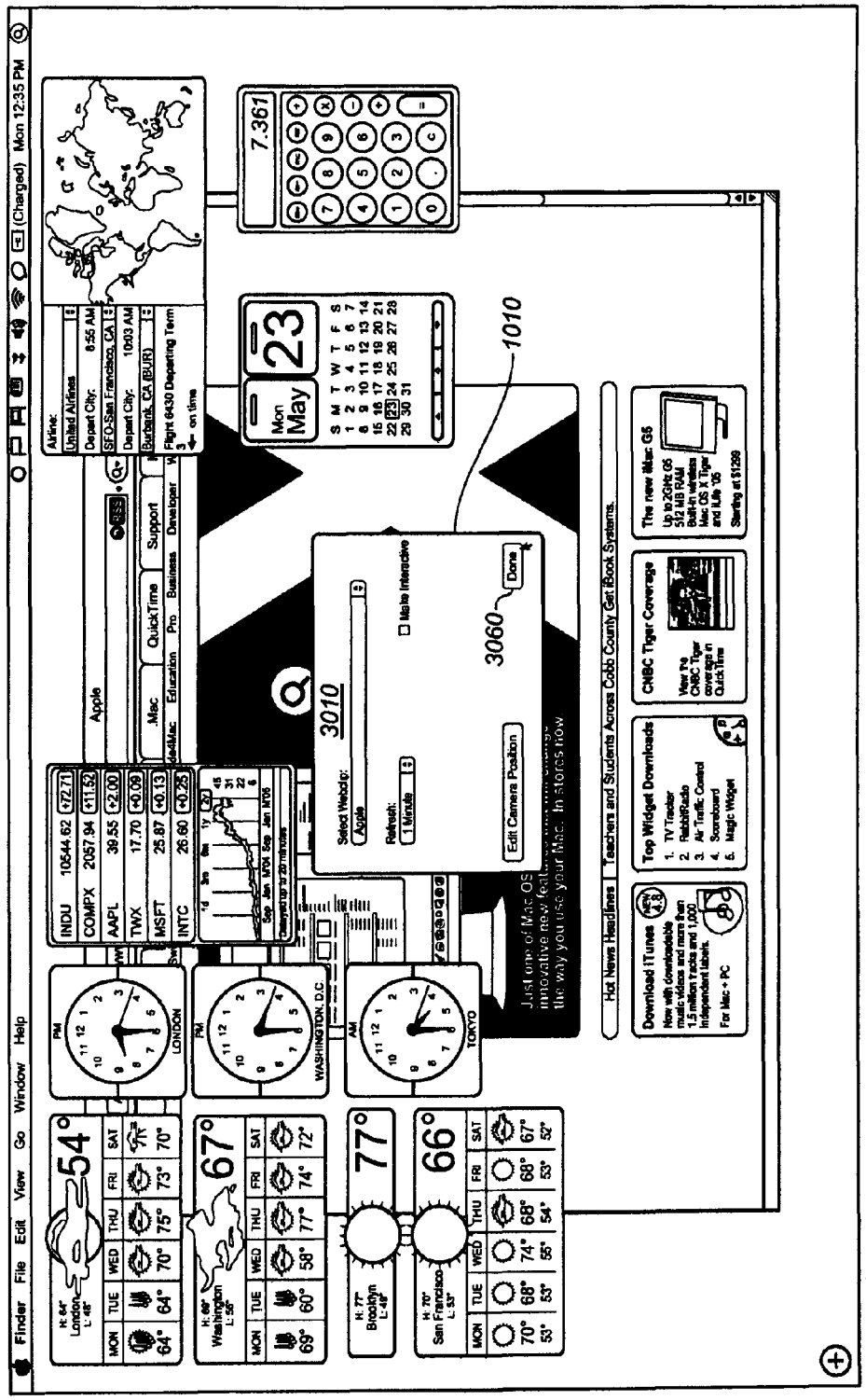
FIG. 34 is a screen shot showing a final step in modifying preferences of the widget.

Referring to FIG. 34, a screen shot 3400 shows a cursor over Done button 3050 on preferences side 3010 to select Done button 3050. After selecting Done button 3050, the setting, or modifying, of preferences for widget 1010 is complete. Preferences engine 230 may store the preferences and initiate any changes that are needed to the presentation of widget 1010. For example, if web clip selection preference 3030 was modified, preferences engine 230 may inform interactivity engine 210 of the modification, interactivity engine 210 may then access the newly selected clipping, and presentation engine 250 may present the new clipping. Regardless of whether changes are needed to the presentation of widget 1010, after a user selects Done button 3050, presentation engine 250 displays view portion 1030 of widget 1010 with the clipped content by, for example, flipping widget 1010 over. Widget 1010 will then appear as shown in webview 2610 of screen shot 2800. From screen shot 2800, if a user clicks out of dashboard 610, then screen shot 700 again appears.

Desktop Environment for a Webview

Clippings, as described above, can be used to clip a wide variety of content, and present the content in a variety of view environments. Above, a webview is described in a dashboard environment. Alternatively, a webview can be presented in other display environments, for example a desktop environment.

Figure 35:
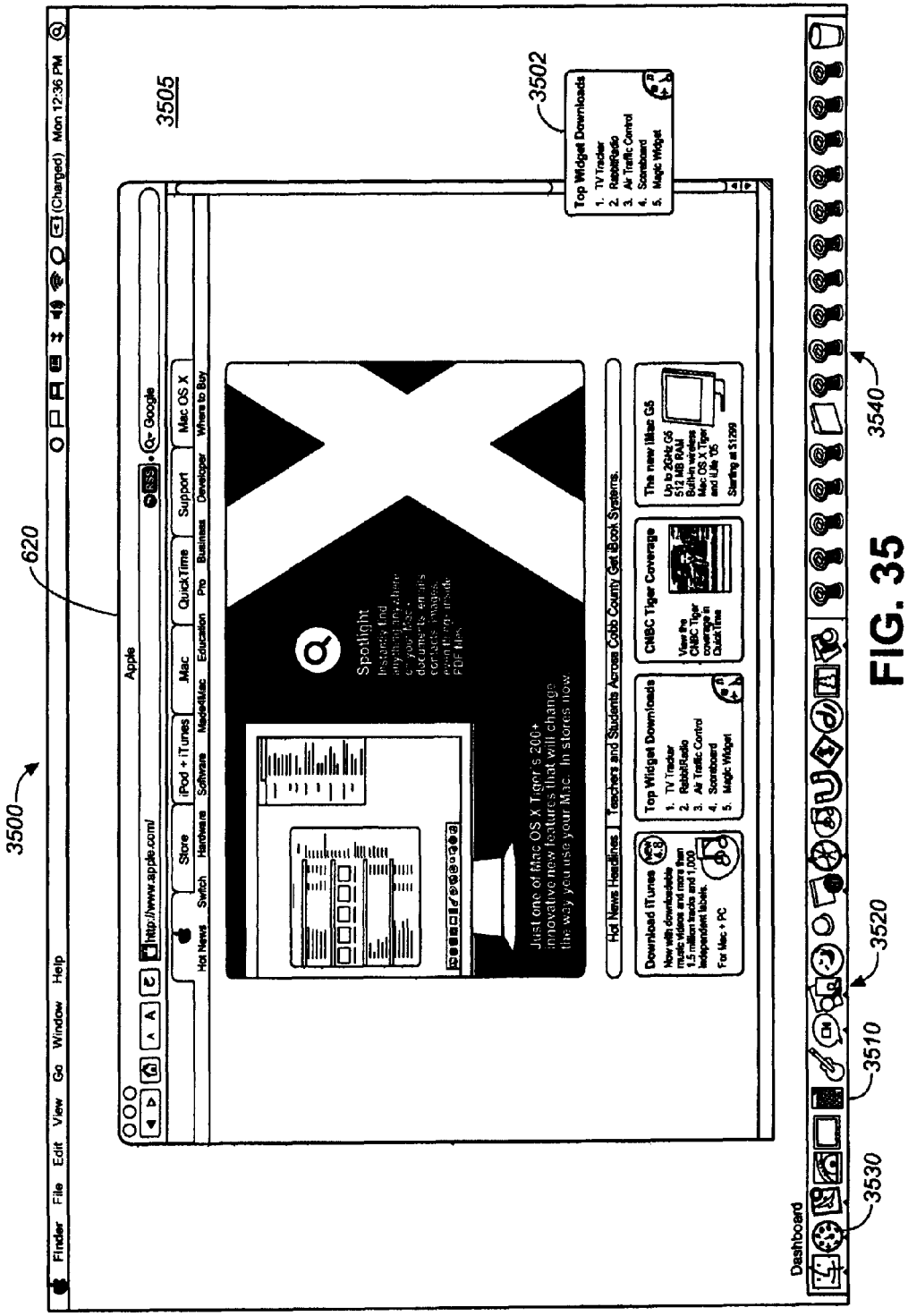
FIG. 35 is a screen shot showing a view displayed on a desktop.

Referring to FIG. 35, a screen shot 3500 shows an implementation in which a webview widget including a viewer 3502 is displayed on a desktop 3505 rather than displaying widget 1010 in a dashboard 610. This is one example of an instantiation of a webview in an alternative display environment. That said, this instantiation is in no way limiting. Other instantiations of webviews in other display environments are possible including particularly instantiations that do not require the webview itself be associated with or contained within a widget.

In the implementation shown, viewer 3502 may either be created or modified by an authoring application. A dashboard and its attending applications/functional elements are an example of an authoring application (e.g., a webview widget can be created in dashboard 610 and subsequently presented outside of the dashboard). A desktop may include various organizational and functional graphical elements that allow for ease of use or navigation in a given computing environment. As shown, the desktop includes a dock, tool bars and the like to provide such functionality, though for the purposes of this disclosure, a clipping can be presented in any desktop environment that includes or does not include such structures. In the instantiation shown, desktop 3505 includes a dock 3510 that includes a left-hand portion 3520 showing various utilities or applications that may be launched. Left-hand portion 3520 includes an icon 3530 for dashboard 610. Dock 3510 also includes a right-hand portion 3540 showing various modules that are running and that may be maximized and displayed on the desktop. In some implementations, viewer 3502 may be minimized so that an icon appears on right-hand side 3540. Additionally, viewer 3502 may be moved to or positioned in another location on desktop 3505. Similarly, in the implementations shown with reference to screen shots 600-3400, widget 1010 may be moved to another location on dashboard 610.

Other Content and Other Environments

As described above, various content can be clipped and presented as a clipping in a display environment. Different combinations of content, authoring applications for creating the clippings, and environments for displaying the clippings are possible. Though great detail has been provided above related to webviews, other forms of content are contemplated as discussed below. In addition, the particular display environments discussed are by way of example and should nor be construed as limiting.

Referring again to FIG. 2, a variety of additional implementations is now presented. These additional implementations are discussed with respect to the engines 210-250 in clipping application 160.

Identification engine 210 may work with, including, for example, processing, navigating within, and identifying the source of and an area of interest within, various different types of content.

The content source may include a messaging application, such as, for example, an email application. A user may desire a clipview, for example, showing (1) the user's inbox or another folder, (2) a one-line summary of the most recent entry in the user's inbox, or (3) merely an indicator of how many unread messages are in the user's inbox.

The content source may include an unshared or shared document or other file. Such documents may include, for example, a document from a standard business application as described earlier, a drawing, a figure, or a design schematic.

The content source may include a view of a folder, a volume, a disk, a Finder window in MAC OS X, or some other description of the contents of a storage area (either physical or virtual, for example). One folder may be a smart folder, such as a drop box, that receives documents ready for publication. The content source also may include a view of a search window that may display, for example, all documents related to a particular project. The search window, and a clipping of the search window, may automatically update when a new document or item matching the search criteria appears.

The content source may include television, video, music, radio, movies, or flash content. The content source also may include a media player presentation.

The content source may include information from a game, including both single player and multiple player games. For example, a clipping may show a view of some portion of a game in progress or of a summary of a game in progress. For example, a user may be waiting on an adversary's next chess move and may have a clipping showing the chess board, showing an indicator of whose turn it is, or showing a timer indicating how much time is left in the adversary's turn.

The content source may include a portion of a user interface for an application. For example, a user may clip a view of a dialog box for a command that requires four menu selections to view when using the application's user interface. The clipping may allow the user to select the command. When the user selects the command within the clipping, the clipping may close just as the dialog box would if the command were selected in the usual manner, or the clipping may remain active to allow the user to select the command multiple times. Such clippings may serve as macros or shortcuts, allowing the user to effectively redefine the user interface for the application. Such redefinitions of the user interface may be particularly useful because the clipping includes a visual display.

Clippings may include a time dimension, in addition to or in lieu of a location dimension. For example, a user may select an area of interest as being the first fifteen seconds from a particular video. The fifteen second video clipping may, for example, play continuously, repeating every fifteen seconds, play on command or mouse-over, or play on a refresh.

Clippings may use pattern recognition to identify an area of interest. For example, a user may inform focus engine 214 that the user desires to view only the box score(s) in a sports web page, or only the left-most person in a video segment that includes a panel of speakers. Pattern recognition thus may include searching a particular content source for the area of interest. Multiple content sources also may be searched, and searches may be performed for text codes (for example, American Standard Code for Information Interchange ("ASCII")), bit map patterns, and other items.

Clippings may as well interact with various data sources when selecting content for presentation. The data sources can include data stores associated with individual applications, such as databases, dataservers, mailservers, archives, and the like. In some implementations, the clipping application 160 may during initial selection or subsequent refresh of content, directly access various data sources directly without regard for the underlying applications. Accordingly, the clipping application may not require either the presence or the launching of the associated applications in order to access content.

As mentioned earlier, focus engine 214 may assist a user in selecting an area of interest. Such assistance may include, for example, proposing certain areas as areas of interest based on general popularity, a user's past behavior, or marketing desires. For example, a web page may identify a popular article and suggest that users visiting the web page make a clipping of the article. As another example, focus engine 214 may track the frequency with which a user visits certain content, or visits certain areas of interest within the content, and if a particular area of interest is visited frequently by a user, then focus engine 214 may suggest that the user make a clipping of the area of interest or pre-create a clipping for the user that merely has to be selected and located, in for example, a dashboard. Such areas of interest may include, for example, a web page, a particular portion of a web page such as a weekly editorial, a particular frame of a web page, a folder in an email application (such as, for example, an inbox), and a command in an application that ordinarily requires navigating multiple pull-down menus. As another example, in an effort to secure repeat viewers, web pages may suggest to viewers that the viewers make a clipping of the web page.

A user may select a content source or an area of interest by copying configuration parameters (for example, state information or preference parameters) from an existing clipping, or simply copying the entire user interface for a presented clipping (such as, for example, a clipview). A user may also modify a clipping to alter one or more configuration parameters, particularly after copying the configuration parameters from another clipping. A clipping application can have an associated tool bar having tools for performing a variety of functions and operations. Such functions/operations include, for example, (1) selecting other clips, (2) performing operations on the clips (for example, copying, or deleting), (3) editing a clip, (4) storing a clip, (5) renaming a clip, (6) sorting clips or organizing a display of icons/names of available clips, (7) setting a clip as a default clip to present when the clipping application is launched, (8) a general preferences tool for settings such as, for example, whether auto-created clips in accessed content should be saved, and (9) modifying preferences (for example, refresh rate and interactivity) globally for all clips. Additionally, separate toolbars may be available, for example, for the processes of creating a clipping, modifying a clipping, and setting preferences in a clipping. Tools, or a toolbar, may be included, for example, in the clipping view itself, such as, for example, in frame 1040 of FIG. 10. Tools, or toolbars, also may be free-standing and be positioned at any location in a display.

A clipping may include content from multiple content sources, or from multiple areas of interest in one or more content sources. The multiple areas of interest may be presented to a user, for example, serially (time separation) or at the same time (location separation). For example, a user may select multiple areas of interest to be displayed in a particular clipview one after another, as in a slideshow. As another example, the multiple areas of interest may be presented at the same time in a single clipview by aggregating the areas of interest, such as, for example, by stitching, as described previously, the areas of interest together. The toolbar can include stitching tools and slide show tools for creating, modifying, and previewing clips having content from multiple content sources. Tools may allow, for example, a user to easily rearrange the multiple content sources and preview a new layout.

State engine 220 may store location information that is, for example, physical or logical. Physical location information includes, for example, an (x, y) offset of an area of interest within a content source, including timing information (e.g., number of frames from a source). Logical location information includes, for example, a URL of a web page, HTML tags in a web page that may identify a table or other information, or a cell number in a spreadsheet. State information may include information identifying the type of content being clipped, and the format of the content being clipped.

State engine 220 also includes refresh information that instructs clipping application 160 how to perform a refresh. Refresh information may include, as described earlier, a script. For example, a script may include (1) an address of a content source that identifies a login page of a service (possibly a subscription service) on the World Wide Web, (2) login information to enter into the login page, and (3) information to navigate to the area of interest within the service after logging-in. Scripts also may be used with multi-stage clips, which are clips that require two clippings to be presented to a user. For example, a service may require that a user (rather than a script) type in the login information, or answer a question, and the script may include state information for both clippings (that is, the login page of the service, and the actual area of interest within the service) and information describing the transition between the two stages/clippings. The transition information may include, for example, a command in the script that causes the script to pause, and wait for an indication from the service that the login was successful, before attempting to navigate to the area of interest within the service. Scripts can be executed in whole or in part by, for example, state engine 220, another engine 210, 214, 218, or 230-250, or a combination of engines 210-250.

Content from an area of interest also may be refreshed by clipping application 160 receiving reloads/updates pushed automatically from the content source. Content sources also may notify clipping application 160 when an update is available, or when new content is received. Notifications and reloads/updates may be provided using, for example, a publish-and-subscribe system. For example, a clipping may be defined to include a subscription definition (e.g., as part of the selection definition) that supports receipt of content from a subscription service. In this paradigm, a clipping may be configured to subscribe to a content source and updates to the underlying material are then provided in accordance with the subscription source and the attending subscription definition (e.g., in accordance with the terms of an underlying subscription agreement). Accordingly, the content displayed can be provided to, and accepted in a clipping by web or net based (or otherwise provided) updates from the subscription service.

State information may include structural cues, such as, for example, information from a document object model ("DOM") or an indication of relative position between the area of interest and known structural boundaries. For example, a user may select an area of interest that begins on a frame boundary in a web page, and state engine 220 may store the (x,y) offset location of the area of interest, as well as the structural cue that the area of interest begins at a particular frame boundary. Then upon refresh, if the web page has been edited and the (x,y) offset is no longer on the frame boundary, the system may automatically modify the (x,y) offset to align with the frame boundary.

State information may include a vast array of information depending on the particularity that clipping application 160 provides to a user. For example, in a clipping of an email application's inbox, state engine 220 may simply store a designation of the inbox as the area of interest and use a default set of configuration parameters or use the current configuration parameter settings when the clipping is presented and refreshed. Such configuration parameters may specify, for example, the style of view (for example, putting the read pane in the bottom of the display), the sort order (for example, by date received in reverse chronological order), and the scroll bar position.

Preferences engine 230 may allow a variety of preferences to be set or modified. Examples of preferences include (1) a refresh rate, (2) whether or not a clipping includes interactive content, (3) whether sound is to be suppressed, (4) whether an alarm is to be activated when, for example, a change in content occurs, (5) the type of alarm that is to be activated, if any, and (6) the selection of the content source and the area of interest. Preferences engine 230 may provide lists of options for a user for one or more of the available preferences. For example, refresh rate options may include "continuous," "once per minute," "once every five minutes," "intermittent," "selectively," "on command," "never," "automatically," "manually," "live", "as provided" or otherwise. Refresh rate options also may allow a user to select a particular day and time, which may be useful in refreshing a clipping that gets updated at the content source at, for example, eight a.m. every Monday, or for refreshing a clipping of a live video segment by recording the video segment (or a portion of it) when the segment initially airs. As another example, types of alarms may include audio of various sorts, or a flashing icon. As another example, preferences engine 230 may provide a list of the previous content sources and areas of interest that have been clipped, and allow a user to select one of these historical selections as the current selection for the clipping.

Interactivity engine 240 may support a variety of different types of interactive content. Interactive content may include, as described earlier, a hyperlink to a web page, a form for data entry (for example, text entry, check box, or radio button), and an email address. Interactive content may include content that responds to, for example, a mouse-over, a mouse-click, or a tab key. Interactive content also may include commands in a clipping, such as, for example, a "reply" or "forward" button in an email application. Interactivity engine 240 may enable a user's interaction with a clipping by, for example, embedding the application from which the content was clipped (for example, a browser or an email application), by referring all user interaction to a stand-alone application, or by incorporating functionality without embedding the application. Rather than embed in the application, interactivity engine 240 may launch the application and act as a pass-through with the application itself hidden (for example, launching and working with a mail server directly). If a stand-alone application is used, interactivity engine 240 may work directly with the application via an application program interface ("API"). As an example of incorporating functionality without embedding the application, clipping application 160 may incorporate functionality allowing a user to edit a clipping of a text document. In such an example, clipping application 160 may have the ability to access text documents and update the text documents based on user input, either using the native application or otherwise.

Interactivity engine 240 may support a variety of different levels of interaction and types of interaction. Levels of interaction may be categorized, for example, into the following three categories: (1) no interactivity is provided, (2) partial interactivity is provided, for example, by allowing a user to add notes to a document but not edit the document, or enabling some of the active content on a web page, and (3) full interactivity is provided, for example, by launching an editing application into the clipping application presentation and allowing a user to edit a document.

Interactivity engine 240 may support interactivity between clippings. For example, one clipping can be used to control or otherwise provide input to a second clipping. In one example, a remote control for a display area is included in a first clipping, the display area itself being defined by a second clipping. Interactivity provided by a user in conjunction with the first clipping, (e.g., changing a channel on a remote control that is presented in the first clipping), is used to effectuate change in the second clipping (e.g., the content displayed in the second clipping is changed). The interactivity engine 240 of each clipping can include, for example, publish and subscribe constructs which can be utilized to provide input and output from/to respective clippings.

Presentation engine 250 may present data in various ways, for example, using audio, images, and video. Further, presentation engine 250 may provide a user interface for displaying clippings. The user interface may include, for example, a widget, or a simple window. The user interface may provide varying amounts of information and functionality. The information may include, for example, any or all of the state information, or the preferences. The functionality may include, for example, providing an interface for setting preferences, or providing control bars that include commands for interacting with the clipped content. Such commands may include a play button for video or audio, or a "save as" button for creating another copy of the presently clipped content.

A clipping has been referred to as a clipview in various implementations. The term clipview is not intended to be limiting, and may include audio, images, video, or other types of data. The presentation may display video by downloading a clipped video segment, or by, for example, refreshing continuously. For example, in implementations in which a web page is clipped into a clipview, and in which the area of interest includes a video segment, clipping application 160 may realize that a video segment in is in the area of interest and may determine, accordingly, that a continuous refresh is needed. Alternatively, the user may instruct clipping application 160 to continuously refresh.

Further implementations may include two clippings that are configured to interact with each other. For example, a first clipping may be of selected content, and a second clipping may be a control device (e.g., a toolbar, or a remote control) that can control the content in the first clipping.

Implementations may nest clippings in various ways. Nesting of clippings can include nesting in time or space.

In one instantiation, a first clipping can be nested in a second clipping producing an aggregate clipping (e.g., creating an aggregate or unified view). Each clipping can itself be complete, defined in accordance with the methods and tools described above. A first clipping, the clipping being nested may be formed conventionally as described above with one additional caveat, a positioning dimension. The positioning dimension for the first clipping can define, by for example name and location as necessary, the particular positioning of the first clipping in (or in relation to) a second clipping. Where the first clipping is to be embedded into the display associated with the second clipping, the second clipping can be defined to include, using for example the identification engine 210, the named first clipping as part of the source content to be displayed in the second clipping. The second clipping can include, for example an instantiation of the first clipping or the functional equivalent (e.g., a call to the actual first clipping).

The position dimension can include not only location data but also timing data. For example, the nesting of the first and the second clipping can be made in accordance with a time division multiplex methodology, where the view portion of the clipping alternates between presentation of the first clipping content and the second clipping content. Alternatively, other presentation options are possible to interleave the first and the second clippings in time (e.g., the second clipping is inserted every 10 seconds, and displayed for 2 seconds etc.).

In one implementation the clipping authoring application, e.g., clipping application 160, can include a clipboard or other tool that facilitates the nesting of the plural distinct clippings. For example, a clipboard could be presented in the authoring application. The clipboard may have an associated toolset for identifying, selecting and placing clippings in the clipboard, and converting the clipboard into a single aggregate clipping. The clipboard can include one or more predetermined forms that allows for the convenient layout in space (e.g., different forms including a two-up (two side by side clippings), a four-up, or other display option) or time (e.g., timeline tool or the like).

In other implementations, nesting can be used to produce a slide show clipping. For example, when used in conjunction with content derived from a spreadsheet application, individual cells (e.g., non-contiguous cells in a conventional spreadsheet) can be selected and presented together in one unified view or sequentially to a user in a slide show.

In other implementations, the nesting of clippings may be in accordance with a master-slave paradigm where a master clipping defines all aspects of the inclusion of a slave clipping in the master (e.g., the slave clipping may not be specially configured or "know" of its inclusion in the master). Alternatively, a master controller, which itself may or may not be a clipping, may be used to control the presentation of individually configured clippings into a composite or aggregate clipping.

For example, a clipping may be of a dashboard that itself includes several view widgets (each including one or more clippings) that include content. As another example, a general purpose clipping, such as, for example, a clock clipview may be inserted (for example, by dragging and dropping) into another clipping for which it would be convenient to have the time displayed.

Processing device 110 may include, for example, a mainframe computer system, a personal computer, a personal digital assistant ("PDA"), a game device, a telephone, or a messaging device. The term "processing device" may also refer to a processor, such as, for example, a microprocessor, an integrated circuit, or a programmable logic device. Content sources 150 and 170 may represent, or include, a variety of non-volatile or volatile memory structures, such as, for example, a hard disk, a flash memory, a compact diskette, a random access memory, and a read-only memory.

Implementations may include one or more devices configured to perform one or more processes. A device may include, for example, discrete or integrated hardware, firmware, and software. Implementations also may be embodied in a device, such as, for example, a memory structure as described above, that includes one or more computer readable media having instructions for carrying out one or more processes. The computer readable media may include, for example, magnetic or optically-readable media, and formatted electromagnetic waves encoding or transmitting instructions. Instructions may be, for example, in hardware, firmware, software, or in an electromagnetic wave. A processing device may include a device configured to carry out a process, or a device including computer readable media having instructions for carrying out a process.

A number of implementations have been described. Nevertheless, it will be understood that various modifications may be made. For example, elements of one or more implementations may be combined, deleted, modified, or supplemented to form further implementations. Additionally, in further implementations, an engine 210-250 need not perform all, or any, of the functionality attributed to that engine in the implementations described above, and all or part of the functionality attributed to one engine 210-250 may be performed by another engine, another additional module, or not performed at all. Though one implementation above describes the use of widgets to create webviews, other views can be created with and presented by widgets. Further, a single widget or single application can be used to create, control, and present one or more clippings in accordance with the description above. Accordingly, other implementations are within the scope of the following claims.

What is claimed is:

1. A method for displaying content in a user interface comprising:
   receiving a selection in a native application while the native application displays current content provided by one or more data files associated with the native application, using one or more processors, to open the data files in a dashboard environment;
   initiating, in response to the selection, a clipping application in the dashboard environment, wherein an amount of the current content provided by the data files is displayed in a display window of the clipping application;
   identifying in the clipping application, using the one or more processors, a first user selected portion of the current content to be included in a first view and a second user selected portion of the current content to be included in a second different view, wherein identifying the first user selected portion includes resizing the display window to change the amount of the current content displayed in the display window to a first amount, wherein identifying the second user selected portion includes resizing the display window to change the amount of the current content displayed in the display window to a second amount, and wherein both the first amount and the second amount include respective changed amounts of the current content with respective user selected dimensions less than the entire current content;
   storing, in a non-transitory computer readable medium, information associated with each user selected portion including a name, identifying information for designating a respective user selected portion associated with the data files, and stitching information, the stitching information defining how to present the first view and the second view together in an aggregate view; and
   displaying, in an aggregate view, the current content associated with the user selected portions using the stitching information.

2. The method of claim 1, wherein the first view is displayed in the second view.

3. The method of claim 1, wherein the first view and the second view are interleaved in the aggregate view and displayed at different times.

4. The method of claim 1, wherein the first view controls at least one aspect of the display of the second view.

5. The method of claim 1, wherein the first and second views are displayed simultaneously and in different portions of the aggregate view.

6. The method of claim 1, wherein the first and second views are displayed side by side in the aggregate view.

7. The method of claim 1, wherein the first view is called and displayed in the second view.

8. A method for displaying content in a user interface comprising:
   identifying, by one or more processors, a native application, the native application including one or more user interfaces that load current content provided by one or more data files associated with the native application, wherein the one or more user interfaces are interactive with a user of the native application to select the data files to be opened in a dashboard environment;
   identifying in a clipping application in the dashboard environment, by one or more processors, a first user selected portion and a second user selected portion associated with one of the user interfaces to be included in a view, wherein identifying the first user selected portion includes resizing a display window of the clipping application to change an amount of the current content displayed in the display window to a first amount, wherein identifying the second user selected portion includes resizing the display window of the clipping application to change the amount of the current content displayed in the display window to a second amount, and wherein both the first amount and the second amount include respective changed amounts of the current content with respective user selected dimensions less than the entire current content provided by the data files;
   storing information associated with each of the received user selected portions of the user interface including a respective name and identifying information; and
   displaying the user selected portions in a presentation view separate from the native application, the presentation view including a control for interacting with the native application to provide data to and retrieve data from the native application as part of an update operation.

9. The method of claim 8, wherein the user selected portions include an interactive portion that initiates a command in the native application.

10. The method of claim 8, wherein the native application is the Mac OS X operating system and the user selected portions include a finder frame.

11. The method of claim 8, wherein the native application is a spreadsheet application and the user selected portions include one or more cells of a spreadsheet.

12. The method of claim 11, wherein the one or more cells are non-contiguous in the spreadsheet.

13. The method of claim 11, wherein one or more of the one or more cells are identified in different spreadsheets.

14. The method of claim 11, wherein the native application is an authoring application and the user selected portions includes a portion of a document.

15. The method of claim 11, wherein the native application is a mail application and the user selected portions includes an inbox.

16. The method of claim 11, wherein the native application is a mail application and the user selected portions includes an address book.

17. The method of claim 11, wherein the native application is a player application and the user selected portions includes a sound clip.

18. The method of claim 11, wherein the native application is a webcam and the user selected portions includes a portion of content associated with the webcam.

19. The method of claim 8, wherein displaying the user selected portions include not initiating the native application and directly accessing the user selected portions from a datastore associated with the native application.

20. The method of claim 8, wherein the native application is a media player and the user selected portions include a portion of media configured to be played on the media player.

21. The method of claim 20, wherein the media is television clips.

22. The method of claim 8 further comprising receiving an interaction with the displayed view and processing the interaction.

23. The method of claim 22, wherein processing includes launching the native application and loading the user selected portions into a user interface associated with the native application.

24. The method of claim 22, wherein the native application is a game, and the interaction is a move required to further the game.

25. The method of claim 24, wherein the game is a multi-player game and the view provides an alert associated with determining another player in the game has provided an input.

26. A method for sharing content between applications comprising:
identifying, by one or more processors, current content provided by one or more data files for display in an associated native application, wherein the current content is identified to be opened in a dashboard environment;
providing a clipping application in the dashboard environment that facilitates selecting a first user selected portion and a second user selected portion of the current content and viewing the user selected portions of the current content without initiating the native application, wherein selecting the first user selected portion includes resizing a display window of the clipping application to change an amount of the current content displayed in the display window to a first amount, wherein selecting the second user selected portion includes resizing the display window of the clipping application to change the amount of the current content displayed in the display window to a second amount, and wherein both the first amount and the second amount include respective changed amounts of the current content with respective a user selected dimensions less than the entire current content; and
displaying, by the clipping application, the user selected portions of the current content in a view presented by the clipping application including automatically updating the view in accordance with a refresh strategy wherein refresh of the view includes accessing data to be included in a refreshed view without initiating the native application.

27. The method of claim 26, wherein the associated native application is a mail application and the current content is stored in a mail server associated with the mail application.

28. The method of claim 26, wherein the associated native application is a document processing application and the current content is stored in a datastore associated with the associated application.

29. The method of claim 26, wherein the refresh strategy is selected from the group consisting of automatically, continuously, intermittently, manually, selectively, and as provided.

30. The method of claim 26, wherein identifying the current content includes receiving input indicating the user selected portions of the current content that are available for ready inclusion in the view.

31. A method for sharing content between applications comprising:
identifying, by one or more processors, current content provided by one or more data files associated with a native application, wherein the current content is identified to be opened in a dashboard environment, the current content including a first user selected portion and a second user selected portion associated with the current content to be included in a view, the user selected portions having respective user selected dimensions less than the entire current content;
providing a clipping application in a dashboard environment that facilitates selecting the user selected portions of the current content and viewing the user selected portions of the current content, wherein selecting the first user selected portion includes resizing a display window of the clipping application to change an amount of the current content displayed in the display window to a first amount, wherein selecting the second user selected portion includes resizing the display window of the clipping application to change the amount of the current content displayed in the display window to a second amount, and wherein the first amount and the second amount include respective changed amounts of the current content; and
displaying the user selected portions of the current content in the view presented by the clipping application in the dashboard environment, including automatically updating the view in accordance with a refresh strategy, wherein automatically updating the view includes accessing data to be included in an updated view without initiating the native application.

32. The method of claim 31, wherein identifying the current content includes receiving input indicating the user selected portions of the current content that are available for ready inclusion in the view.

33. The method of claim 31, wherein the current content is located by a searching application and the searching application returns a portion of the current content as a search result.

34. The method of claim 31, wherein the user selected portions of the current content are identified in response to prior portions of the current content being presented to a user.

35. The method of claim 31, wherein the process of displaying at least one of the user selected portions includes responding to a user interaction to the view.

36. The method of claim 35, wherein the response is selected from the group consisting of returning a page request, updating the display, navigating in the view, and displaying received content.

37. The method of claim 35 further comprising interacting with a user to receive the user interaction.

38. The method of claim 35 further comprising selectively allowing for user interaction with the view.

39. The method of claim 38, wherein selectively allowing for user interaction includes selecting from no interaction, partial interaction, and full interaction, wherein full interaction includes launching the native application associated with the current content being displayed to facilitate the full interaction.

40. The method of claim 31, wherein displaying the user selected portions of the current content in accordance with the refresh strategy includes:
tracking changes in the user selected portions of the current content in the data files; and
providing an update to the user selected portions of the current content displayed in accordance with the refresh strategy.

41. The method of claim 31, wherein the associated native application is a browser, wherein the current content is a web page, and wherein the user selected portions are displayed in a webview.

42. The method of claim 31, wherein the associated native application is a messaging application and the view provides an alert whenever a new message is received in a message store associated with the messaging application.

43. The method of claim 31, wherein displaying the user selected portions of the current content includes applying a function to the portion of the user selected portions of the current content prior to display.

44. The method of claim 43, wherein the function is a graphical operation.

45. The method of claim 43, wherein the function is a filter.

46. The method of claim 31, wherein displaying the user selected portions includes displaying the user selected portions in a widget.

47. The method of claim 31, wherein the steps of identifying, providing, and displaying are instantiated by a widget.

48. The method of claim 31, wherein displaying the view includes displaying the view in an overlay of a display environment.

49. The method of claim 48, wherein the display environment is a display of an electronic device.

50. The method of claim 31 further comprising maintaining a script describing a process for refreshing the user selected portions of the current content.

51. The method of claim 31, wherein the step of displaying is performed selectively for different users depending on permissions associated with a given user.

52. The method of claim 31, wherein the content source is associated with a subscription service and refreshing the view is performed in accordance with a subscription agreement.

53. A method for displaying web content in a user interface comprising:
  maintaining first and second information and stitching information, each of the first and second information associated with one or more data files including a name and identifying information for designating a first and second user selected portion associated with the data files, each user selected portion having a respective user selected dimension less than an entire portion of current content provided by the associated data files to an associated native application, the stitching information defining how to present the user selected portions in an aggregate view;
  selecting the first and second user selected portions in a user interface; and
  displaying, in the user interface in a dashboard environment, the aggregate view including respective user selected portions associated with the first and second information in accordance with the stitching information, wherein the first user selected portion is selected by resizing a display area of a clipping application in the dashboard environment to change an amount of the current content displayed in the display area to a first amount, wherein the second user selected portion is selected by resizing the display area of the clipping application in the dashboard environment to change the amount of the current content displayed in the display area to a second amount, and wherein both the first amount and the second amount include respective changed amounts.

54. The method of claim 53 further comprising:
  identifying a first data file associated with the first information;
  selecting a portion associated with the first data file to be included in the view;
  identifying a second data file associated with the second information; and
  selecting a portion associated with the second data file to be included in the view.

55. The method of claim 54, wherein identifying the first and second data file includes:
  determining a script for accessing the first and second data files;
  maintaining information includes maintaining the script; and
  displaying includes using the script to access the current content associated with the selected portions.

56. The method of claim 54, wherein selecting the portions associated with the first and second data files includes determining view characteristics including a dimension of a display area to display the selected portions.

57. The method of claim 54, wherein selecting the portions associated with the first and second data files includes determining view characteristics including a location of the view in a display environment.

58. The method of claim 53 further comprising:
  rendering content from the first and second data files associated with the respective selected portions; and
  deriving reference data describing the selected portions using the rendered data.

59. The method of claim 53 further comprising detecting a trigger event for activating an overlay in the user interface, wherein displaying the view includes displaying the view in the overlay.

60. The method of claim 59, wherein the overlay is a dashboard that includes one or more graphical user interface elements.

61. The method of claim 59 further comprising:
  detecting a trigger event for dismissing the overlay; and
  reactivating the user interface.

62. The method of claim 53 further comprising:
  detecting a user interaction with the view; and
  providing a response, wherein the response is selected from the group consisting of returning a page request, updating the display, navigating in the view, and displaying received content.

63. The method of claim 53 further comprising interacting with a user from whom the user selection portions are received.

64. The method of claim 53 further comprising selectively allowing for user interaction with the view.

65. A method for displaying content in a user interface comprising:
  selecting, in a native application, a first data file and a second data file to be opened in a dashboard environment, the selecting performed while the native application displays current content provided by the data files to the native application;
  identifying, in a clipping application in the dashboard environment, an area of interest in each data file, wherein identifying the area of interest in the first data file includes resizing a display window of the clipping application to change an amount of the current content displayed in the display window to a first amount by cropping the current content, wherein identifying the area of interest in the second data file includes resizing the display window to change the amount of the current content displayed in the display window to a second amount by cropping the current content, and wherein both the first amount and the second amount include respective changed amounts of the current content with respective user selected dimensions less than the entire current content;
  providing metadata identifying the first data file and the second data file;
  providing metadata describing the area of interest in each data file;

providing metadata describing a relationship for displaying both areas of interest in a unified view;

determining, by one or more processors, preference data describing at least refresh preferences to be used when displaying the areas of interest in a user interface;

storing the metadata and preference data;

displaying the first amount and the second amount of the current content associated with the areas of interest in the unified view in a user interface separate from the native application in accordance with the relationship metadata; and refreshing the areas of interest in accordance with the preference data.

66. The method of claim 65 further comprising navigation metadata including a script for accessing each area of interest.

67. The method of claim 65, wherein the metadata describing an area of interest includes a selection definition including information describing a selected portion including reference information and view dimension information.

68. The method of claim 67, wherein the reference information includes information defining geographic coordinates for locating the selected portion.

69. The method of claim 68, wherein the reference information includes information defining a locator in the content source selected from the group consisting of a frame, a view, or a widget.

70. The method of claim 65 further comprising a script for locating the areas of interest, the script including one or more processes for authenticating a user for accessing the content source.

71. The method of claim 65, wherein the metadata describing the areas of interest includes information for identifying selected portions of a plurality of different content sources.

72. The method of claim 65, wherein the metadata describing the areas of interest includes information for identifying selected non-contiguous portions of a content source.

73. The method of claim 65, wherein the refresh preferences are selected from the group consisting of automatically, continuously, intermittently, manually, selectively, and as provided.

74. A method for identifying content to be displayed in a user interface comprising:

identifying, by one or more processors, two or more digital content sources that provide current content to an associated native application, wherein the digital content sources are identified to be opened in a dashboard environment;

receiving in a clipping application in the dashboard environment, by the one or more processors, a user selected portion associated with each digital content source to be included in a unified view defined by a selection definition, wherein a first user selected portion is selected by resizing a display window of the clipping application to change an amount of the current content displayed in the display window to a first amount, wherein a second user selected portion is selected by resizing the display window of the clipping application to change the amount of the current content displayed in the display window to a second amount, and wherein both the first amount and the second amount include respective changed amounts of the current content with respective user selected dimensions less than the entire current content provided to the associated native application; and maintaining, in a non-transitory storage medium associated with the one or more processors, information associated with each digital content source including navigation information to the digital content source, the selection definition and metadata describing a relationship for displaying each user selected portion in a unified view in the clipping application.

75. The method of claim 74, wherein the digital content sources are selected from the group consisting of a web page, a file, a document, or a spreadsheet.

76. The method of claim 74, wherein receiving the user selected portions further includes receiving the navigation information including a script for accessing the user selected portions.

77. The method of claim 74, wherein receiving the user selected portions further includes determining the selection definition, the selection definition including information describing the user selected portions including reference information and view dimension information.

78. The method of claim 77, wherein the reference information includes information defining geographic coordinates for locating the selected portions.

79. The method of claim 77, wherein the reference information includes information defining a locator in the digital content source selected from the group consisting of a frame, a view, and a widget.

80. The method of claim 74, wherein identifying the two or more digital content sources includes determining a script for accessing each digital content source, and wherein maintaining information includes maintaining the script.

81. The method of claim 74, wherein receiving the user selected portions includes receiving view characteristics including the user selected dimension of a display area to display the user selected portions, and wherein maintaining includes maintaining the view characteristics.

82. The method of claim 74, wherein receiving the user selected portions includes receiving view characteristics including a location of the unified view in a display environment, and wherein maintaining includes maintaining the view characteristics.

83. The method of claim 74, wherein receiving the user selected portions includes receiving reference data for identifying a particular portion associated with at least one of the digital content sources to be displayed, and wherein the maintaining step includes storing the reference data.

84. The method of claim 74 further comprising:

rendering content associated with the digital content sources, and deriving reference data describing the user selected portions using the rendered data.

85. The method of claim 74 further comprising maintaining user interaction preferences to be active when displaying the unified view, the interaction preferences providing a selective level of interaction with the unified view.

86. A method for displaying a graphical display element comprising:

selecting, by one or more processors, a plurality of digital content sources to be opened in a dashboard environment, the selecting performed in a native application while the native application displays current content provided by the digital content sources to the native application;

identifying, in a clipping application in the dashboard environment, a pre-selected portion associated with each digital content source, wherein identifying a first pre-selected portion includes resizing a display window of the clipping application to change an amount of the current content displayed in the display window to a first amount by cropping the current content, wherein identifying a second pre-selected portion includes resizing the display window of the clipping application to change the amount of the current content displayed in the display window to a second amount by cropping the current content, and wherein both the first amount and the second amount include respective changed amounts of the current content with respective user selected dimensions less than the entire current content;

identifying, by one or more processors, a plurality of content definitions each including a description of the digital content source that provides current content to the associated native application and the pre-selected portions associated with the digital content sources, the pre-selected portion defining a region of the digital content source for inclusion in a unified view;

identifying, by the one or more processors, metadata describing a relationship for displaying the first pre-selected portion and the second pre-selected portion in the unified view;

identifying, by the one or more processors, preference data including refresh preferences to be used when displaying the pre-selected portion associated with the digital content source in a user interface separate from the associated native application; and storing, in a memory associated with the one or more processors, the content definitions, the metadata, and the preference data.

87. A device comprising:
a processor for executing one or more applications including a native application and a clip view application, the processor configured to:
  identify a digital content source for providing current content to the native application, wherein the digital content source is identified to be opened in a dashboard environment, and
  initiate, in response to identifying the digital content source, the clip view application in the dashboard environment, wherein the clip view application includes:
    a plurality of content definitions each including a description of the digital content source and an area of interest of the digital content source, wherein identifying a first area of interest includes resizing a display window of the clip view application to change an amount of the current content displayed in the display window to a first amount, wherein identifying a second area of interest includes resizing the display window of the clip view application to change the amount of the current content displayed in the display window to a second amount, and wherein the first amount and the second amount include respective changed amounts of the current content with respective user selected dimensions less than the entire current content,
    metadata describing a relationship for displaying each area of interest in a unified view in the clip view application,
    preference data including refresh preferences to be used when displaying the area of interest of the digital content source in a user interface of the clip view application, and
    a viewer for displaying the current content associated with the areas of interest in the unified view in the user interface and updating the current content associated with the areas of interest in accordance with the preference data.

88. The device of claim 87, wherein the digital content source is selected from the group consisting of a web page, a file, a document, and a spreadsheet.

89. The device of claim 87, wherein the content definition further includes navigation information including a script for accessing the areas of interest.

90. The device of claim 87, wherein content definition further includes a selection definition including information describing the areas of interest including reference information and view dimension information.

91. The device of claim 90, wherein the reference information includes information defining geographic coordinates for locating the selected areas.

92. The device of claim 90, wherein the reference information includes information defining a locator in the digital content source selected from the group consisting of a frame, a view, and a widget.

93. The device of claim 87, wherein the content definition includes view characteristics including a dimension of a display areas to display the area of interest.

94. The device of claim 87, wherein the content definition includes view characteristics including a location of the unified view in a display environment.

95. The device of claim 87, wherein the content definition further comprises data associated with the digital content source that can be used to locate the areas of interest in subsequent views.

96. The device of claim 95, wherein the data is rendered data.

97. The device of claim 87, wherein the content definition further comprises user interaction preferences to be active when displaying the unified view, the interaction preferences providing a selective level of interaction with the unified view.

98. A computer program product stored in a non-transitory medium comprising instructions for causing a computing device to:
  identify a plurality of content sources each providing current content over a network for display to a user in an associated native application, wherein the content sources are identified to be opened in a dashboard environment;
  initiate, in response to identifying the content sources, a clipping application in the dashboard environment;
  identify in the clipping application a first user selected portion of current content provided by a first content source and a second user selected portion of current content provided by a second content source to be included respectively in a first view and a second view, wherein identifying the first user selected portion includes resizing a display window of the clipping application to change an amount of the current content displayed in the display window to a first amount, wherein identifying the second user selected portion includes resizing the display window to change the amount of the current content displayed in the display window to a second amount, and wherein both the first amount and the second amount include respective changed amounts of the current content with respective user selected dimensions less than the entire current content;
  store information associated with the respective user selected portions for each view including a name, identify information for designating a respective user selected portion associated with a respective content source, and stitching information, the stitching information defining how to present the first view and the second view in an aggregate view; and display both the first and second view in the aggregate view using the stitching information including displaying current content associated with the respective user selected portions.

99. A computer program product stored in a non-transitory medium comprising instructions for causing a computing device to:
identify a native application, the native application including one or more user interfaces that load current content provided by a content source and are interactive with a user of the native application, wherein identifying the native application selects the current content to be opened in a dashboard environment;
identify in a clipping application in the dashboard environment, a first user selection portion associated with one of the user interfaces to be included in a view and a second user selection portion associated with one of the user interfaces to be included in the view, wherein the first user selection portion is identified by resizing a display window of the clipping application to change an amount of the current content displayed in the display window to a first amount, wherein the second user selection portion is identified by resizing the display window of the clipping application to change the amount of the current content displayed in the display window to a second amount, the first user selected portion and the second user selected portion having respective changed amounts of the current content with respective user selected dimensions less than the entire current content provided by the content source;
store information associated with the received user selected portions including a name and identifying information; and
display the user selected portions in a view of the clipping application separate from the native application, the view including a control for interacting with the native application to provide data to or retrieve data from the native application as part of an update operation.

100. A computer program product stored in a non-transitory medium comprising instructions for causing a computing device to:
identify current content provided by a content source for display in an associated native application, wherein the current content is identified to be opened in a dashboard environment;
provide a clipping application in the dashboard environment that facilitates selecting a first user selected portion and a second user selected portion of the current content and viewing the first user selected portion and the second user selected portion of the current content without initiating the associated native application, wherein selecting the first user selected portion includes resizing a display window of the clipping application to change an amount of the current content displayed in the display window to a first amount, wherein selecting the second user selection portion includes resizing the display window of the clipping application to change the amount of the current content displayed in the display window to a second amount, the first user selected portion and the second user selected portion having respective changed amounts of the current content with respective user selected dimensions less than the entire current content; and
display the first user selected portion and the second user selected portion of the current content in a view presented by the clipping application including automatically updating the view in accordance with a refresh strategy, wherein refresh of the view includes accessing data to be included in a refreshed view without initiating the associated native application.

101. A computer program product stored in a non-transitory medium comprising instructions for causing a computing device to:
identify current content provided by a content source to an associated native application, wherein the current content is identified to be opened in a dashboard environment, the current content including a first user selected portion and a second user selected portion associated with the current content provided by the content source to be included in a view in a clipping application in the dashboard environment, wherein the first user selected portion is selected by resizing a display window of the clipping application to change an amount of the current content displayed in the display window to a first amount, wherein the second user selected portion is selected by resizing the display window of the clipping application to change the amount of the current content displayed in the display window to a second amount, the first user selected portion and the second user selected portion having respective changed amounts of the current content with respective user selected dimensions less than the entire current content;
provide the clipping application that facilitates selecting the first user selected portion and the second user selected portion of the current content and viewing the first user selected portion and the second user selected portion of the current content; and
display the first user selected portion and the second user selected portion of the current content in a view presented by the clipping application including automatically updating the view in accordance with a refresh strategy, wherein automatically updating the view includes accessing data to be included in an updated view without initiating the associated native application.

102. A computer program product stored in a non-transitory medium comprising instructions for causing a computing device to:
maintain first and second information and stitching information, each of the first and second information associated with a content source including a name, identifying information for designating a first and second user selected portion associated with current content provided by the associated content source to an associated native application, the first and second user selected portions having respective user selected dimensions less than the entire current content, the stitching information defining how to present the user selected portions in an aggregate view in a clipping application separate from the native application;
select the first and second user selected portions using a user interface of a clipping application, wherein selecting the first user selected portion includes resizing a display window of the clipping application to change an amount of the current content displayed in the display window to a first amount, wherein selected the second user selected portion includes resizing the display window to change the amount of the current content displayed in the display window to a second amount, and wherein both the first amount and the second amount include respective changed amounts of the current content; and
display, in the user interface in a dashboard environment, the aggregate view including respective user selected portions associated with the first and second information in accordance with the stitching information.

103. A computer program product stored in a non-transitory medium comprising instructions for causing a computing device to:

select, in a native application, a plurality of digital content sources to be opened in a dashboard environment, the selecting performed while the native application displays current content provided by the digital content sources to the native application;

identify, in a clipping application in the dashboard environment, a user selected portion associated with each digital content source to be included in a respective view defined by a selection definition, wherein identifying a first user selected portion includes resizing a display window of the clipping application to change an amount of the current content displayed in the display window to a first amount by cropping the current content, wherein identifying a second user selected portion includes resizing the display window of the clipping application to change the amount of the current content displayed in the display window to a second amount by cropping the current content, and wherein each user selected portion includes a respective changed amount of the current content with a respective user selected dimension less that the entire current content provided to the associated native application;

maintain information associated with each digital content source including navigation information to the digital content source, the selection definition and metadata describing a relationship for displaying each user selected portion in a unified view;

store the navigation information, the selection definition and metadata; and display the user selected portions in the unified view in the clipping application separate from the associated native application in accordance with the metadata.

* * * * *